(12) United States Patent
Setlur et al.

(10) Patent No.: US 11,244,114 B2
(45) Date of Patent: *Feb. 8, 2022

(54) ANALYZING UNDERSPECIFIED NATURAL LANGUAGE UTTERANCES IN A DATA VISUALIZATION USER INTERFACE

(71) Applicant: Tableau Software, Inc., Seattle, WA (US)

(72) Inventors: Vidya Raghavan Setlur, Portola Valley, CA (US); Alex Djalali, Los Gatos, CA (US)

(73) Assignee: TABLEAU SOFTWARE, INC., Seattle, WA (US)

( * ) Notice: Subject to any disclaimer, the term of this patent is extended or adjusted under 35 U.S.C. 154(b) by 178 days.

This patent is subject to a terminal disclaimer.

(21) Appl. No.: 16/234,470

(22) Filed: Dec. 27, 2018

(65) Prior Publication Data
US 2020/0110779 A1   Apr. 9, 2020

Related U.S. Application Data

(60) Provisional application No. 62/742,857, filed on Oct. 8, 2018.

(51) Int. Cl.
*G06F 40/30* (2020.01)
*G06F 3/0484* (2013.01)
(Continued)

(52) U.S. Cl.
CPC ........... *G06F 40/30* (2020.01); *G06F 3/0481* (2013.01); *G06F 3/0484* (2013.01);
(Continued)

(58) Field of Classification Search
None
See application file for complete search history.

(56) References Cited

U.S. PATENT DOCUMENTS

| 4,800,810 A | 1/1989 | Masumoto |
| 5,036,314 A | 7/1991 | Barillari et al. |

(Continued)

FOREIGN PATENT DOCUMENTS

| HU | 215657 B | 1/1994 |
| WO | WO 2006/060773 A2 | 6/2006 |

OTHER PUBLICATIONS

Becker, Trellis Graphics Displays: A Multi-dimensional Data Visualization Tool for Data Mining, Aug. 1997, 13 pgs.
(Continued)

*Primary Examiner* — Jonathan C Kim
(74) *Attorney, Agent, or Firm* — Morgan, Lewis & Bockius LLP

(57) ABSTRACT

A computing device displays a data visualization interface and receives user selection of a data source and a natural language command directed to the data source. The device forms a first intermediate expression according to a context-free grammar and a semantic model of data fields in the data source. In accordance with a determination that the first intermediate expression omits sufficient information for generating a data visualization, the device infers the omitted information associated with the data source using one or more inferencing rules based on syntactic and semantic constraints imposed by the context-free grammar. The device forms an updated intermediate expression, and translates the updated intermediate expression into database queries. It executes the database queries to retrieve data sets from the data source, then generates and displays a data visualization of the retrieved data sets.

20 Claims, 52 Drawing Sheets

US 11,244,114 B2

Page 2

(51) Int. Cl.
  *G06F 3/0481*   (2013.01)
  *G06F 16/2455*  (2019.01)
  *G06F 16/248*   (2019.01)
  *G06F 40/205*   (2020.01)
  *G06F 40/284*   (2020.01)
  *G06F 16/9038*  (2019.01)
  *G06F 16/904*   (2019.01)
  *G06F 16/9032*  (2019.01)
  *G06F 40/211*   (2020.01)

(52) U.S. Cl.
  CPC ...... *G06F 16/248* (2019.01); *G06F 16/24556* (2019.01); *G06F 16/904* (2019.01); *G06F 16/9038* (2019.01); *G06F 16/90332* (2019.01); *G06F 40/205* (2020.01); *G06F 40/211* (2020.01); *G06F 40/284* (2020.01)

(56) References Cited

U.S. PATENT DOCUMENTS

| | | |
|---|---|---|
| 5,060,980 A | 10/1991 | Johnson et al. |
| 5,144,452 A | 9/1992 | Abuyama |
| 5,169,713 A | 12/1992 | Kumurdjian |
| 5,265,244 A | 11/1993 | Ghosh et al. |
| 5,265,246 A | 11/1993 | Li et al. |
| 5,377,348 A | 12/1994 | Lau et al. |
| 5,383,029 A | 1/1995 | Kojima |
| 5,560,007 A | 9/1996 | Thai |
| 5,577,241 A | 11/1996 | Spencer |
| 5,581,677 A | 12/1996 | Myers et al. |
| 5,664,172 A | 9/1997 | Antoshenkov |
| 5,664,182 A | 9/1997 | Nierenberg et al. |
| 5,668,987 A | 9/1997 | Schneider |
| 5,794,246 A | 8/1998 | Sankaran et al. |
| 5,864,856 A | 1/1999 | Young |
| 5,893,088 A | 4/1999 | Hendricks et al. |
| 5,913,205 A | 6/1999 | Jain et al. |
| 5,933,830 A | 8/1999 | Williams |
| 6,031,632 A | 2/2000 | Yoshihara et al. |
| 6,032,158 A | 2/2000 | Mukhopadhyay et al. |
| 6,044,374 A | 3/2000 | Nesamoney et al. |
| 6,100,901 A | 8/2000 | Mohda et al. |
| 6,115,744 A | 9/2000 | Robins et al. |
| 6,154,766 A | 11/2000 | Yost et al. |
| 6,173,310 B1 | 1/2001 | Yost et al. |
| 6,188,403 B1 | 2/2001 | Sacerdoti et al. |
| 6,208,990 B1 | 3/2001 | Suresh et al. |
| 6,222,540 B1 | 4/2001 | Sacerdoti et al. |
| 6,247,008 B1 | 6/2001 | Cambot et al. |
| 6,253,257 B1 | 6/2001 | Dundon |
| 6,260,050 B1 | 7/2001 | Yost et al. |
| 6,269,393 B1 | 7/2001 | Yost et al. |
| 6,300,957 B1 | 10/2001 | Rao et al. |
| 6,301,579 B1 | 10/2001 | Becker |
| 6,317,750 B1 | 11/2001 | Tortolani et al. |
| 6,327,628 B1 | 12/2001 | Anuff et al. |
| 6,339,775 B1 | 1/2002 | Zamanian et al. |
| 6,377,259 B1 | 4/2002 | Tenev et al. |
| 6,397,195 B1 | 5/2002 | Pinard et al. |
| 6,400,366 B1 | 6/2002 | Davies et al. |
| 6,405,195 B1 | 6/2002 | Ahlberg |
| 6,405,208 B1 | 6/2002 | Raghavan et al. |
| 6,424,933 B1 | 7/2002 | Agrawala et al. |
| 6,490,593 B2 | 12/2002 | Proctor |
| 6,492,989 B1 | 12/2002 | Wilkinson |
| 6,522,342 B1 | 2/2003 | Gagnon et al. |
| 6,611,825 B1 | 8/2003 | Billheimer et al. |
| 6,643,646 B2 | 11/2003 | Su et al. |
| 6,707,454 B1 | 3/2004 | Barg et al. |
| 6,714,897 B2 | 3/2004 | Whitney et al. |
| 6,725,230 B2 | 4/2004 | Ruth et al. |
| 6,750,864 B1 | 6/2004 | Anwar |
| 6,768,986 B2 | 7/2004 | Cras et al. |
| 6,906,717 B2 | 6/2005 | Couckuyt et al. |
| 7,009,609 B2 | 3/2006 | Miyadai |
| 7,023,453 B2 | 4/2006 | Wilkinson |
| 7,089,266 B2 | 8/2006 | Stolte et al. |
| 7,117,058 B2 | 10/2006 | Lin et al. |
| 7,176,924 B2 | 2/2007 | Wilkinson |
| 7,290,007 B2 | 10/2007 | Farber et al. |
| 7,302,383 B2 * | 11/2007 | Valles ............ G06F 40/30 704/9 |
| 7,315,305 B2 | 1/2008 | Crotty et al. |
| 7,379,601 B2 | 5/2008 | Yang et al. |
| 7,426,520 B2 | 9/2008 | Gorelik et al. |
| 7,603,267 B2 * | 10/2009 | Wang ............ G10L 15/1822 704/9 |
| 7,716,173 B2 | 5/2010 | Stolte et al. |
| 7,882,144 B1 | 2/2011 | Stolte et al. |
| 8,082,243 B2 | 12/2011 | Gorelik et al. |
| 8,140,586 B2 | 3/2012 | Stolte et al. |
| 8,442,999 B2 | 5/2013 | Gorelik et al. |
| 8,473,521 B2 | 6/2013 | Fot et al. |
| 8,620,937 B2 | 12/2013 | Jonas |
| 8,713,072 B2 | 4/2014 | Stotle et al. |
| 8,751,505 B2 | 6/2014 | Carmel et al. |
| 8,874,613 B2 | 10/2014 | Gorelik et al. |
| 8,972,457 B2 | 3/2015 | Stolte et al. |
| 9,183,235 B2 | 11/2015 | Stolte et al. |
| 9,299,173 B2 * | 3/2016 | Rope ............ G06F 16/26 |
| 9,336,253 B2 | 5/2016 | Gorelik et al. |
| 9,501,585 B1 * | 11/2016 | Gautam ............ G06F 16/26 |
| 9,633,091 B2 | 4/2017 | Stolte et al. |
| 9,665,662 B1 | 5/2017 | Gautam |
| 9,818,211 B1 * | 11/2017 | Gibb ............ G06T 11/60 |
| 9,858,292 B1 * | 1/2018 | Setlur ............ G06F 16/248 |
| 9,947,314 B2 | 4/2018 | Cao et al. |
| 9,983,849 B2 | 5/2018 | Weingartner |
| 10,042,517 B2 | 8/2018 | Stolte et al. |
| 10,042,901 B2 | 8/2018 | Stolte et al. |
| 10,331,720 B2 * | 6/2019 | Neels ............ G06F 3/04847 |
| 10,418,032 B1 * | 9/2019 | Mohajer ............ G06F 16/3329 |
| 10,515,121 B1 * | 12/2019 | Setlur ............ G10L 15/1815 |
| 10,546,001 B1 * | 1/2020 | Nguyen ............ G06N 20/00 |
| 10,546,003 B2 * | 1/2020 | Gupta ............ G06F 16/3344 |
| 10,564,622 B1 * | 2/2020 | Dean ............ G06F 16/9017 |
| 10,817,527 B1 * | 10/2020 | Setlur ............ G06F 3/04847 |
| 10,956,655 B2 * | 3/2021 | Choe ............ G06Q 10/10 |
| 11,080,336 B2 * | 8/2021 | Van Dusen ............ G06Q 50/01 |
| 11,114,189 B2 * | 9/2021 | Prosky ............ G06T 5/008 |
| 2001/0013036 A1 | 8/2001 | Judicibus |
| 2002/0002325 A1 | 1/2002 | Lliff |
| 2002/0059204 A1 | 5/2002 | Harris |
| 2002/0118192 A1 | 8/2002 | Couckuyt et al. |
| 2002/0123865 A1 | 9/2002 | Whitney et al. |
| 2002/0135610 A1 | 9/2002 | Ootani et al. |
| 2002/0154118 A1 | 10/2002 | McCarthy et al. |
| 2003/0200034 A1 | 10/2003 | Fellenberg et al. |
| 2004/0148170 A1 | 7/2004 | Acero et al. |
| 2004/0183800 A1 | 9/2004 | Peterson |
| 2004/0227759 A1 | 11/2004 | McKnight et al. |
| 2004/0243593 A1 | 12/2004 | Stolte et al. |
| 2005/0035966 A1 | 2/2005 | Pasquarette et al. |
| 2005/0035967 A1 | 2/2005 | Joffrain et al. |
| 2005/0060300 A1 | 3/2005 | Stolte et al. |
| 2005/0099423 A1 | 5/2005 | Brauss |
| 2006/0129913 A1 | 6/2006 | Vigesaa et al. |
| 2006/0136825 A1 | 6/2006 | Cory et al. |
| 2006/0206512 A1 | 9/2006 | Hanrahan et al. |
| 2007/0061344 A1 | 3/2007 | Dickerman et al. |
| 2007/0061611 A1 | 3/2007 | MacKinlay et al. |
| 2007/0129936 A1 * | 6/2007 | Wang ............ G06F 40/30 704/9 |
| 2008/0016026 A1 | 1/2008 | Farber et al. |
| 2009/0313576 A1 * | 12/2009 | Neumann ............ G06T 11/206 715/783 |
| 2011/0112837 A1 | 5/2011 | Kurki-Suonio et al. |
| 2011/0119047 A1 * | 5/2011 | Ylonen ............ G06F 40/30 704/9 |
| 2011/0184718 A1 | 7/2011 | Chen |
| 2012/0323948 A1 * | 12/2012 | Li ............ G06F 16/3323 707/765 |

(56) References Cited

U.S. PATENT DOCUMENTS

| | | | |
|---|---|---|---|
| 2013/0249917 A1* | 9/2013 | Fanning | G06F 11/323 345/440 |
| 2014/0164362 A1 | 6/2014 | Syed et al. | |
| 2014/0236579 A1 | 8/2014 | Kurz | |
| 2016/0078354 A1 | 3/2016 | Petri et al. | |
| 2016/0092090 A1* | 3/2016 | Stojanovic | G06F 16/211 715/771 |
| 2016/0171050 A1 | 6/2016 | Das | |
| 2016/0179908 A1 | 6/2016 | Johnston et al. | |
| 2017/0011023 A1 | 1/2017 | Ghannam et al. | |
| 2017/0091277 A1* | 3/2017 | Zoch | G06F 16/2423 |
| 2017/0091902 A1 | 3/2017 | Bostik et al. | |
| 2017/0118308 A1 | 4/2017 | Vigeant et al. | |
| 2017/0154089 A1 | 6/2017 | Sherman | |
| 2017/0308571 A1 | 10/2017 | McCurley et al. | |
| 2018/0032576 A1* | 2/2018 | Romero | G06F 16/24522 |
| 2018/0039614 A1* | 2/2018 | Govindarajulu | G06F 40/211 |
| 2018/0144065 A1 | 5/2018 | Yellai | |
| 2018/0158245 A1* | 6/2018 | Govindan | G06F 3/04815 |
| 2018/0203924 A1* | 7/2018 | Agrawal | G06F 3/167 |
| 2018/0210883 A1* | 7/2018 | Ang | G06F 16/283 |
| 2018/0329987 A1* | 11/2018 | Tata | G06N 3/08 |
| 2019/0026318 A1 | 1/2019 | Bertellotti et al. | |
| 2019/0042634 A1 | 2/2019 | Stolte et al. | |
| 2019/0102390 A1 | 4/2019 | Antunes et al. | |
| 2019/0108171 A1 | 4/2019 | Stolte et al. | |
| 2019/0115016 A1 | 4/2019 | Seok et al. | |
| 2019/0120649 A1 | 4/2019 | Seok et al. | |
| 2019/0121801 A1* | 4/2019 | Jethwa | G06F 16/3334 |
| 2019/0138648 A1* | 5/2019 | Gupta | G06F 16/3329 |
| 2019/0163807 A1 | 5/2019 | Jain et al. | |
| 2019/0179607 A1 | 6/2019 | Thangarathnam et al. | |
| 2019/0197605 A1* | 6/2019 | Sadler | G06Q 30/0207 |
| 2019/0236144 A1* | 8/2019 | Hou | G06F 40/30 |
| 2019/0272296 A1 | 9/2019 | Prakash et al. | |
| 2019/0311717 A1 | 10/2019 | Kim et al. | |
| 2019/0349321 A1 | 11/2019 | Cai et al. | |
| 2019/0384815 A1* | 12/2019 | Patel | G06F 40/295 |
| 2020/0065385 A1* | 2/2020 | Dreher | G06F 40/30 |
| 2020/0089700 A1* | 3/2020 | Ericson | G06F 40/166 |
| 2020/0089760 A1* | 3/2020 | Ericson | G06F 3/0482 |
| 2020/0090189 A1 | 3/2020 | Tutuk et al. | |
| 2020/0104402 A1 | 4/2020 | Burnett et al. | |
| 2020/0110803 A1* | 4/2020 | Djalali | G06F 16/248 |
| 2020/0134103 A1* | 4/2020 | Mankovskii | G06F 16/904 |
| 2020/0327432 A1 | 10/2020 | Doebelin et al. | |

OTHER PUBLICATIONS

Becker, Visualizing Decision Table Classifiers, 1998, 4 pgs.
Beers, Office Action, U.S. Appl. No. 11/787,761, dated Jun. 12, 2008, 12 pgs.
Beers, Office Action, U.S. Appl. No. 11/787,761, dated Dec. 17, 2008, 13 pgs.
Bosch, Performance Analysis and Visualization of Parallel Systems Using SimOS and Rivet: A Case Study, Jan. 2000, 13 pgs.
Bosch, Rivet: A Flexible Environment for Computer Systems Visualization, Feb. 2000, 9 pgs.
Brunk, MineSet: An Integrated System for Data Mining, 1997, 4 pgs.
Cimiano, Philipp, et al. "Towards portable natural language interfaces to knowledge bases—The case of the ORAKEL system." Data & Knowledge Engineering 65.2, Nov. 2007, pp. 325-354, (Year: 2007).
Derthick, An Interactive Visual Query Environment for Exploring Data, 1997, 11 pgs.
Djalali, Preinterview First Office Action, U.S. Appl. No. 16/166,125, dated May 5, 2020, 19 pgs.
Djalali, First Action Interview Office Action, U.S. Appl. No. 16/166,125, dated Sep. 9, 2020, 20 pgs.
Freeze, Unlocking OLAP with Microsoft SQL Server and Excel 2000, 2000, 220 pgs.
Fua, "Hierarchical Parallel Coordinates for Exploration of Large Datasets," IEEE 1999, pp. 43-50 (Year: 1999).
Eser Kandogan, "Star Coordinates: A Multi-dimensional Visualization Technique with Uniform Treatment of Dimensions," www.citeseerx.st.psu.edu, pp. 1-4, 2000 (YearL 2000).
Fua, Navigating Hierarchies with Structure-Based Brushes, 1999, 7 pgs.
Gao, Tong, et al. "Datatone: Managing ambiguity in natural language interfaces for data visualization." Proceedings of the 28th Annual ACM Symposium on User Interface Software & Technology. Nov. 2015, pp. 489-500. (Year: 2015).
Goldstein, A Framework for Knowledge-Based Interactive Data Exploration, Dec. 1994, 30 Pgs.
Gray, Data Cube: A Relational Aggregation Operator Generalizing Group-By, 1997, 24 pgs.
Hanrahan, Office Action, U.S. Appl. No. 11/005,652, dated Feb. 20, 2009, 11 pgs.
Hanrahan, Office Action, U.S. Appl. No. 11/005,652, dated Jul. 24, 2008, 11 pgs.
Hanrahan, Office Action, U.S. Appl. No. 11/005,652, dated Dec. 27, 2007, 11 pgs.
Hanrahan, Specification, U.S. Appl. No. 11/005,652, filed Dec. 2, 2004, 104 pgs.
Healey, On the Use of Perceptual Cues and Data Mining for Effective Visualization of Scientific Datasets, 1998, 8 pgs.
Hearst, Office Action, U.S. Appl. No. 16/601,413, dated Nov. 3, 2020, 17 pgs.
HU Search Report, HU P0700460, dated Oct. 9, 2007, 1 pg.
John V. Carlis and Joseph A. Konstan, Interactive Visulaization of Serial Periodic Data, www.Courses.ischool.berkeley.edu, pp. 1-10, 1998 (Year: 1998).
Joseph, Office Action, U.S. Appl. No. 13/734,694, dated Aug. 18, 2014, 46 pgs.
Keim, VisDB: Datatbase Exploration Using Multidimensional Visualization, Aug. 1994, 27 pgs.
Kohavi, Data Mining and Visualization, 2000, 8 pgs.
Livay, DEVise: Integrated Querying and Visual Exploration of Large Datasets, May 1997, 12 Pgs.
Livney, M. et al., "DEVise: Integraed Querying and Visual Exploration of Large Datasets," ACM, 1997, pp. 301-312, (Year: 1997).
MacDonald, Creating Basic Charts, 2006, 46 pgs.
MacKinlay, Automating the Design of Graphical Presentations of Relational Information, 1986, 34 pgs.
MacKinlay, Office Action, U.S. Appl. No. 11/223,658, dated May 21, 2008, 20 pgs.
MacKinlay, Office Action, U.S. Appl. No. 11/223,658, dated Feb. 23, 2009, 19 pgs.
MacKinlay, Specification, U.S. Appl. No. 11/223,658, dated Sep. 9, 2005, 58 pgs.
Matsushita, Mitsunori, Eisaku Maeda, and Tsuneaki Kato. "An interactive visualization method of numerical data based on natural language requirements." International journal of human-computer studies 60.4, Apr. 2004, pp. 469-488, (Year: 2004).
Perlin, An Alternative Approach to the Computer Interface, 1993, 11 pgs.
Popescu, et al. "Towards a theory of natural language interfaces to databases." Proceedings of the 8th international conference on Intelligent user interfaces. Jan. 2003, pp. 149-157. (Year: 2003).
Rao, The Table Lens: Merging Graphical and Symbolic Representation in an Interactive Focus+Context Visualization for Tabular Information, Apr. 1994, 7 pgs.
Roth, Interactive Graphic Design Using Automatic Presentation Knowledge, Apr. 24, 1994, 7 pgs.
Roth, Visage: A User Interface Environment for Exploring Information, Oct. 28-29, 2006, 9 Pgs.
Screen Dumps for Microsoft Office Excel 2003 SP2, figures 1-36, 2003, pp. 1-19.
Spenke, Focus: The Interactive Table for Product Comparison and Selection, Nov. 1996, 10 pgs.
Stevens, On the Theory of Scales of Measurement, Jun. 7, 1946, 4 pgs.
Stolte, Multiscale Visualization Using Data Cubes, 2002, 8 pgs.

(56) References Cited

OTHER PUBLICATIONS

Stolte, Notice of Allowance, U.S. Appl. No. 10/453,834, dated Mar. 27, 2006, 9 pgs.
Stolte, Notice of Allowance, U.S. Appl. No. 11/488,407, dated Dec. 29, 1999, 8 pgs.
Stolte, Notice of Allowance, U.S. Appl. No. 13/019,227, dated Nov. 10, 2011, 8 pgs.
Stolte, Notice of Allowance, U.S. Appl. No. 13/425,300, dated Dec. 10, 2013, 10 pgs.
Stolte, Office Action, U.S. Appl. No. 10/667,194, dated Jan. 7, 2008, 10 pgs.
Stolte, Office Action, U.S. Appl. No. 10/667,194, dated Feb. 9, 2009, 11 pgs.
Stolte, Office Action, U.S. Appl. No. 10/667,194, dated Aug. 14, 2007, 16 pgs.
Stolte, Office Action, U.S. Appl. No. 10/667,194, dated Aug. 14, 2008, 10 pgs.
Stolte, Office Action, U.S. Appl. No. 10/667,194, dated Jan. 18, 2007, 15 pgs.
Stolte, Office Action, U.S. Appl. No. 10/667,194, dated Jun. 26, 2006, 13 pgs.
Stolte, Office Action, U.S. Appl. No. 11/488,407, dated Apr. 3, 2009, 6 pgs.
Stolte, Office Action, U.S. Appl. No. 13/019,227, dated Apr. 18, 2011, 9 pgs.
Stolte, Office Action, U.S. Appl. No. 13/425,300, dated Mar. 15, 2013, 7 pgs.
Stolte, Office Action, U.S. Appl. No. 14/937,836, dated Oct. 7, 2016, 10 pgs.
Stolte, Notice of Allowance, U.S. Appl. No. 14/937,836, dated Mar. 1, 2017, 8 pgs.
Stolte, Office Action, U.S. Appl. No. 15/449,844, dated Jun. 29, 2017, 16 pgs.
Stolte, Final Office Action, U.S. Appl. No. 15/449,844, dated Feb. 6, 2018, 8 pgs.
Stolte, Notice of Allowance, U.S. Appl. No. 15/449,844, dated May 18, 2018, 9 pgs.
Stolte, Office Action, U.S. Appl. No. 15/582,478, dated Jul. 11, 2017, 16 pgs.
Stolte, Final Office Action, U.S. Appl. No. 15/582,478, dated Mar. 8, 2018, 10 pgs.
Stolte, Notice of Allowance U.S. Appl. No. 15/582,478, dated Jun. 26, 2017, 10 pgs.
Stolte, Notice of Allowance U.S. Appl. No. 16/056,396, dated Apr. 16, 2019, 10 pgs.
Stolte, Office Action, U.S. Appl. No. 16/056,819, dated Aug. 7, 2019, 12 pgs.
Stolte, Notice of Allowance, U.S. Appl. No. 16/056,819, dated Sep. 11, 2019, 8 pgs.
Stolte, Notice of Allowance, U.S. Appl. No. 16/220,240, dated Sep. 11, 2019, 8 pgs.
Stolte Notice of Allowance, U.S. Appl. No. 16/137,457, dated Sep. 6, 2019, 10 pgs.
Stolte Notice of Allowance, U.S. Appl. No. 16/137,071, dated Sep. 11, 2019, 19 pgs.
Stolte, Polaris: A System for Query, Analysis, and Visualization of Multidimensional Relational Databases, Jan. 2002, 14 pgs.
Stolte, Query Analysis, and Visualization of Hierarchically Structured Data Using Polaris, Jul. 2002, 11 pgs.
Stolte, Specification, U.S. Appl. No. 10/453,834, filed Jun. 2, 2003, 114 pgs.
Stolte, Visualizing Application Behavior on Superscaler Processors, 1999, 9 pgs.
Tableau Software, IPRP, PCT/US2005/043937, Jun. 5, 2007, 9 pgs.
Tableau Software, IPRP, PCT/US2007/009810, Oct. 22, 2008, 7 pgs.
Tableau Software, ISR/WO, PCT/US2005/043937, Apr. 18, 2007, 9 pgs.
Tableau Software, ISR/WO, PCT/US2006/35300, Jul. 7, 2008, 6 pgs.
Tableau Software, ISR/WO, PCT/US2007/009810, Jul. 7, 2008, 8 pgs.
Tableau Software, Inc., International Search Report and Written Opinion, PCT/US2019/055169, dated Dec. 16, 2019, 12 pgs.
The Board of Trustees..Stanford, IPRP, PCT/US04/18217, Oct. 19, 2006, 4 pgs.
The Board of Trustees..Stanford, IPRP, PCT/US2004/30396, Jan. 30, 2007, 3 pgs.
The Board of Trustees..Stanford, ISR/WO, PCT/US04/18217, Feb. 7, 2006, 6 pgs.
The Board of Trustees..Stanford, ISR/WO, PCT/US2004/30396, Aug. 24, 2006, 5 pgs.
The Board of Trustees..Stanford, Supplementary ESR, EP 04754739. 3, Dec. 17, 2007, 4 pgs.
Thearling, Visualizing Data Mining Models, 2001, 14 pgs.
Tory, First Action Preinterview Office Action, U.S. Appl. No. 16/219,406, dated Jul. 10, 2020, 7 pgs.
Tory, Notice of Allowance U.S. Appl. No. 16/219,406, dated Sep. 9, 2020, 8 pgs.
Tory, Office Action, U.S. Appl. No. 16/575,354, dated Nov. 3, 2020, 17 pgs.
Tresor Mvumbi: "Natural Language Interface to Relational Database: A Simplified Customization Approach," Dissertation presented for the Degree of Master of Science in the Department of Computer Science, Aug. 2016, XP055650275, retrieved from htttps://open.uct.ac.za/bitstream/handle/11427/23058/thesis_sci_2016_mvumbi_tresor.pdf?sequece=1 &iAllowed=y.
Vidya Setluer et al.: "Eviza" User Interface Software and Technology, ACM, 2 Penn Plaza, Suite 701 New Yourk NY 10121-0701 USA, Oct. 16, 2016, pp. 365-377, XP058299767, DOI: 10.1145/2984511.2984588, ISBN: 978-1-4503-4189-9, 13 pgs.
Ward, XmdvTool: Integrating Multiple Methods for Visualizing Multi-Variate Data, 9 pgs.
Welling, Visualization of Large Multi-Dimensional Datasets, Aug. 11, 2000, 6 pgs.
Wilkinson, nViZn: An Algebra-Based Visualization System, Mar. 21-23, 2001, 7 pgs.
Wilkinson, Statistics and Computing—The Grammar of Graphics, 1999, 417 pgs.
Hearst, Notice of Allowance, U.S. Appl. No. 16/601,413, dated Mar. 3, 2021, 10 pgs.
Stolte Office Action, U.S. Appl. No. 16/220,240, dated Aug. 7, 2019, 11 pgs.
Tory, Office Action, U.S. Appl. No. 16/575,354, dated Sep. 20, 2021, 21 pgs.
Tory, Office Action, U.S. Appl. No. 16/575,349, dated Oct. 13, 2020, 15 pgs.
Tory, Notice of Allowance, U.S. Appl. No. 16/575,349, dated Feb. 3, 2021, 9 pgs.

* cited by examiner

| Analytical Expressions 239 |
|---|
| Aggregation Expression 290 |
| Group Expression 292 |
| Filter Expression 294 |
| Limit Expression 296 |
| Sort Expression 298 |
| ⋮ |

Figure 2D

| # of Records | Vintage | Country | County | Description | Taster Name | Taster Twitter Handle | Title | Designation | Province | Points | Price | Variety | Winery |
|---|---|---|---|---|---|---|---|---|---|---|---|---|---|
| 1 | 1821 | Italy | Prosecco | Easy and bright, this... | | | Zonin NV Cuvée 1821 | Cuvée 1821 Brut | Veneto | 86 | $15.00 | Glera | Zonin |
| 1 | 1872 | Spain | Cava | Clover and apple aroma | Michael Schachner | @wineschach | Codumu NV Reserva | Reserva Cuvée Barcelona 1872 | Catalonia | 94 | $25.00 | Sherry | Osborne |
| 1 | 1919 | Spain | Cava | Apple, lemon-lime and... | | | L'Arboc NV 1919 | 1919 Brut Selecció | Catalonia | 88 | $31.00 | Sparkling Blend | L'Arboc |
| 1 | 1945 | France | Rivesaltes | For any serious fan... | Lauren Buzzneo | @laurbuzz | Gérard Bertrand | Legend Vintage | Languedoc-Roussillon | 95 | $36.00 | Red Blend | Gérard Bertrand |
| 1 | 1952 | Portugal | | Astonishing finish... | Roger Voss | @vossroger | Burmester 1952 Port | Colheita Tawny | Port | 93 | $54.00 | Port | Burmester |
| 1 | 1987 | US | Sonoma Valley | Dark, earthy aromas... | | | Sebastiani 1987 | Cherryblock | California | 91 | $45.00 | Cabernet Sauvignon | Sebastiani |
| 1 | 1990 | France | Champagne | The aroma of this robust... | | | Moet and Chandon | Dom Pérignon Rosé | Champagne | 90 | $290.00 | Champagne Blend | Moet |
| 1 | 1994 | Germany | | This is a single-... | | | C. von Nell-Breuning 1994... | K. Dominikanerberg Auslese | Mosel | 83 | $36.00 | Riesling | C. von Nell-Breuning |
| 1 | 1994 | US | Oregon | Some funkiness in... | Paul Gregutt | @paulwineA | Rex Hill 1994 Oregon... | | Oregon | 91 | $58.00 | Pinot Noir | Rex Hill |
| ... | | | | | | | | | | | | | |

Figure 3

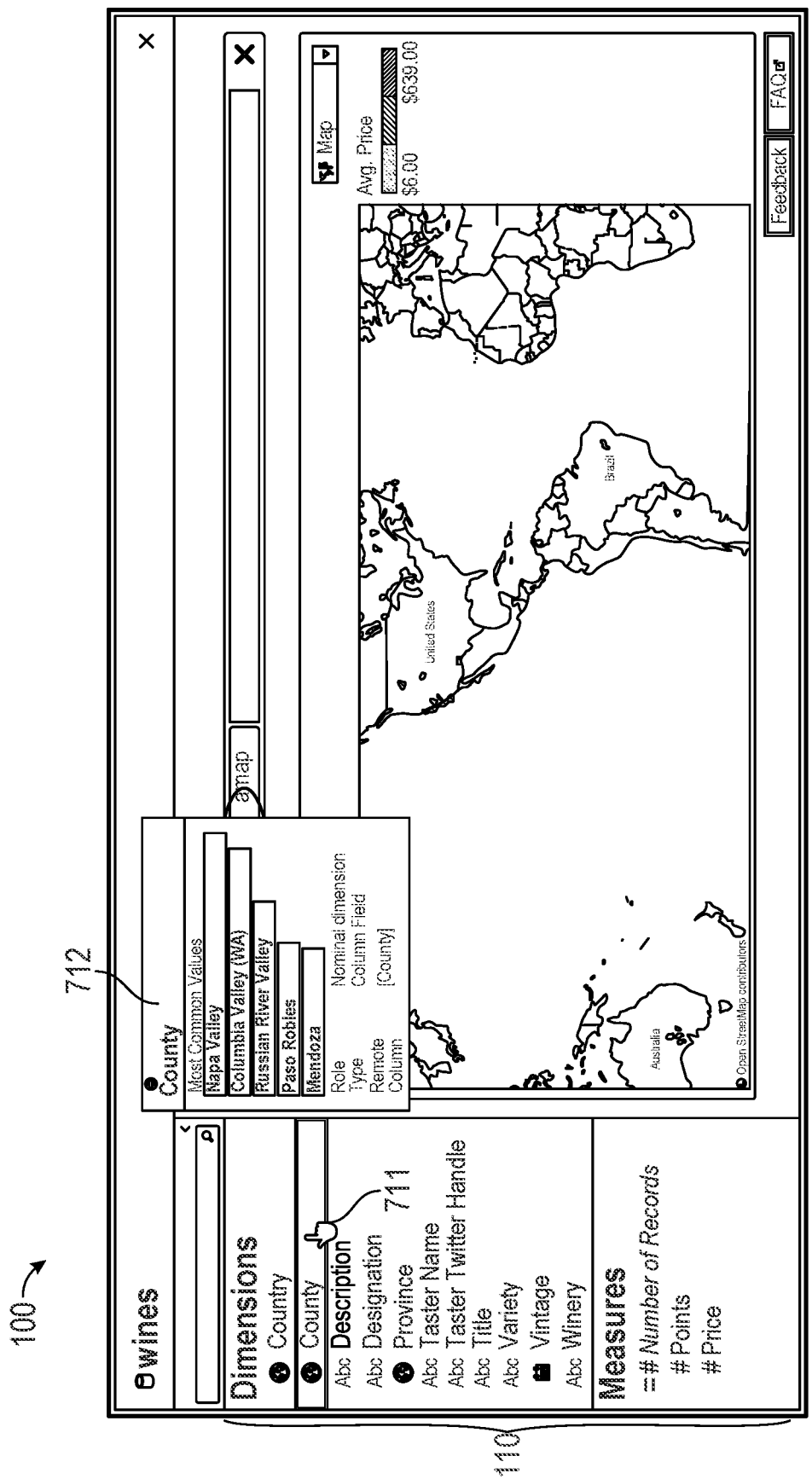

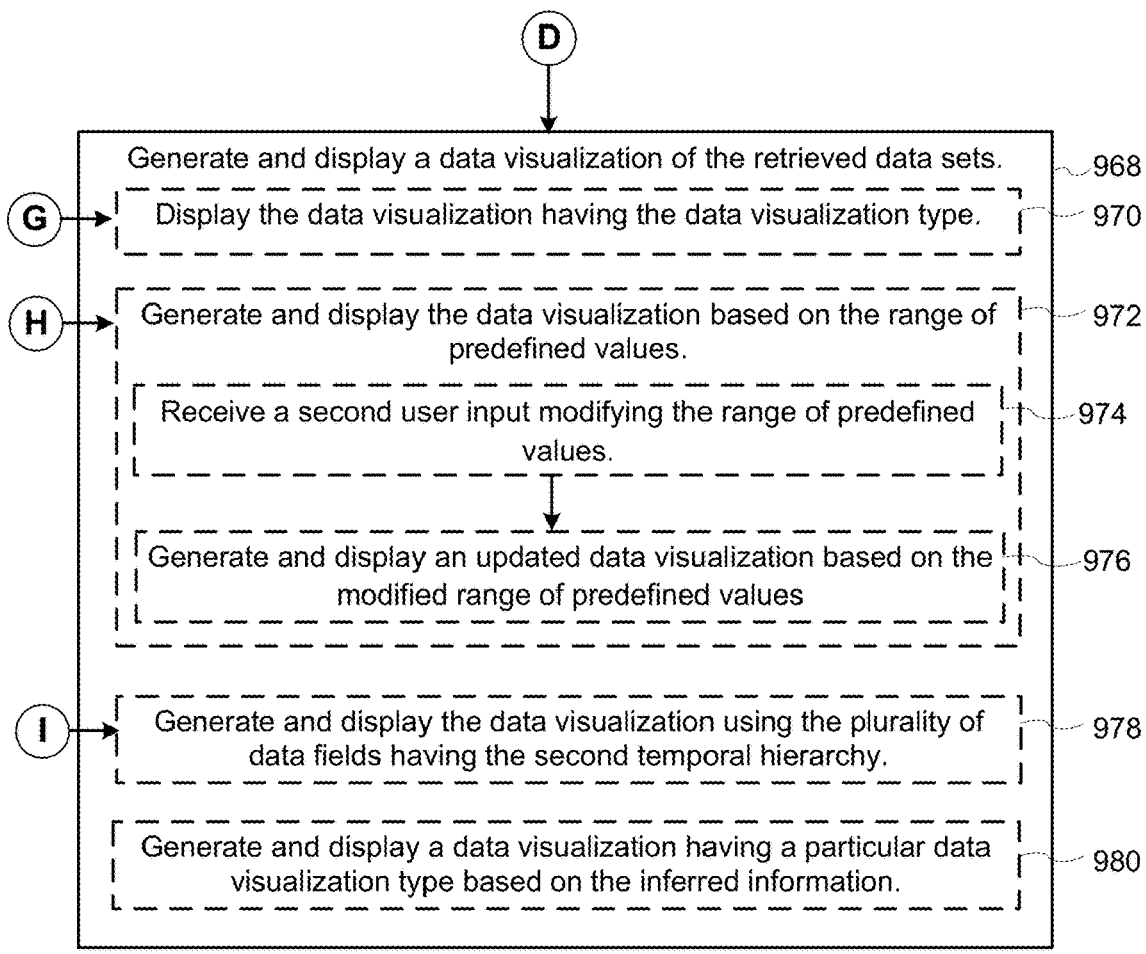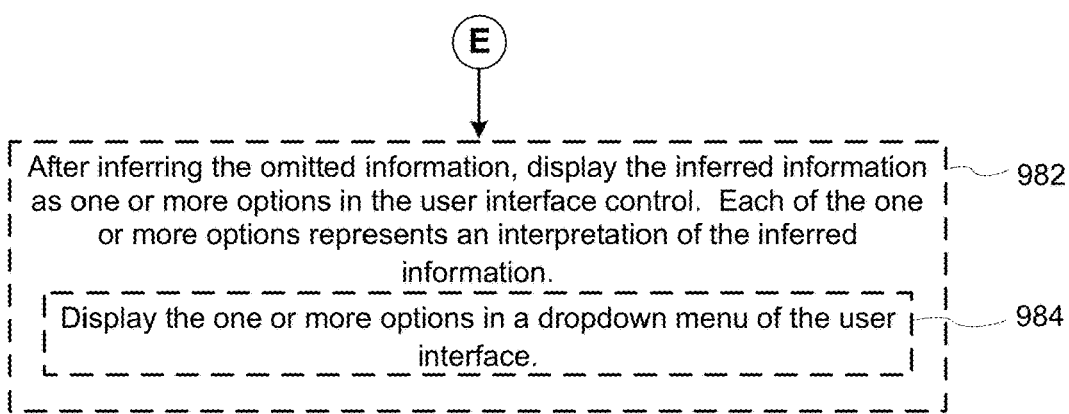
Figure 9E

ANALYZING UNDERSPECIFIED NATURAL LANGUAGE UTTERANCES IN A DATA VISUALIZATION USER INTERFACE

RELATED APPLICATIONS

This application claims priority to U.S. Provisional Patent Application No. 62/742,857, filed Oct. 8, 2018, titled "Inferencing Underspecified Natural Language Utterances in Visual Analysis," which is incorporated by reference herein in its entirety.

This application is related to U.S. patent application Ser. No. 16/166,125, filed Oct. 21, 2018, titled "Determining Levels of Detail for Data Visualizations Using Natural Language Constructs," U.S. patent application Ser. No. 16/134,892, filed Sep. 18, 2018, titled "Analyzing Natural Language Expressions in a Data Visualization User Interface," U.S. patent application Ser. No. 15/486,265, filed Apr. 12, 2017, titled, "Systems and Methods of Using Natural Language Processing for Visual Analysis of a Data Set," and U.S. patent application Ser. No. 14/801,750, filed Jul. 16, 2015, titled "Systems and Methods for using Multiple Aggregation Levels in a Single Data Visualization," each of which is incorporated by reference herein in its entirety.

TECHNICAL FIELD

The disclosed implementations relate generally to data visualization and more specifically to systems, methods, and user interfaces that enable users to interact with data visualizations and analyze data using natural language expressions.

BACKGROUND

Data visualization applications enable a user to understand a data set visually. Visual analyses of data sets, including distribution, trends, outliers, and other factors are important to making business decisions. Some data sets are very large or complex, and include many data fields. Various tools can be used to help understand and analyze the data, including dashboards that have multiple data visualizations and natural language interfaces that help with visual analytical tasks.

Natural language interfaces are becoming a useful modality for data exploration. However, supporting natural language interactions with visual analytical systems is often challenging. For example, users tend to type utterances that are linguistically colloquial, underspecified, or ambiguous, while the visual analytics system has more complicated nuances of realizing these utterances against the underlying data and analytical functions. Users also expect high precision and recall from such natural language interfaces. However, unlike web search systems relying on document indexing, visual analytical systems are constrained by the underlying analytical engine and data characteristics. While statistical and machine learning techniques can be employed, manually authoring and tuning a grammar for each new database is difficult and prohibitively expensive.

SUMMARY

There is a need for improved systems and methods that support natural language interactions with visual analytical systems. The present disclosure describes a data visualization application that employs a set of inference techniques for handling ambiguity and underspecification of users' utterances, so as to generate useful data visualizations. The data visualization application uses syntactic and semantic constraints imposed by an intermediate language that resolves natural language utterances. The intermediate language resolves the underspecified utterances into formal queries that can be executed against a visual analytics system (e.g., the data visualization application) to generate useful data visualizations. Thus, the intermediate language reduces the cognitive burden on a user and produces a more efficient human-machine interface.

In accordance with some implementations, a method executes at a computing device having a display, one or more processors, and memory storing one or more programs configured for execution by the one or more processors. The method includes displaying a data visualization interface on the display. The method includes receiving user selection of a data source. The method further includes receiving a first user input to specify a natural language command directed to the data source. For example, the user input includes one or more words associated with the data source. The method further includes forming a first intermediate expression according to a context-free grammar and a semantic model of data fields in the data source by parsing the natural language command. When the first intermediate expression omits sufficient information for generating a data visualization, the computing device infers the omitted information associated with the data source using one or more inferencing rules based on syntactic and semantic constraints imposed by the context-free grammar. The computing device forms an updated intermediate expression using the first intermediate expression and the inferred information. The computing device translates the updated intermediate expression into one or more database queries. The computing device executes the one or more database queries to retrieve one or more data sets from the data source. The computing device generates and displaying a data visualization of the retrieved data sets. In some implementations, the first intermediate expression is also known as a partial analytical expression or an underspecified expression. In some implementations, the updated intermediate expression is a fully specified expression.

In some implementations, forming the first intermediate expression includes using one or more pre-defined grammar rules governing the context-free grammar.

In some implementations, the predefined grammar rules include a predefined expression type that is one of: limit, group, aggregation, filter, and sort.

In some instances, the omitted information includes an open variable of the data source. Inferring the omitted information includes assigning a non-logical constant to the open variable, and inferring an analytical concept for the non-logical constant.

In some instances, the analytical concept is one of: field, value, aggregation, group, filter, limit, and sort.

In some instances, inferring the omitted information associated with the data source includes inferring one or more second intermediate expressions. The updated intermediate expression uses the first intermediate expression and the one or more second intermediate expressions.

In some instances, the first intermediate expression is a sort expression, and the one or more second intermediate expressions include a group expression.

In some instances, the one or more second intermediate expressions further include an aggregation expression.

In some instances, the natural language command includes a data visualization type. Generating and displaying the data visualization of the retrieved data sets includes displaying a data visualization having the data visualization type.

In some instances, the data visualization type is one of: a bar chart, a Gantt chart, a line chart, a map, a pie chart, a scatter plot, and a tree map.

In some instances, the omitted information includes an underspecified concept. For example, the omitted information includes one or more vague or ambiguous concepts (e.g., terms) such as "low", "high", "good", "bad", "near", and "far." Inferring the omitted information includes identifying a data field associated with the underspecified concept, and inferring a range of predefined (e.g., default) values associated with the data field. Generating and displaying the data visualization includes generating and displaying the data visualization based on the range of predefined values.

In some instances, the range of predefined values includes one or more of: an average value, a standard deviation, and a maximum value associated with the data field.

In some instances, the method further comprises receiving a second user input modifying the range of predefined values. Responsive to the second user input, the computing device generates and displays an updated data visualization based on the modified range of predefined values.

In some implementations, receiving the user input to specify the natural language command further comprises receiving the user input via a user interface control in the data visualization interface.

In some implementations, after the computing device infers the omitted information, the computing device displays the inferred information as one or more options in the user interface control, each of the one or more options representing an interpretation of the inferred information.

In some implementations, displaying the inferred information as one or more options in the user interface control includes displaying the one or more options in a dropdown menu of the user interface.

In some implementations, the omitted information includes a missing field, and inferring the omitted information includes inferring the missing field based on a popularity score from telemetry usage data. In some implementations, textual fields such as "City" and "State" have a higher popularity score than numerical fields such as "Zip Code".

In some instances, the natural language command directed to the data source includes a first temporal concept. Inferring the omitted information includes identifying a first temporal hierarchy (e.g., year, month, week, day, hour, minute, and second) associated with the first temporal concept. Inferring the omitted information also includes inferring a second temporal hierarchy (e.g., year, month, week, day, hour, minute, and second) associated with the data source, and retrieving from the data source a plurality of data fields having the second temporal hierarchy. The computing device further generates and displays the data visualization using the plurality of data fields having the second temporal hierarchy In some implementations, the plurality of data fields having the second temporal hierarchy has a level of detail that is more granular than the level of detail of data fields in the data source having the first temporal hierarchy.

In some implementations, generating and displaying a data visualization further comprises generating and displaying a data visualization having a particular data visualization type based on the inferred information.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

Thus methods, systems, and graphical user interfaces are disclosed that enable users to easily interact with data visualizations and analyze data using natural language expressions.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIG. 2D is a block diagram illustrating analytical expressions according to some implementations.

FIG. 3 illustrates an exemplary data source according to some implementations.

FIGS. 7A-7I provide a series of screenshots that illustrate inferencing for supporting visualization types, in accordance with some implementations.

FIGS. 9A-9E provide a flowchart of a method for generating data visualizations from underspecified natural language expressions in accordance with some implementations Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

The various methods and devices disclosed in the present specification improve the effectiveness of natural language interfaces on data visualization platforms by resolving underspecified (e.g., omitted information) or ambiguous (e.g., vague) natural language utterances (e.g., expressions or commands) directed to a data source. The methods and devices leverage syntactic and semantic structure defined by an intermediate language. The intermediate language, also referred to herein as ArkLang, is designed to resolve natural language inputs into formal queries that can be executed against a database. A natural language input is lexically translated into ArkLang. A first intermediate expression of the input is formed in ArkLang. The omitted information associated with the data source is inferred using inferencing rules based on the syntactic and semantic constraints imposed by ArkLang. An updated intermediate expression is formed using the first intermediate expression and the inferred information, and is then translated (e.g., compiled) into a series of instructions employing a visualization query language to issue a query against a data source (e.g., database). The data visualization platform automatically generates and displays a data visualization (or an updated data visualization) of retrieved data sets in response to the natural language input. The visualization query language is a formal language for describing visual representations of data, such as tables, charts, graphs, maps, time series, and tables of visualizations. These different types of visual representations are unified into one framework, coupling query, analysis, and visualization. Thus, the visualization query language facilitates transformation from one visual representation to another (e.g., from a list view to a cross-tab to a chart).

Figure 1:
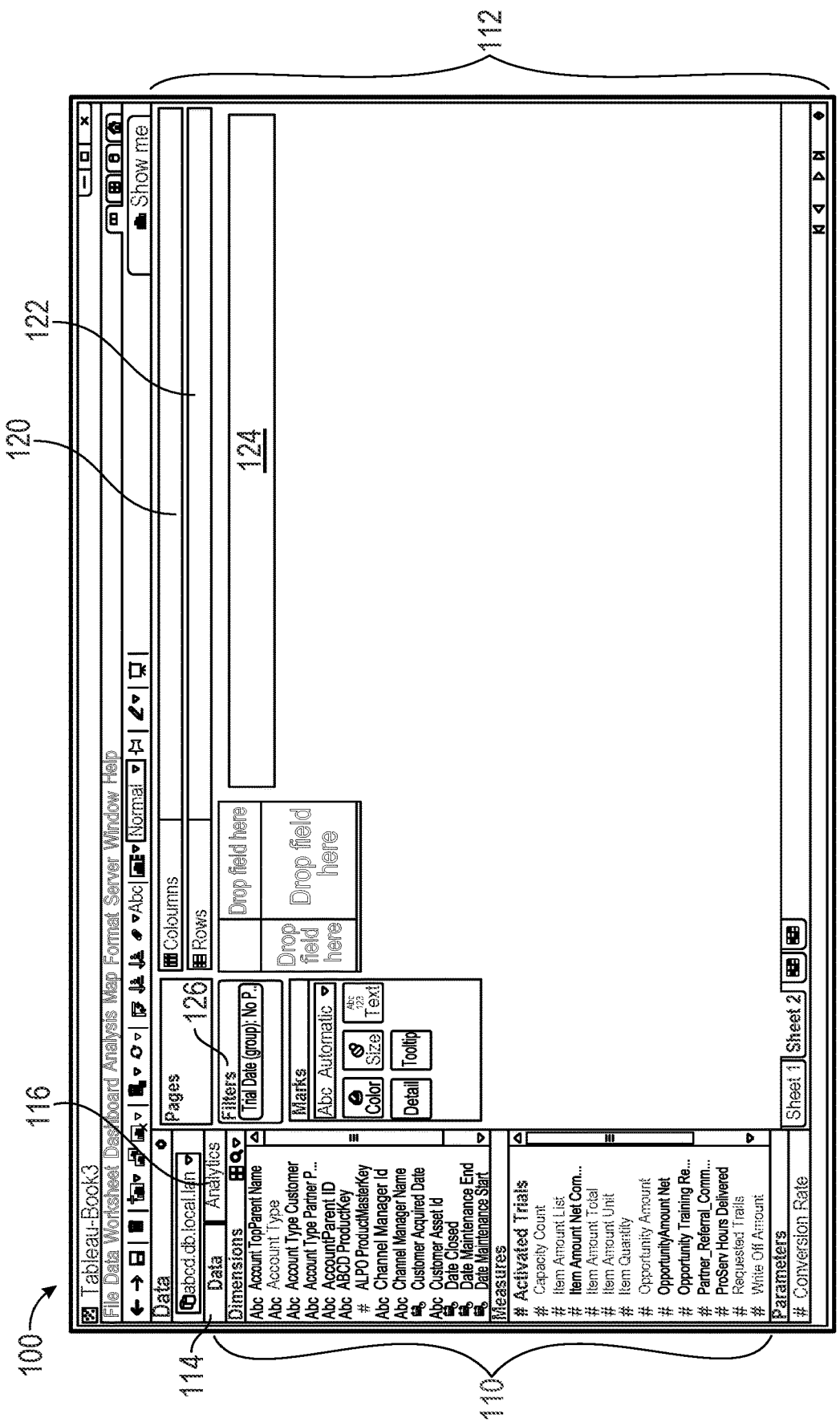
FIG. 1 illustrates a graphical user interface used in some implementations.

FIG. 1 illustrates a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the graphical user interface 100 also includes a natural language input box 124 (also referred to as a command box) for receiving natural language commands. A user may interact with the command box to provide commands. For example, the user may provide a natural language command by typing the command in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

Figure 2A:
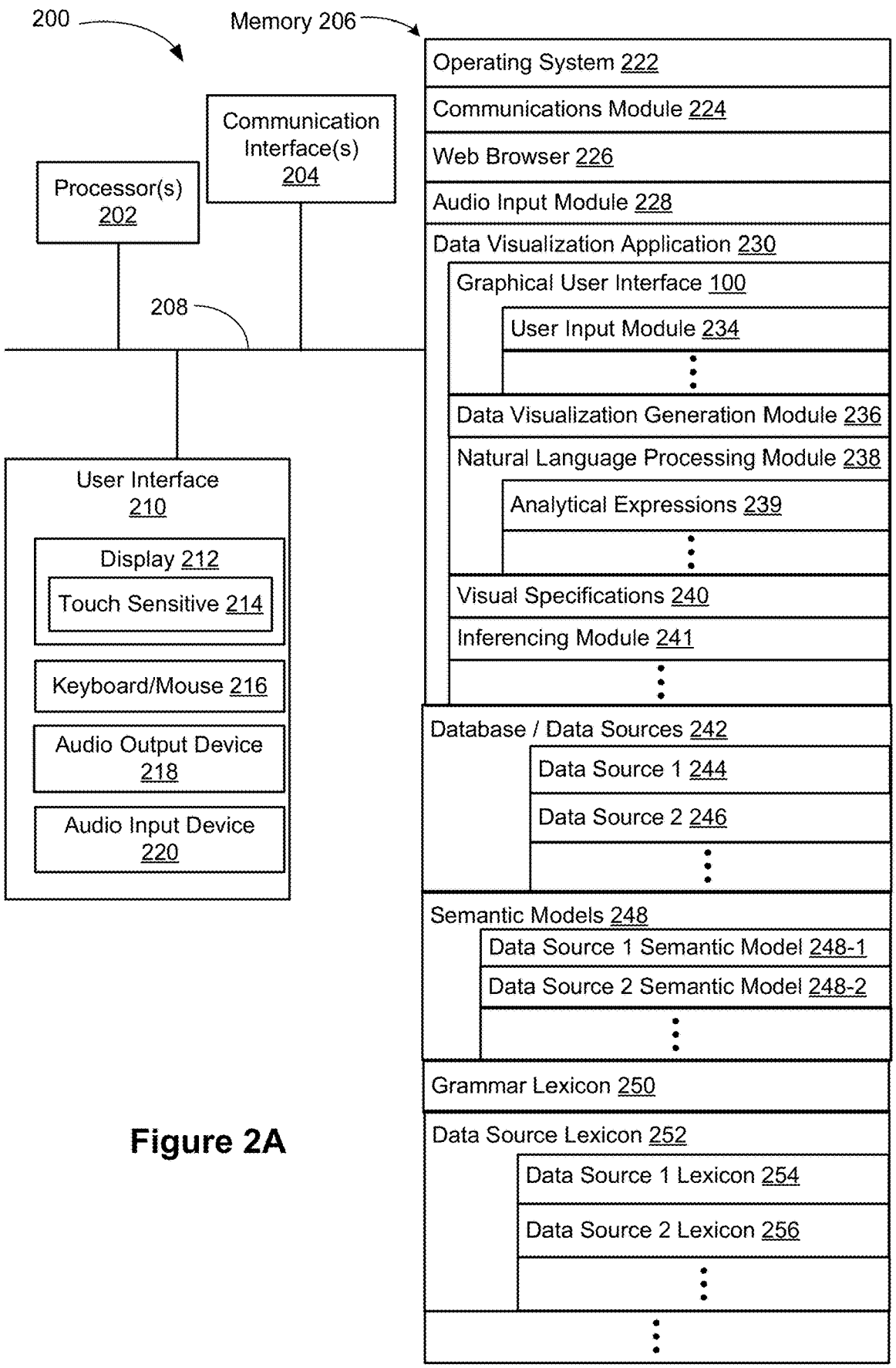
FIG. 2A is a block diagram of a computing device according to some implementations.

FIG. 2A is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. The communication buses 208 optionally include circuitry (sometimes called a chipset) that interconnects and controls communications between system components. The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone and voice recognition to supplement or replace the keyboard. In some implementations, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 206 includes one or more storage devices remotely located from the processor(s) 202. The memory 206, or alternatively the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

- an operating system 222, which includes procedures for handling various basic system services and for performing hardware dependent tasks;
- a communications module 224, which is used for connecting the computing device 200 to other computers and devices via the one or more communication interfaces 204 (wired or wireless), such as the Internet, other wide area networks, local area networks, metropolitan area networks, and so on;
- a web browser 226 (or other application capable of displaying web pages), which enables a user to communicate over a network with remote computers or devices;
- an audio input module 228 (e.g., a microphone module) for processing audio captured by the audio input device 220. The captured audio may be sent to a remote server and/or processed by an application executing on the computing device 200 (e.g., the data visualization application 230);
- a data visualization application 230 for generating data visualizations and related features. In some implementations, the data visualization application 230 also includes:
  - a graphical user interface 100 for a user to construct visual graphics. In some implementations, the graphical user interface includes a user input module 234 for receiving user input through the natural language box 124. For example, a user inputs a natural language command or expression into the natural language box 124 identifying one or more data sources 242 (which may be stored on the computing device 200 or stored remotely) and/or data fields from the data source(s). In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a stand-alone application (e.g., a desktop application). In some implementations, the data visualization application 230 executes within the web browser 226 or another application using web pages provided by a web server;
  - a data visualization generation module 236, which automatically generates and displays a corresponding visual graphic (also referred to as a "data visualization" or a "data viz") using the user input (e.g., the natural language input);
  - a natural language processing module 238 for processing (e.g., interpreting) natural language inputs (e.g., commands) received using the natural language box 124. In some implementations, the natural language processing module 238 parses the natural language command (e.g., into tokens) and translates the command into an intermediate language (e.g., ArkLang). The natural language processing module 238 includes analytical expressions 239 that are used by natural language processing module 238 to form intermediate expressions of the natural language command. The natural language processing module 238 also translates (e.g., compiles) the intermediate expressions into database queries by employing a visualization query language to issue the queries against a database or data source 242 and to retrieve one or more data sets from the database or data source 242;
  - visual specifications 240, which are used to define characteristics of a desired data visualization. In some implementations, the information the user provides (e.g., user input) is stored as a visual specification. In some implementations, the visual specifications 240 includes previous natural language commands received from a user or properties specified by the user through natural language commands. In some implementations, the visual specification 240 includes two or more aggregations based on different levels of detail. Further information about levels of detail can be found in U.S. patent application Ser. No. 14/801,750, filed Jul. 16, 2015, titled "Systems and Methods for using Multiple Aggregation Levels in a Single Data Visualization," which is incorporated by reference herein in its entirety;
  - an inferencing module 241, which is used to resolve underspecified (e.g., omitted information) or ambiguous (e.g., vague) natural language commands (e.g., expressions or utterances) directed to databases or data sources 242. As will be explained in further detail, the inferencing module 241 uses one or more inferencing rules based on syntactic and semantic constraints imposed by the intermediate language. In some implementations, the inferencing module 241 includes algorithms for intra-phrasal inferencing (e.g., handling underspecification within the analytical expressions 239). In some implementations, the inferencing module 241 further includes algorithms for inter-phrasal inferencing (e.g., handling underspecification between the analytical expressions 239). In some implementations, the inferencing module 241 further includes algorithms for handling underspecification in the analytical expressions when a user explicitly specifies a visualization type. In some implementations, the inferencing module 241 further includes algorithms for inferring reasonable defaults for vague (e.g., ambiguous) concepts such as "low," "expensive," and "popular';
- zero or more databases or data sources 242 (e.g., a first data source 244 and a second data source 246), which are used by the data visualization application 230. In some implementations, the data sources are stored as spreadsheet files, CSV files, XML files, flat files, or JSON files, or stored in a relational database. For example, a user selects one or more databases or data sources 242 (which may be stored on the computing device 200 or stored remotely), selects data fields from the data source(s), and uses the selected fields to define a visual graphic;
- zero or more semantic models 248 (e.g., a first semantic model 248-1 and a second semantic model 248-2), each of which is derived directly from a respective database or data source 242. The semantic model 248 represents the database schema and contains metadata about attributes. In some implementations, the semantic model 248 also includes metadata of alternative labels or synonyms of the attributes. The semantic model 248 includes data types (e.g., "text," "date," "geospatial," "Boolean," and "numeric"), attributes, (e.g., a currency type such as the United States Dollar), and a semantic role (e.g., "City" role for a geospatial attribute) for data fields of the respective database or data source 242. In some implementations, the semantic model 248 also captures statistical values (e.g., data distribution, range limits, average, and cardinality) for each attribute. In some implementations, the semantic model 248 is augmented with a grammar lexicon 250 that contains a set of analytical concepts 258 found in many query languages (e.g., average, filter, sort). In some implementations, the semantic model 248 also distinguishes between attributes that are measures (e.g., attributes that can be measured, aggregated, or used for mathematical operations) and dimensions (e.g., fields that cannot be aggregated except as count). Thus, the semantic model 248 helps with inferencing and choosing salient attributes and values;

a grammar lexicon 250, which includes analytical concepts 258 (see FIG. 2B) that are used to support the analytical expressions 239 for forming intermediate expressions; and zero or more data source lexicons 252 (e.g., a first data source lexicon 254 and second data source lexicon 256), each of which is associated with a respective database or data source 242. Details of the components of a data source lexicon are described in FIG. 2B.

Figure 2B:
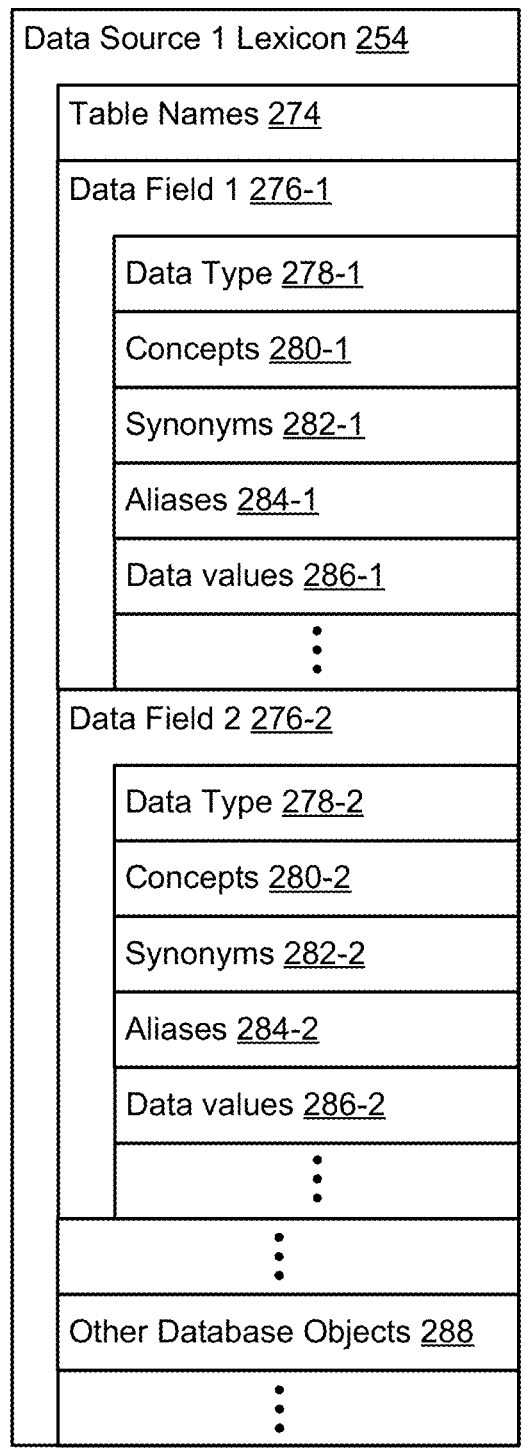
FIG. 2B is a block diagram illustrating components of a data source lexicon according to some implementations.

FIG. 2B is a block diagram illustrating components of a first data source lexicon 254, in accordance with some implementations. The first data source lexicon 254 includes table names 274 corresponding to names of one or more tables of the first data source 244, a plurality of data fields 276 of the first data source 244, and other database objects 288. Each data field 276 includes:

a data type 278, such as integer, string, date, or floating point numeric;

One or more concepts 280 that are used to interpret the data field. For example, a data field "Michael" may be interpreted using the concepts such as a "string," "name," "gender (e.g., male)," "singer," "basketball player," and/or "chef." In some implementations, the one or more concepts are derived from elastic searches;

One or more synonyms 282, which are defined by the system. For example, a data field "average" may include synonyms such as "mean" and "avg";

One or more aliases 284, which are defined by the user. For example, a data field "goods" may include aliases such as "widgets," "bananas," and "my favorite field"; and data values 286 (e.g., for low cardinality string fields).

In some implementations, the data source lexicon 254 includes other database objects 288 as well.

Figure 2C:
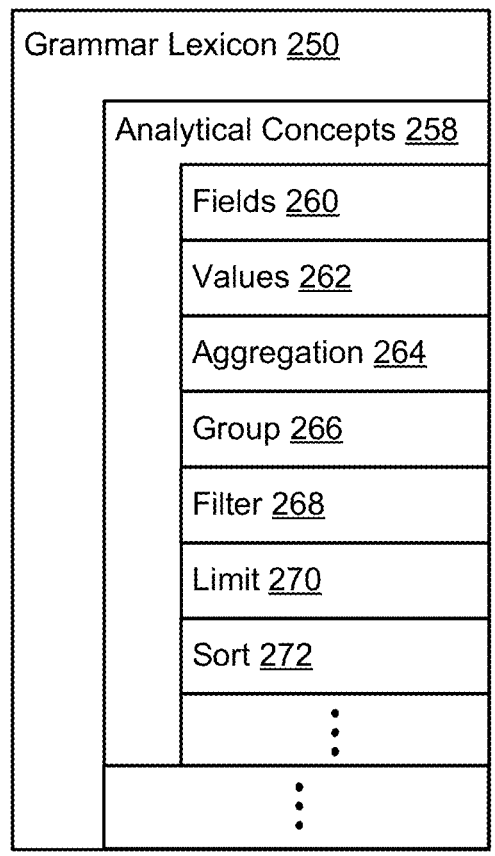
FIG. 2C is a block diagram illustrating sub-modules of a grammar lexicon according to some implementations.

FIG. 2C is a block diagram illustrating components of the grammar lexicon 250 according to some implementations. In some implementations, the grammar lexicon comprises analytical concepts 258 that support the formation of analytical expressions 239. The analytical concepts 258 include:

a field 260 concept, which is a finite set of database attributes. Examples of field concepts include "sales," and "product category";

a value 262 concept, which is a finite set of database values. Examples of value concepts include "$100" and "Avery Leckman";

an aggregation 264 concept, which is a finite set of operators where the values of multiple rows are grouped together to form a single value based on a mathematical operation. Examples of aggregation concepts include "average," "median," "count," "distinct count";

a group 266 concept, which is a finite set of operators that partitions the data into categories shown in a data visualization. An example of a group concept includes "by" a field;

a filter 268 concept, which is a finite set of operators that returns a subset of the field's domain. Examples of filter concepts "filter to," "at least," "between," "at most";

a limit 270 concept, which is a finite set of operators (akin to the filters 268) that returns a subset of the field's domain, restricting up to n rows, where $1 \leq n \leq N$, and N is the total number of rows in the domain. Examples of limit concepts include "top" and "bottom"; and a sort 272 concept, which is a finite set of operators that arranges data rows in an order. Examples of sort concepts include "ascending," "descending," and "alphabetical."

ArkLang can be generated from a set of semantic models (e.g., the semantic model 248) representing their corresponding database, a context-free grammar (CFG), and a set of semantic constraints. In some implementations, a dialect of ArkLang is a set of all syntactically valid and semantically meaningful analytical expressions that can be generated by fixing a particular semantic model and leveraging the context-free grammar and a fixed set of semantic heuristics.

In some implementations, canonical representations are assigned to the analytical expressions 239 (e.g., by the natural language processing module 238) to address the problem of proliferation of ambiguous syntactic parses inherent to natural language querying. The canonical structures are unambiguous from the point of view of the parser and the natural language processing module 238 is able to choose quickly between multiple syntactic parses to form intermediate expressions.

FIG. 2D is a block diagram illustrating analytical expressions 239 of the natural language processing module 238, in accordance with some implementations. The analytical expressions along with their canonical forms in the dialect of ArkLang include:

aggregation expressions 290: these are in the canonical form [agg att], where agg∈Aggregations and att is an Attribute. An example of an aggregation expression is "average Sales" where "average" is agg and "Sales" is att;

group expressions 292: these are in the canonical form [grp att], where grp∈Groups and att is an attribute. An example of a group expression is "by Region" where "by" is grp and "Region" is att;

filter expressions 294: these are in the canonical form [att filter val], where att is an attribute, filter∈Filters, and val∈Values. An example of a filter expression is "Customer Name starts with John" where "Customer" is att, "starts with" is filter, and "John" is val;

limit expressions 296: these are in the canonical form [limit val ge ae], where limit∈Limits, val∈Values, ge∈group expressions, and ae∈aggregation expressions. An example of a limit expression is "top 5 Wineries by sum of Sales" where "top" is limit, "5" is val, "Wineries" is the attribute to group by, and "sum of Sales" is the aggregation expression; and sort expressions 298: these are in the canonical form [sort ge ae], where sort∈Sorts, ge∈group expressions, and ae∈aggregation expressions. An example of a sort expression is "sort Products in ascending order by sum of Profit" where "ascending order" is the sort, "Products" is the attribute to group by, and "sum of Profit" is the aggregation expression.

In some implementations, the computing device 200 also includes other modules such as an autocomplete module, which displays a dropdown menu with a plurality of candidate options when the user starts typing into the input box 124, and an ambiguity module to resolve syntactic and semantic ambiguities between the natural language commands and data fields (not shown). Details of these sub-modules are described in U.S. patent application Ser. No. 16/134,892, titled "Analyzing Natural Language Expressions in a Data Visualization User Interface, filed Sep. 18, 2018, which is incorporated by reference herein in its entirety;

Although FIGS. 2A-2D show a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

FIG. 3 illustrates an exemplary data source 310 (e.g., the database or data source 242 in FIG. 2A) describing wine vintages, prices, and reviews (e.g., on a 0-100-point scale). In this example, the data source 310 is a partial view of an entire data source (e.g., the data source 242). In other words, the complete data source contains more data columns and rows than is shown in FIG. 3. Further, in this example, the data source 310 is a data structure (e.g., spreadsheet) that includes a plurality of data values stored in data columns. In some implementations, the data source 310 is a raw (e.g., original or unformatted) data source. In this example, the data source fields are un-aggregated.

Analytical Expressions

FIGS. 4A-4K illustrate displays of visual representations based on the data source 310, in response to natural language commands entered by a user, using the intermediate language as a backdrop. Further details about the command processing using the intermediate language are explained in U.S. patent application Ser. No. 16/166,125, filed Oct. 21, 2018, titled "Determining Levels of Detail for Data Visualizations Using Natural Language Constructs," which is incorporated by reference herein in its entirety.

Figure 4A:
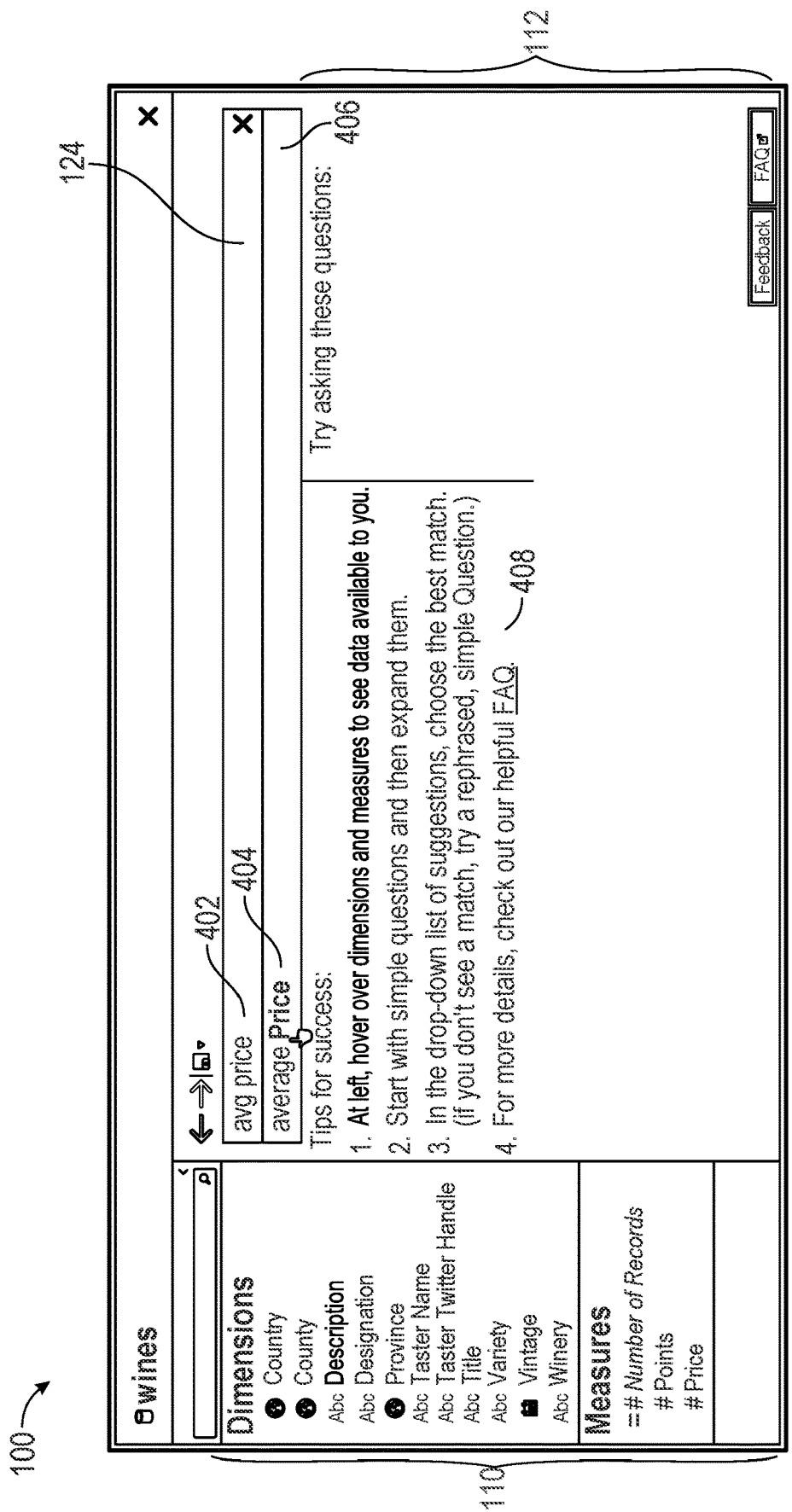
FIGS. 4A-4K illustrate displays of visual representations based on the data source of FIG. 3, in response to natural language commands entered by a user, according to some implementations.

FIG. 4A illustrates a user interaction with the graphical user interface 100. In this example, the user inputs (e.g., enters or types) a natural language expression (e.g., a natural language command) 402 "avg price" in the command box 124. Typically, the natural language expression includes one or more terms that identify data fields from a data source (e.g., the data source 310). A term may be a dimension (e.g., categorical data) or a measure (e.g., a numerical quantity). As illustrated by the example, the natural language input typically includes one or more terms.

In some implementations, and as described in U.S. patent application Ser. No. 16/166,125, the natural language processing module 238 parses the command "avg price" into the tokens "avg" and "price." The natural language processing module 238 uses a lexicon (e.g., the first data source lexicon 254) corresponding to the data source 310 and identifies that the token "avg" is a synonym of the word "average". The natural language processing module 238 further identifies that the term "average" specifies an aggregation type, and the token "price" specifies the data field to be aggregated. The user interface 100 returns (e.g., displays) one or more interpretations (e.g., intermediate expressions) 404 for the natural language command. In this example, the interface 100 displays "average Price" in a dropdown menu 406 of the graphical user interface. In some implementations and as illustrated in FIG. 4A, the data visualization region 112 also displays guidelines 408 (e.g., tips or pointers) to assist the user in navigating the user interface.

Figure 4B:
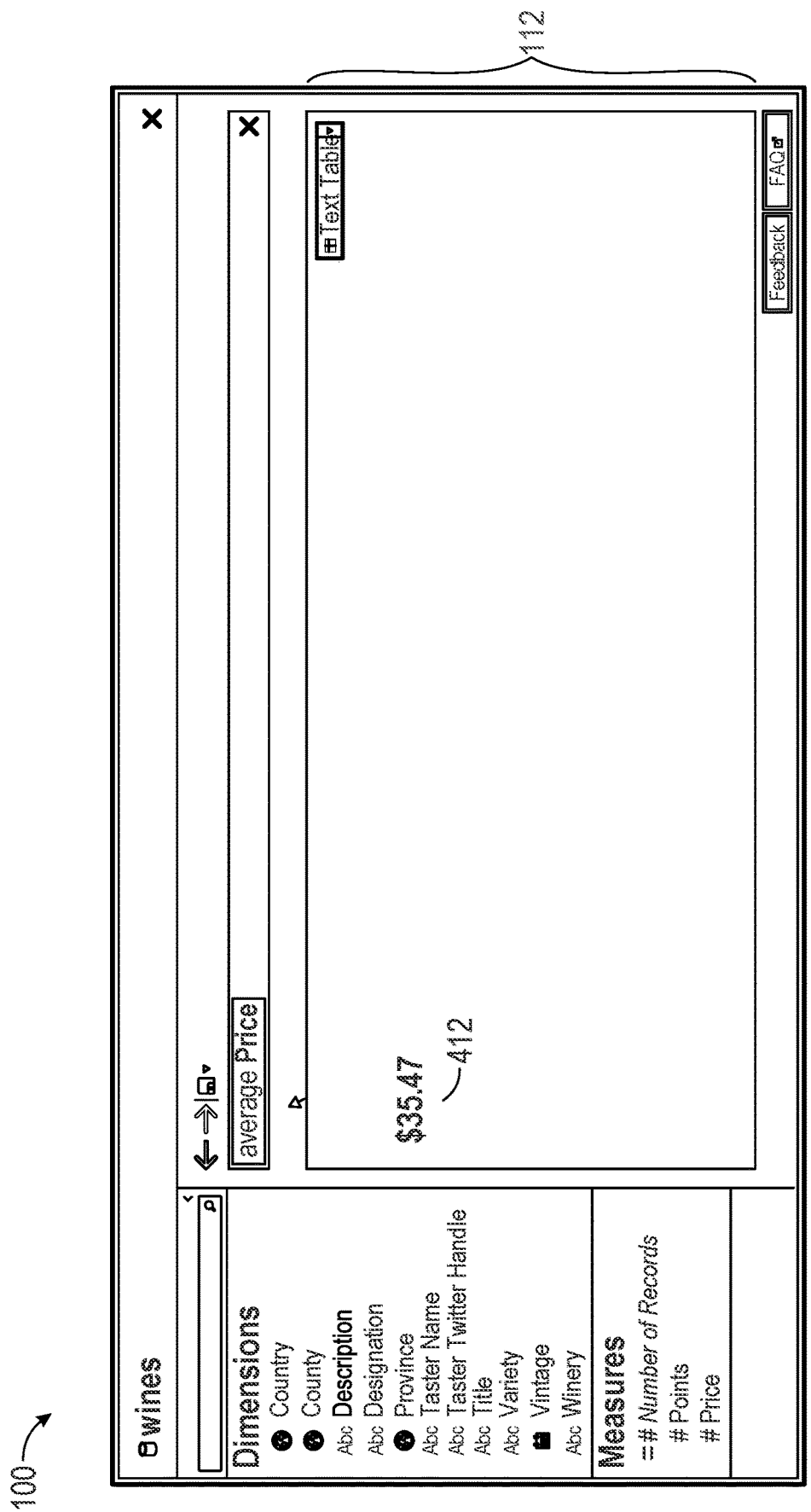

FIG. 4B illustrates a data visualization 412 (e.g., a text table) "$35.47" that is automatically generated and displayed in the graphical user interface 100 in response to user selection of the interpretation 404 "average Price".

Figure 4C:
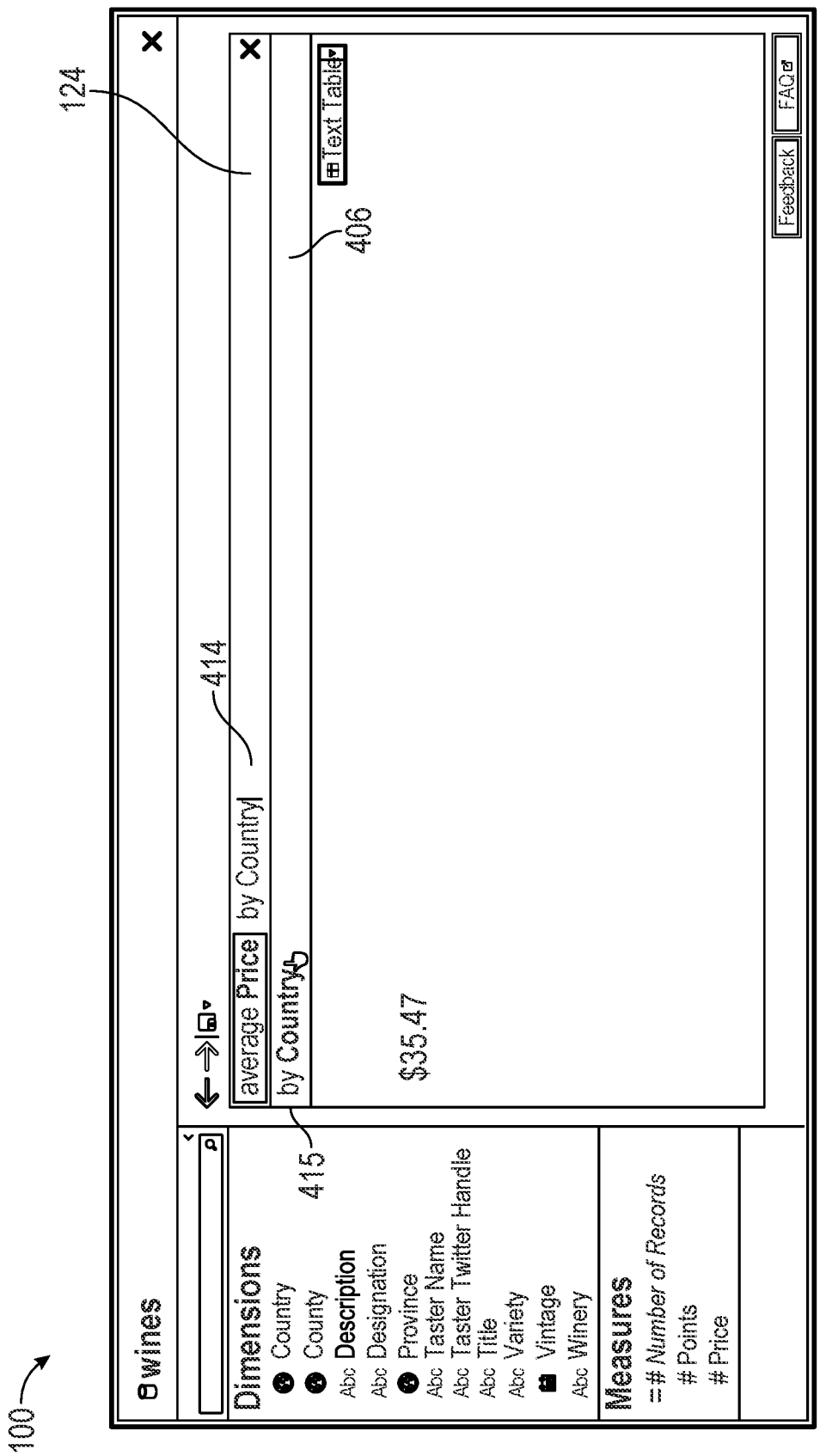

FIG. 4C illustrates another user interaction with the graphical user interface 100. In this example, the user inputs a natural language command 414 "by country" in the command box 124, adjacent to the existing expression "average price." In response to the command 414, the user interface 100 displays an interpretation 415 "by Country" in the dropdown menu 406.

Figure 4D:
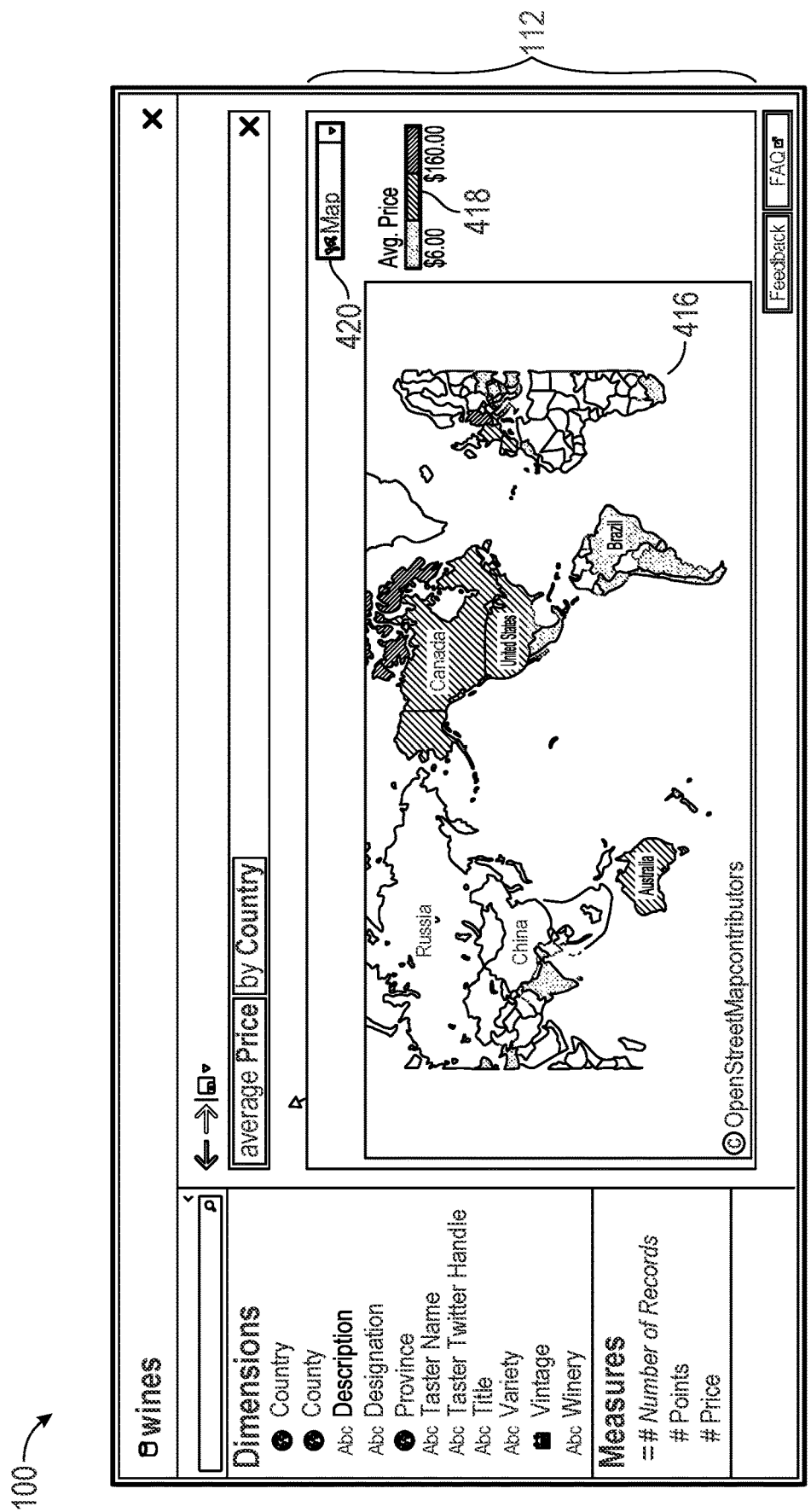

FIG. 4D illustrates a data visualization that is automatically generated and displayed in the graphical user interface 100 in response to user selection of the interpretation "by Country." In this example, the natural language processing module 238 concatenates the analytical expressions corresponding to the phrases "average price" (e.g., an aggregation expression) and "by Country" (e.g., a group expression). The application computes the average price of wine by country and displays a map 416 in which the average wine prices by country are represented by different colors (e.g., shades) on the map. The data visualization region 112 also includes a legend 418 that provides information about the average prices corresponding to different colors (e.g., shades) on the map. In some implementations, the type of data visualization may be changed by using a view type selector 420. For example, the view type of the data visualization in FIG. 4D is a map. Additional view types of data visualizations are available, such as a "line chart," "bar chart," "scatter plot," "Gantt chart," "pie chart," "histogram," or "tree map." In some implementations, the default view type is selected (e.g., displayed) based on the input. In some implementations, the default view type is selected based on a top-ranked visualization type as determined according to data types of the user-selected data fields, as described in U.S. Pat. Nos. 8,099,674 and 9,924,318, each of which is incorporated by reference in its entirety.

Figure 4E:
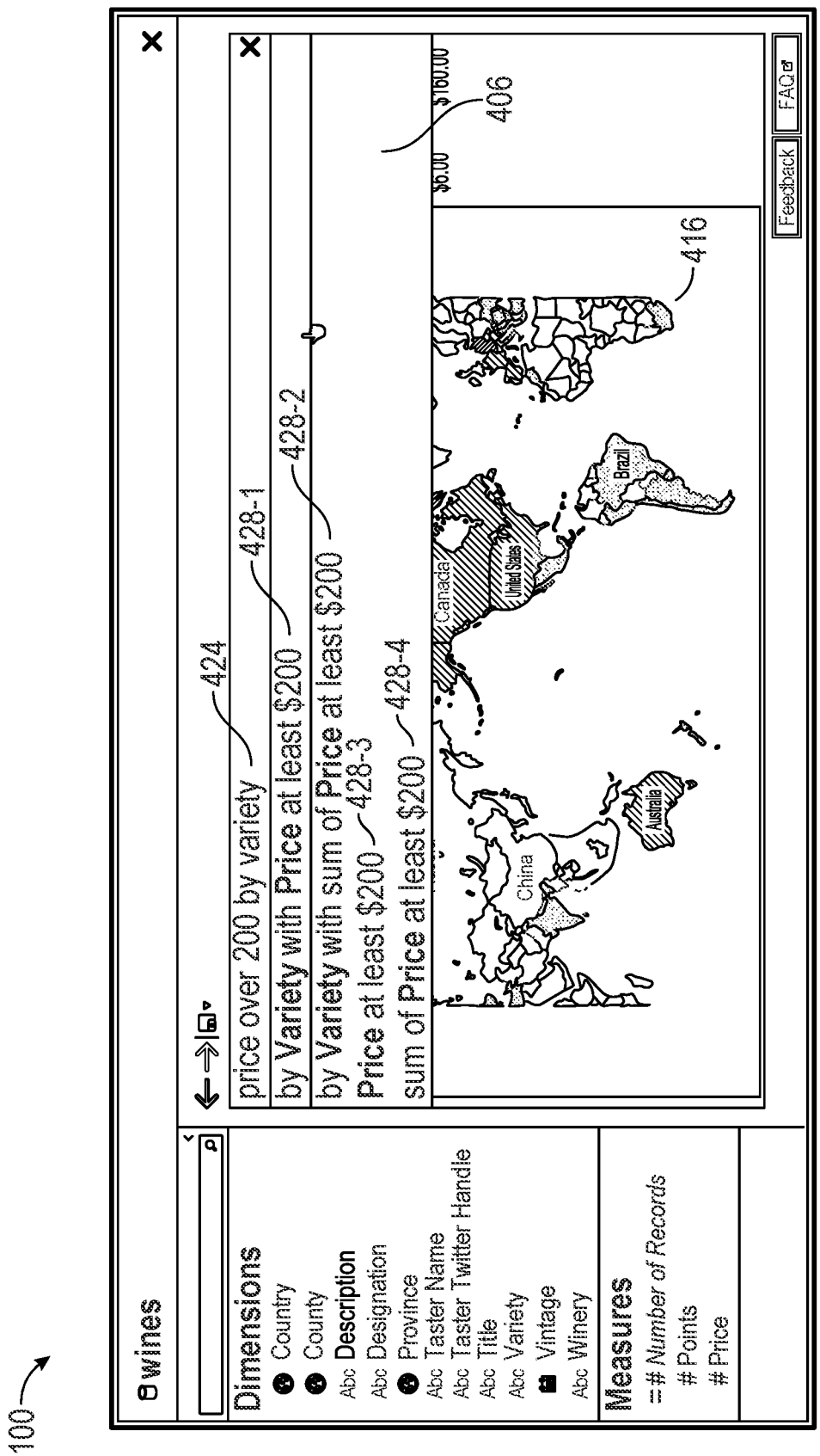

FIG. 4E illustrates another user interaction with the graphical user interface 100. In this example, the user enters a command 424 "price over 200 by variety" in the command box 124. In some implementations, and as described in U.S. patent application Ser. No. 16/166,125, the natural language processing module 238 combines adjacent words (e.g., "price over 200") into a phrase and determines a function for the phrase. In this example, the natural language processing module 238 interprets the phrase "price over 200" as having a filter concept. In response to the interpretation, the user interface 100 displays in the dropdown menu 406 a first option 428-1 "by Variety with Price at least $200," a second option 428-2 "by Variety with sum of Price at least $200," a third option 428-3 "Price at least $200," and a fourth option 428-4 "sum of Price at least $200."

Figure 4F:
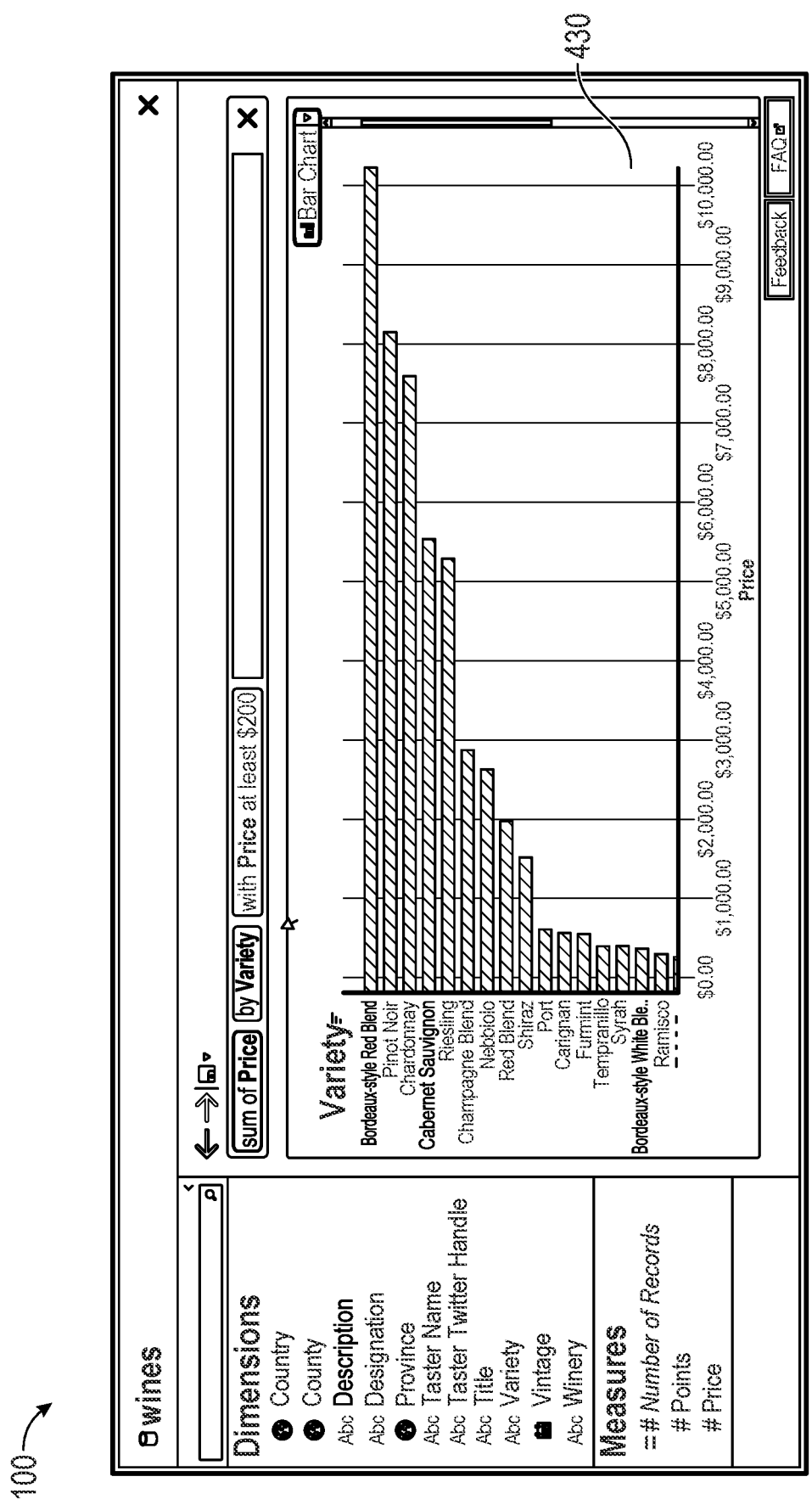

FIG. 4F illustrates a data visualization 430 (e.g., a horizontal bar graph) that is automatically generated and displayed in the graphical user interface 100 in response to user selection of the second option 428-2 "by Variety with sum of Price at least $200." Here, the data visualization 430 is a visual representation of an aggregation ("sum") of a measured value ("price") on one axis (e.g., the x-axis) and the dimension ("variety") on the other axis (e.g., y-axis). A filter ("price at least $200") is also applied to the dataset so that only wine varieties with price at least $200 are displayed in the visualization.

Figure 4G:
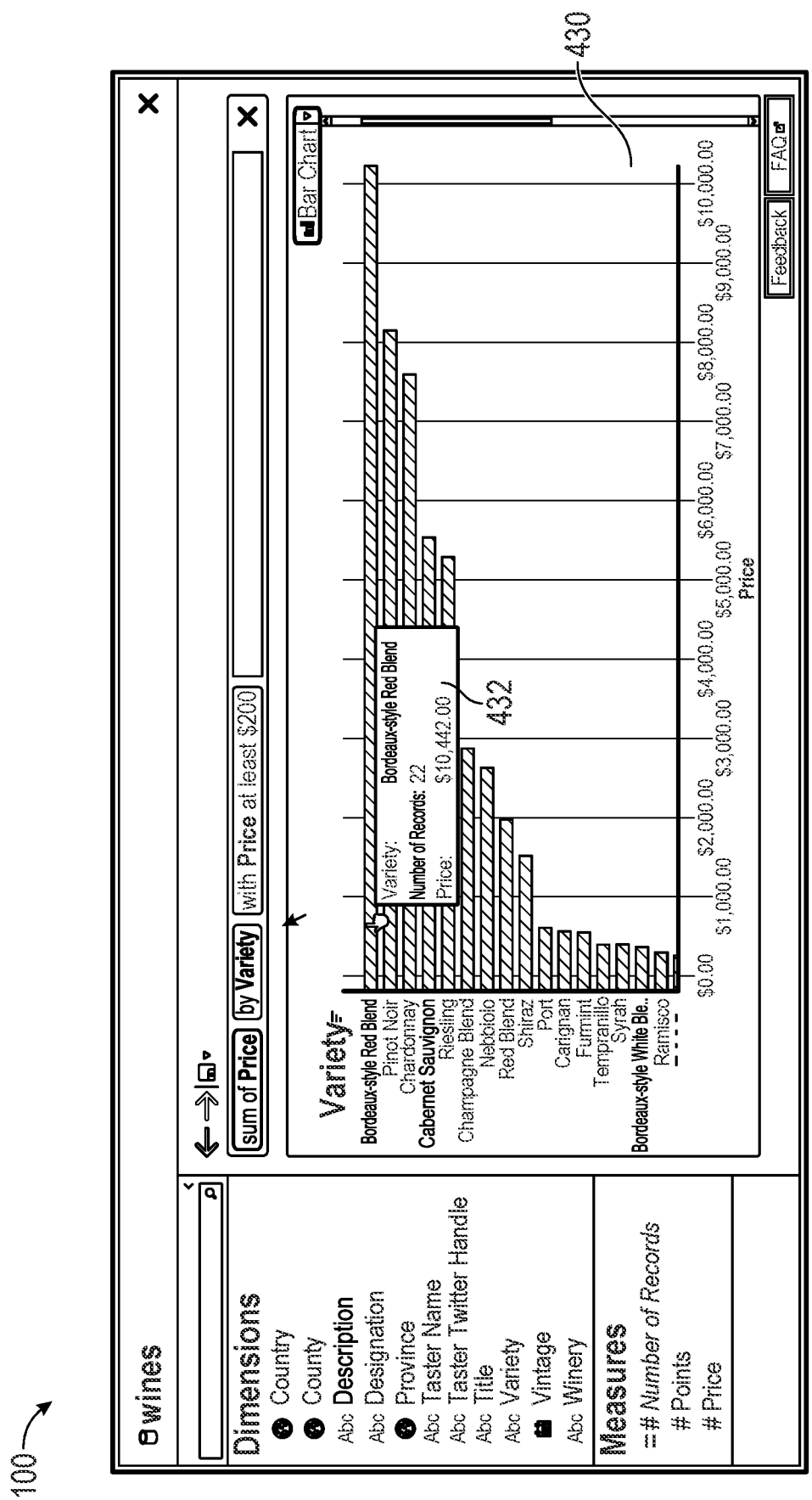

In some implementations, as illustrated in FIG. 4G, the user interface 100 displays a tooltip popup 432, which includes information about a selected visual (data) mark (e.g., in response to hovering over the first bar). In some instances, the tooltip 432 is activated when the user selects a data field on the bar graph (e.g., moving the cursor over a particular visual mark). In this example, the tooltip 432 in FIG. 4F includes "Variety: Bordeaux-style Red Blend," "Number of Records: 22," and "Price: $10,442,00."

Figure 4H:
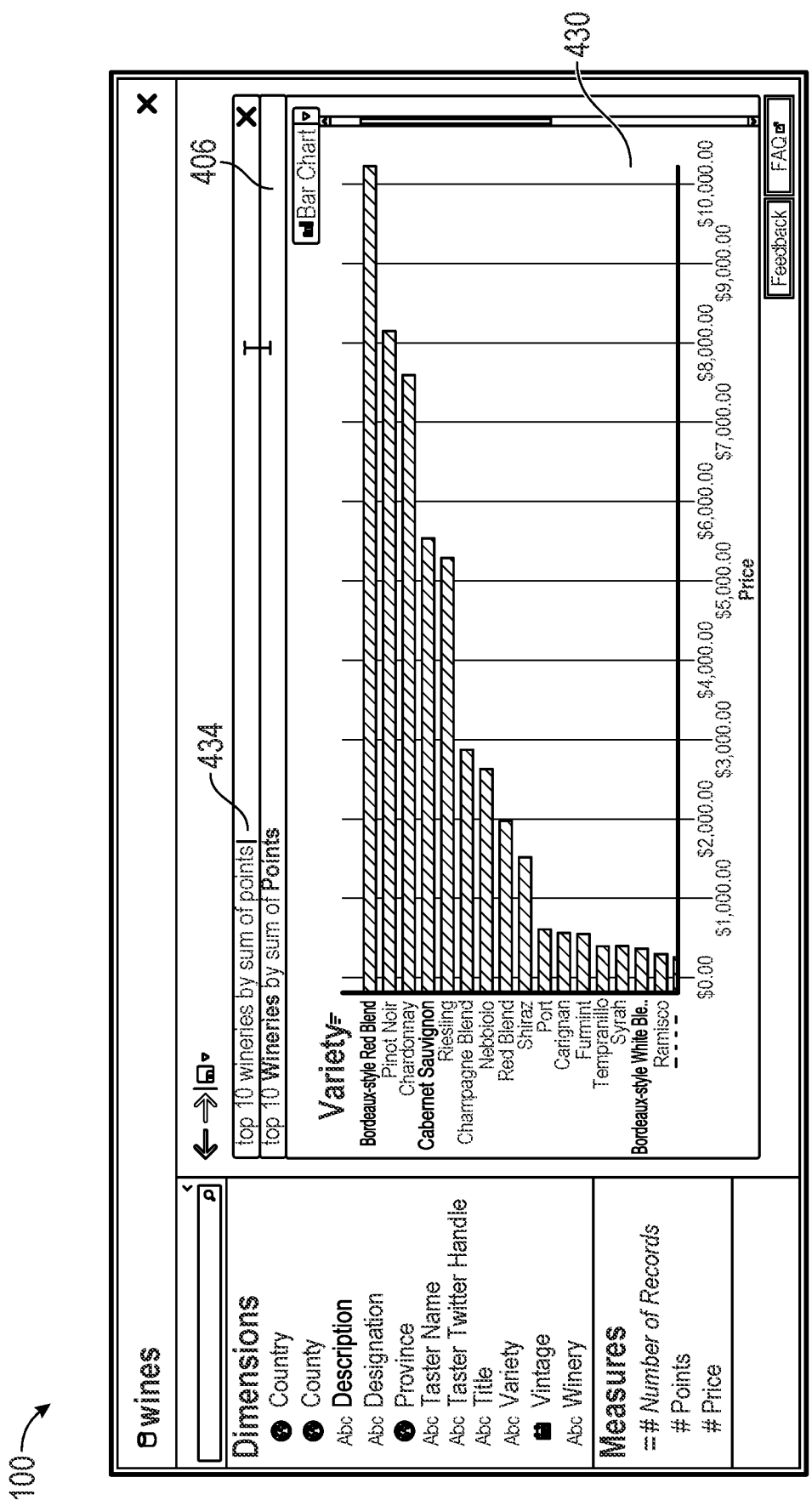
Figure 4I:
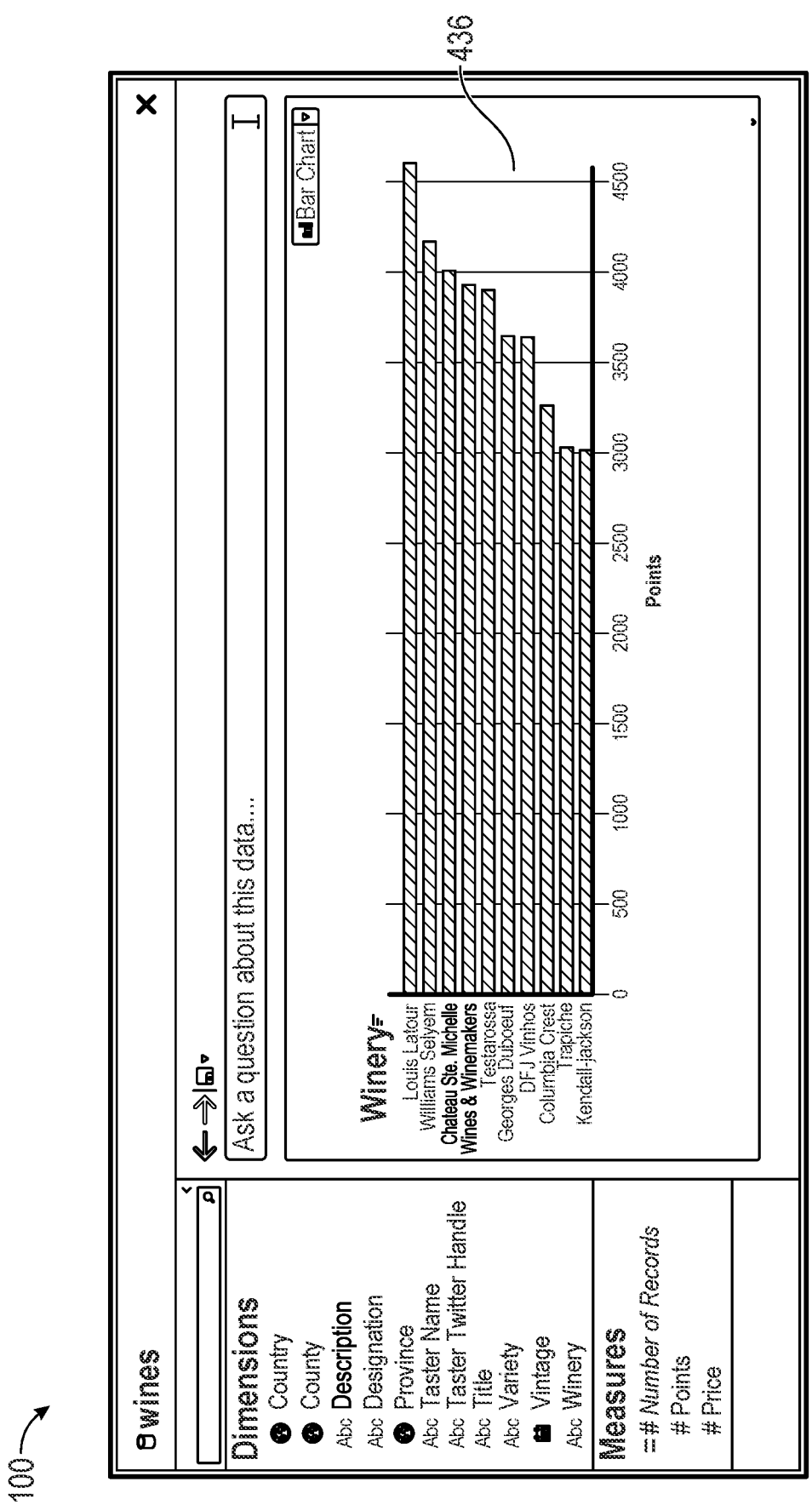

FIG. 4H illustrates user input of a natural language command 434 "top 10 wineries by sum of points." In this example, the natural language processing module 238 identifies that the command includes a limit concept and returns a subset of the data field "winery," restricting the subset to at most 10 rows. FIG. 4I illustrates display of a data visualization 436 (e.g., a horizontal bar graph) on the graphical user interface 100. The data visualization 436 identifies 10 wineries and displays them in a descending order based on "sum of points."

Figure 4J:
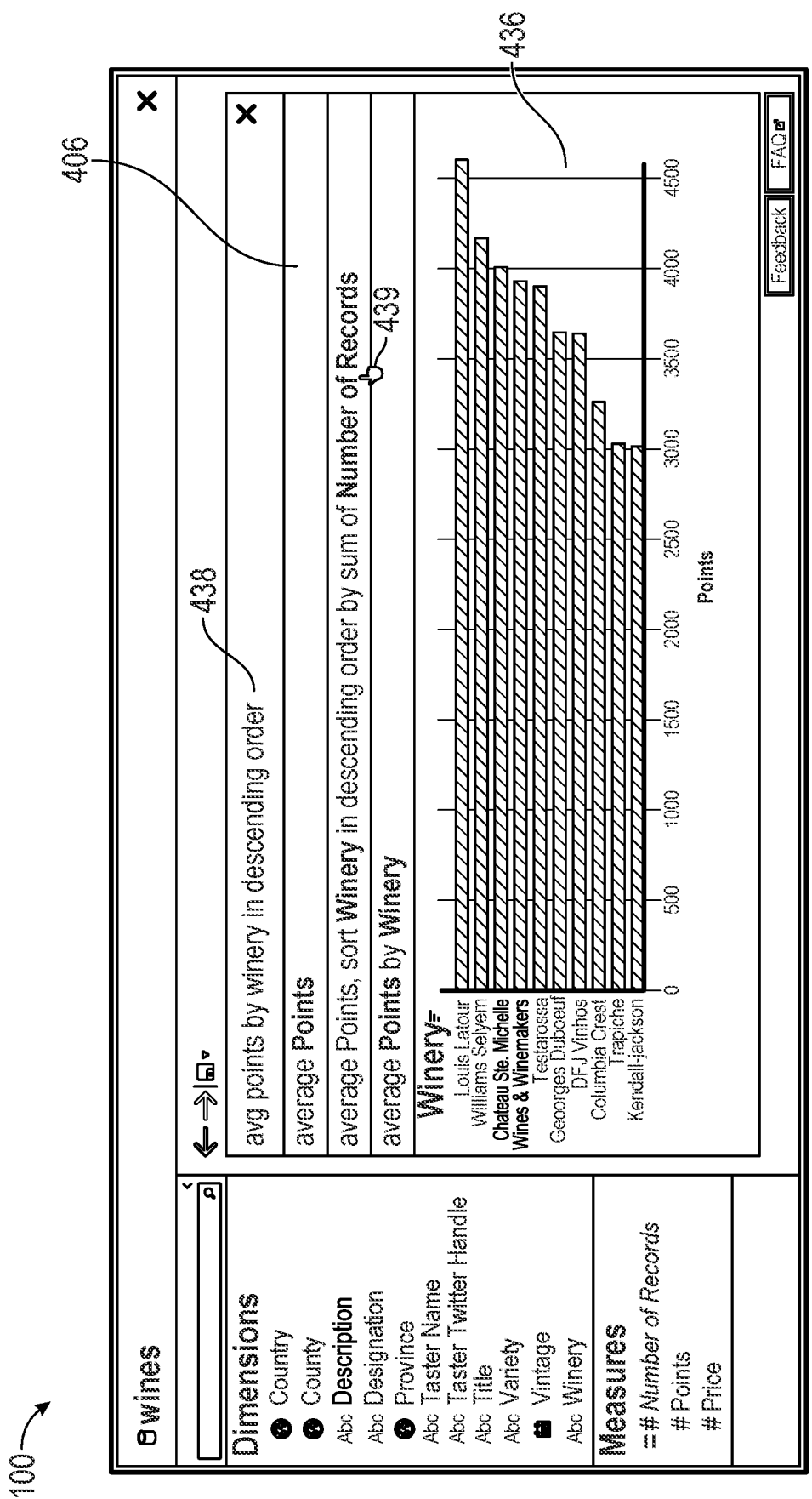
Figure 4K:
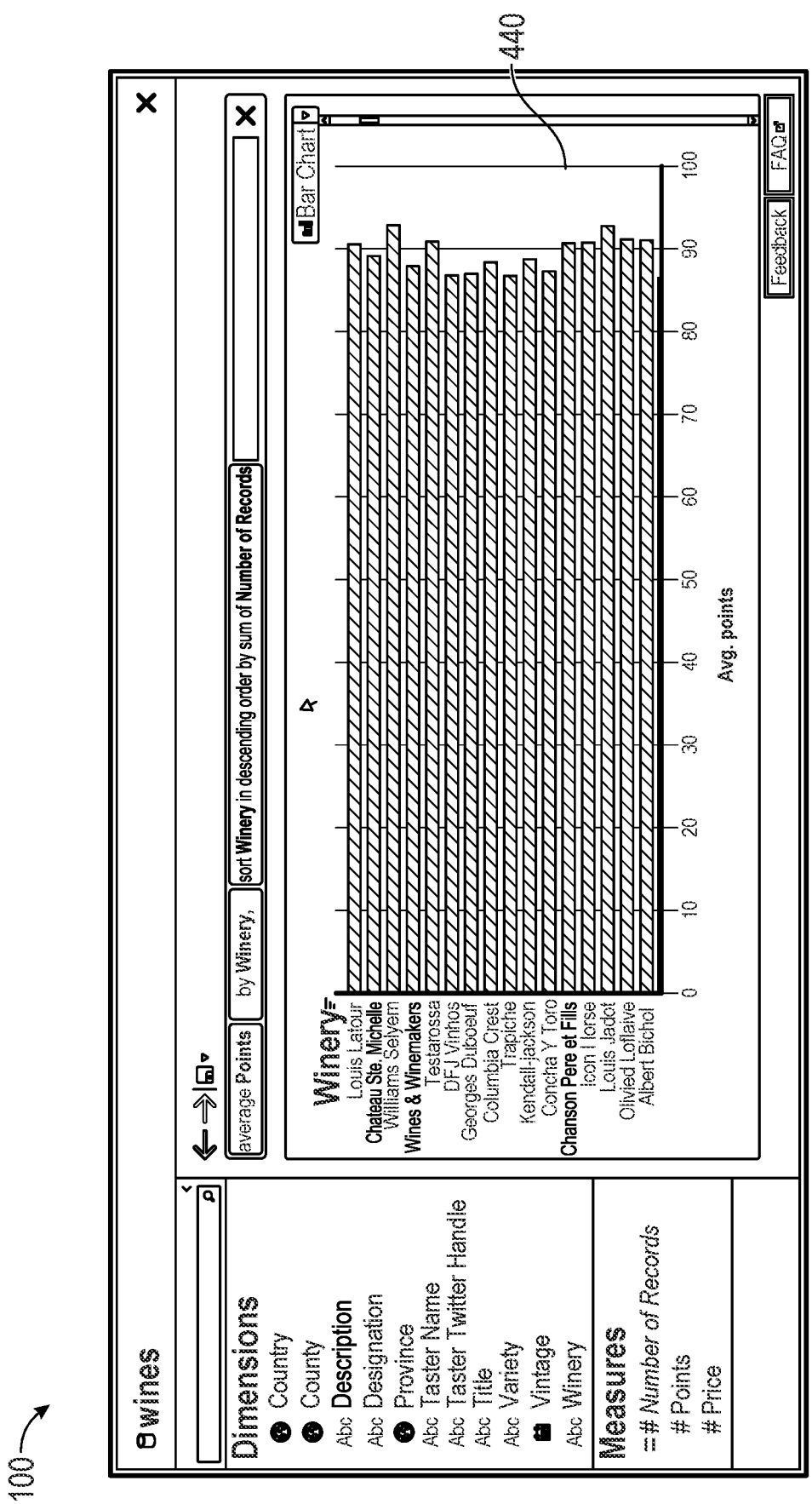

FIG. 4J illustrates user input of a natural language command 438 "avg points by winery in descending order" in the graphical user interface 100. The word "descending" corresponds to a sort concept in which data rows are arranged in an order. In response to user selection 439 of the option "average Points, sort Winery in descending order by sum of Number of Records," the graphical user interface 100 displays an updated data visualization 440, as illustrated in FIG. 4K.

Intra-Phrasal Inferencing

Intra-phrasal inferencing relies on constraints imposed by the syntactic and semantic structure of underspecified expressions. In some implementations, for each of the analytical expressions 239, a finite set of variables of that type (e.g., aggregation, group, filter, limit, sort) is assumed. For example, for the group expression, the variables are $g_1, \ldots, g_n$ for n≤ω. An expression is underspecified if the expression contains at least one free variable. For example, an underspecified aggregation expression is of the form [average, x], where x is a Field variable. While the aggregation, ("average"), in this expression is defined, its Field is not—it is the free variable x. Similarly, [sales, at least, y], is an underspecified filter expression where y is a Value variable.

Intra-phrasal inferencing is the process of instantiating an open variable in an intermediate expression with a non-logical constant of that type. In some implementations, intra-phrasal inferencing is referred to as the function Intra and is defined, in part, as follows:

If [average, x] is a underspecified aggregation expression and x is a free variable of type Field, then Intra ([average, x])=[average, sales] is a fully specified aggregation expression;

If [x, country] is a underspecified group expression and x is a free variable of type Group, then Intra([x, country]) =[by, country] is a fully specified group expression.

If [sales, at least, x] is a underspecified filter expression and x is a free variable of type Value, then Intra([sales, at least, x])=[average, sales, $100] is a fully specified filter expression.

If [x, 10, by, country, average, sales] is a underspecified limit expression and x is a free variable of type Limit, then Intra([x, 10, by, country, average, sales])=[top, 10, by, country, average, sales] is a fully specified limit expression.

If [by, country, x, average, sales] is a underspecified sort expression and x is a free variable of type Sort, then Intra([by, country, x, average, sales])=[by, country, descending, average, sales] is a fully specified sort expression.

FIGS. 5A-5J provide a series of screenshots that illustrate intra-phrasal inferencing based on the data source 310 in FIG. 3, in accordance with some implementations.

Figure 5A:
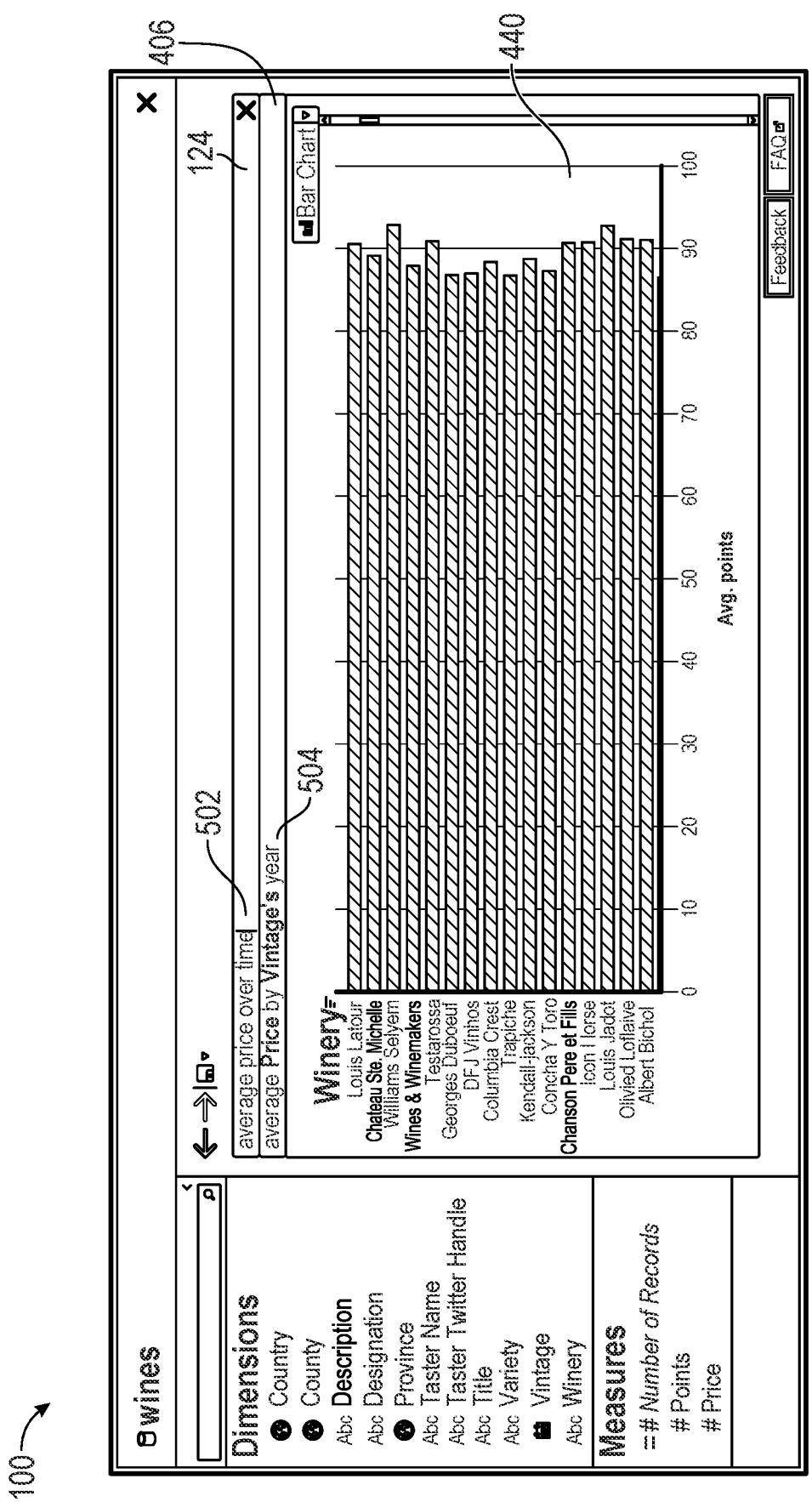
FIGS. 5A-5J provide a series of screenshots that illustrate intra-phrasal inferencing, in accordance with some implementations.

FIG. 5A illustrates a user interaction with the graphical user interface 100. In this example, the user inputs a natural language command 502 "average price over time" in the natural language input box 124. In this example, "average price" is an aggregation expression and "time" is a free (e.g., open) variable of the type field. In response to the command and in accordance with the Intra function described above, the inferencing module 241 instantiates the free variable "year" by inferring a time attribute (e.g., a field) "by Vintage's year," as illustrated in the displayed interpretation 504.

Figure 5B:
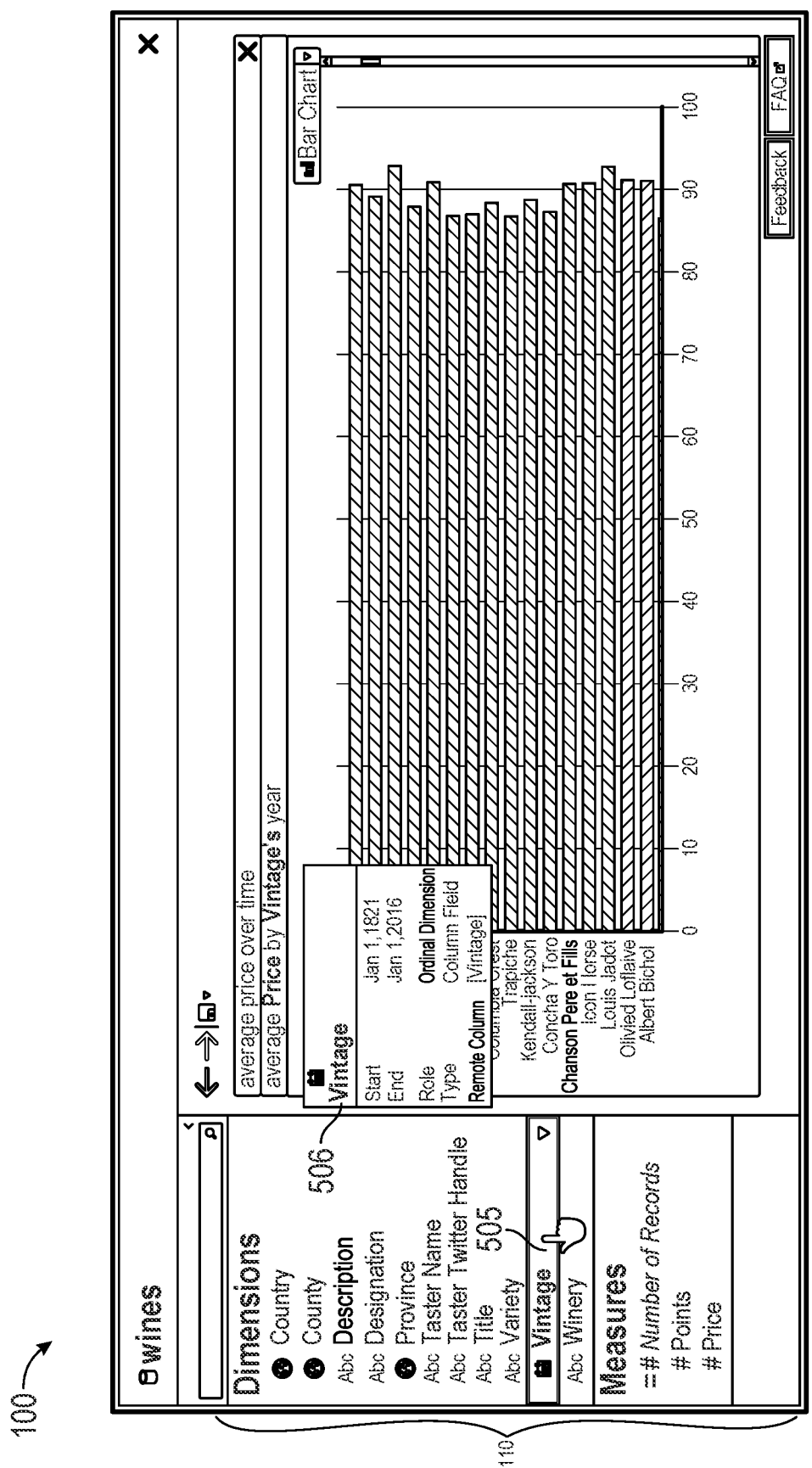

In some implementations, responsive to the interpretation 504, the user may navigate a cursor 505 to the data field "Vintage" in the schema information region 110 to find out more information about inferred data field "Vintage," as illustrated in FIG. 5B. In some implementations, the user interface 100 displays the additional information as a popup window 506.

Figure 5C:
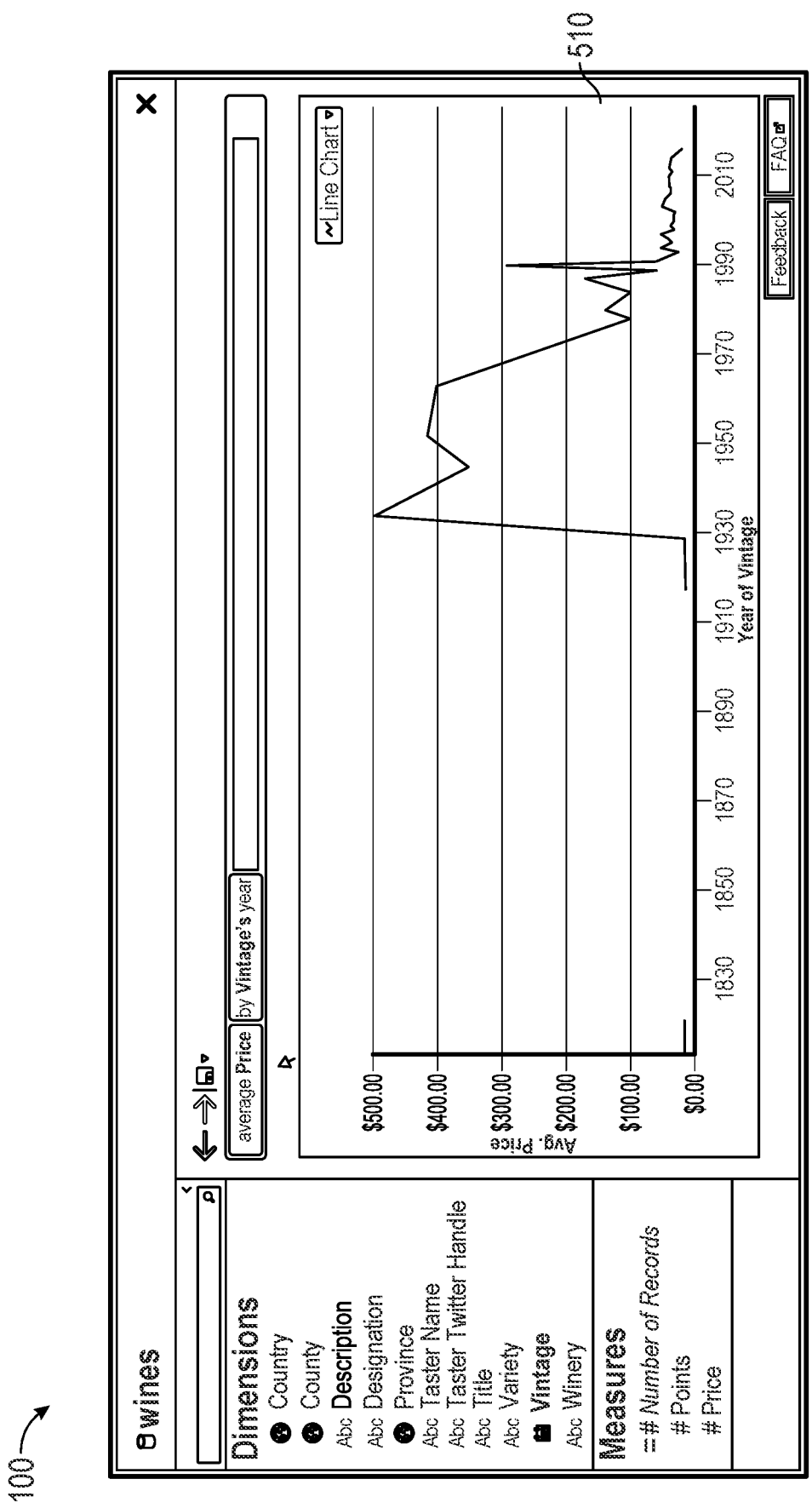

FIG. 5C shows a data visualization 510 (e.g., a time-series line chart) that is displayed in the user interface 100 in response to user selection of the interpretation 504. In some implementations, when the natural language command includes a time concept but the user does not specify a date or time field in the command, the inferencing module 241 infers a date or time field to create a valid interpretation.

Figure 5D:
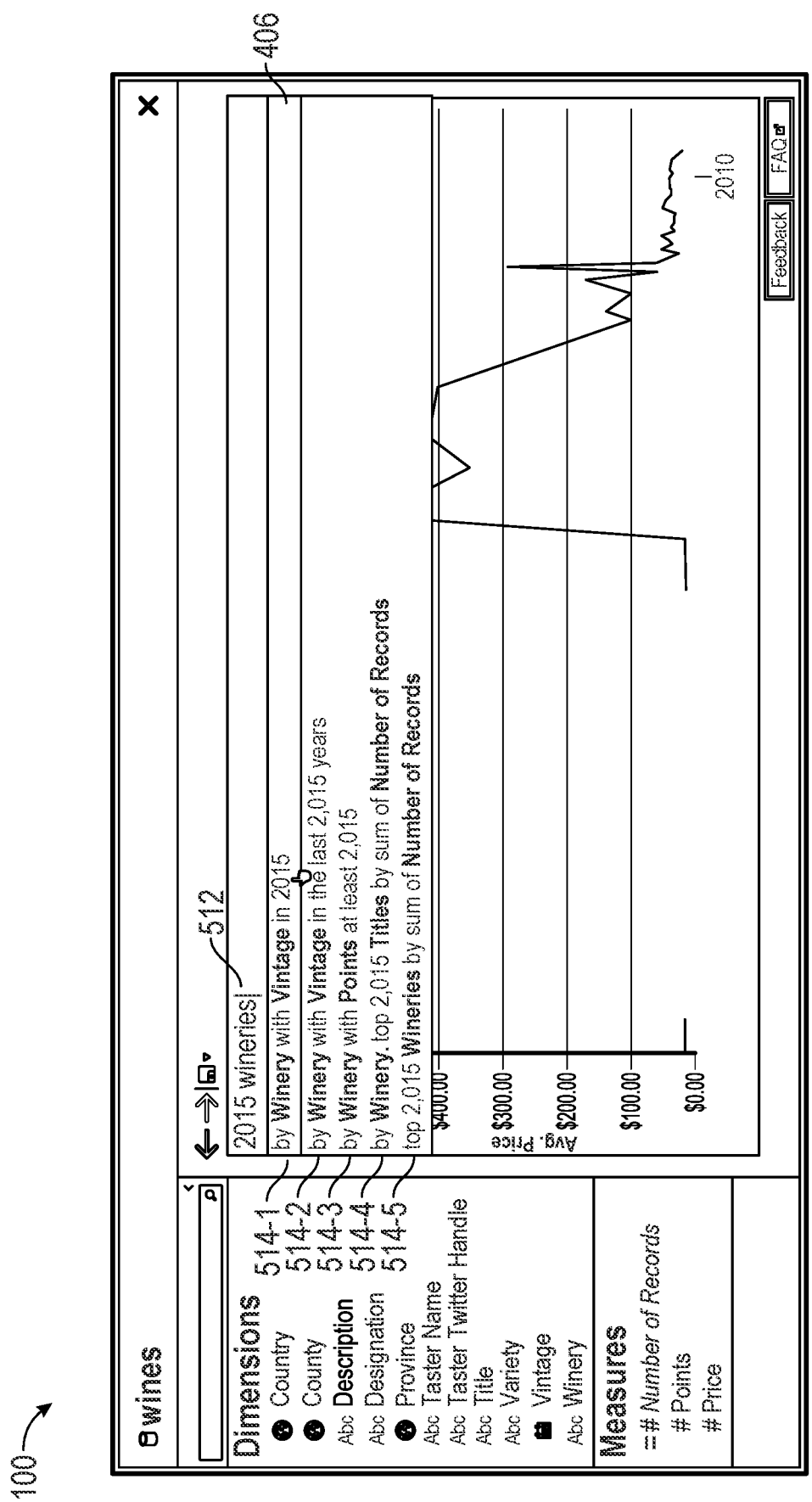

FIG. 5D illustrates another user interaction with the graphical user interface 100. In this example, the user inputs a natural language command 512 "2015 wineries." In this example, "2015" is a free variable. It may be of type field (e.g., the year 2015), type filter (e.g., at least 2015 points), type value (e.g., 2015 points), or type limit (e.g., top 2015). Accordingly, the inferencing module 241 provides several interpretations 514 (e.g., suggestions or options) for the numerical expression "2015," including a first option 514-1 "Vintage in 2015" representing the type field, a second option 514-2 "Vintage in the last 2015 years" representing the type limit, a third option 514-3 "Points at least 2015" representing the type value, a fourth option 514-4 "Top 2015 titles" representing the type limit, and a fifth option 514-5 "top 2015 wineries" representing the type limit.

Figure 5E:
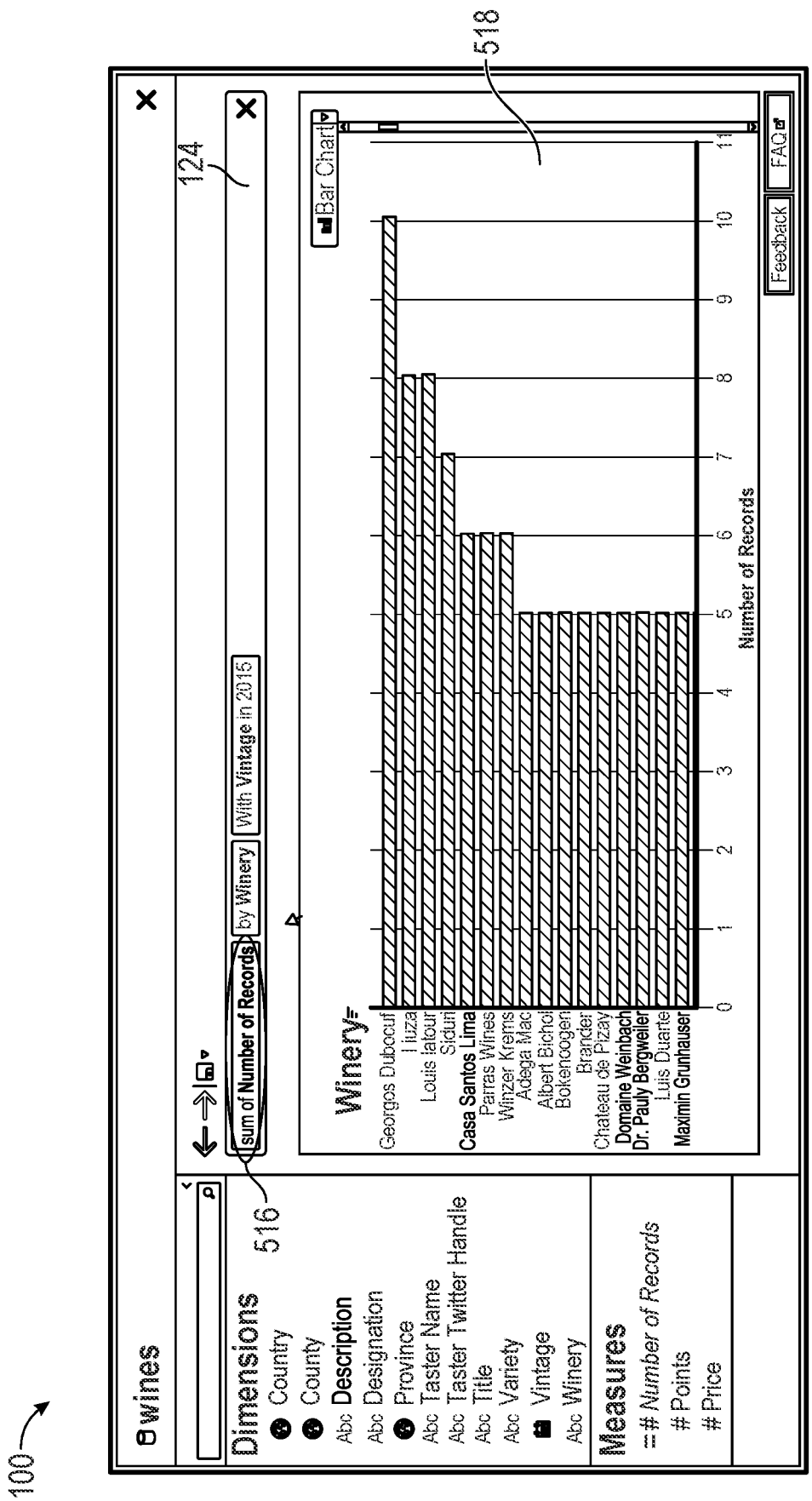

In response to user selection of the first option 514-1 "by Winery with Vintage in 2015," and as illustrated in FIG. 5E, an additional phrase (e.g., expression) 516 "sum of Number of Records" that was not previously found in the interpretations 514 is identified (e.g., by the inferencing module 241) and displayed in the input box 124. In some implementations, the inferencing module 241 establishes an inferencing rule that infers SUM(NumberOfRecords) when a user does not specify an aggregation expression. In this example, the limit expression "by Winery with Vintage in 2015" is an underspecified expression because there needs to be an aggregated expression to limit the attribute by. "Number of Records" is an automatically generated calculated field in the data visualization application 230 that contains value 1, associated with each record in the database. The user interface 100 displays a data visualization 518 (e.g., a bar chart) that depicts, in the x-axis, an aggregation ("SUM") of the number of records and depicts, in the y-axis, the wineries, limited to wineries having wine of the 2015 vintage.

Figure 5F:
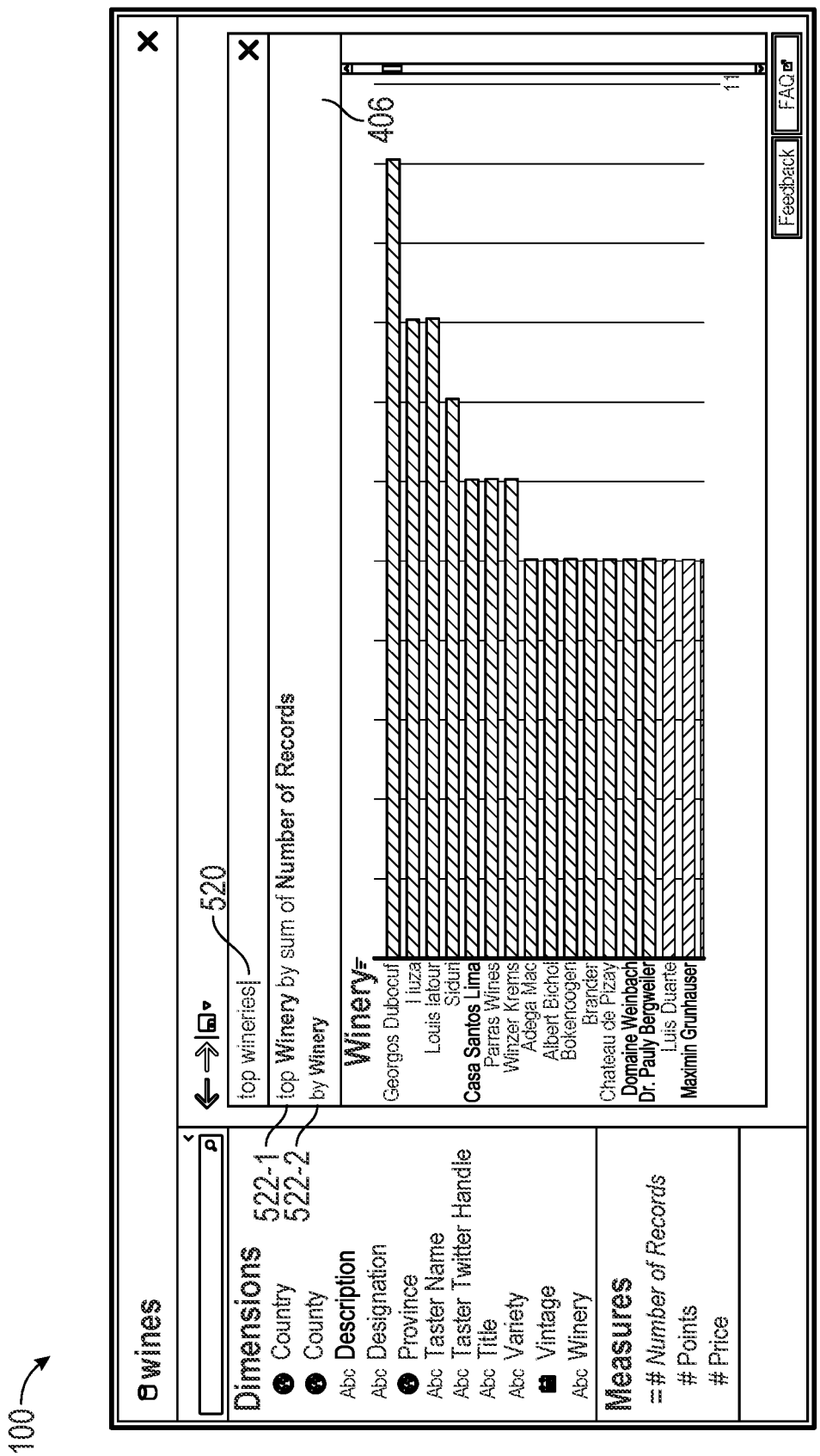
Figure 5G:
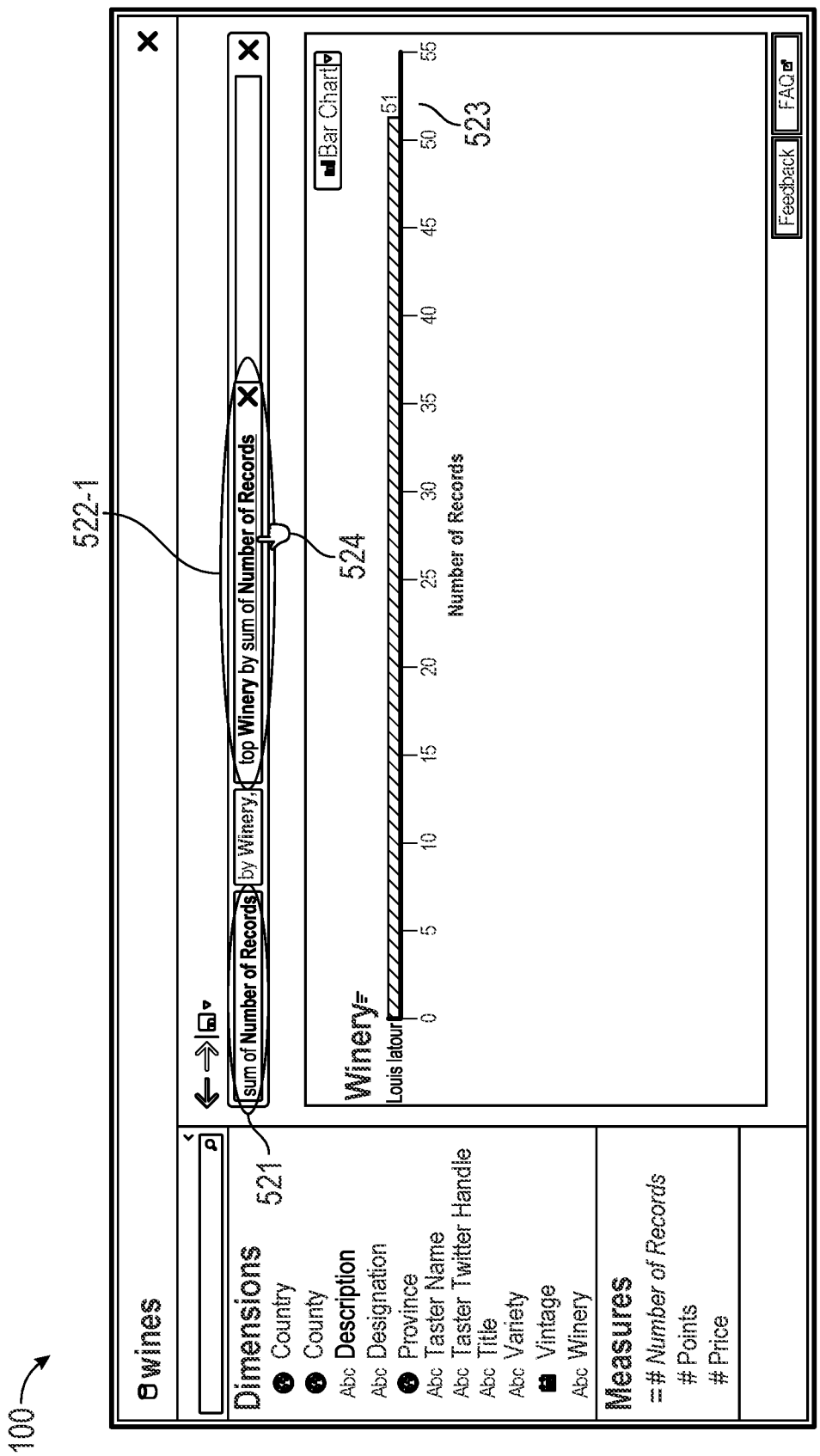

FIG. 5F illustrates another user interaction with the graphical user interface 100. In this example, the user inputs a natural language command 520 "top wineries." In this example, the phrase "top wineries" is an underspecified group expression. The inferencing module 241 identifies possible group variables (by x") displays a first interpretation (e.g., option) 522-1 ("top Winery by sum of Number of Records") and a second interpretation 522-2 ("by Winery") in the dropdown menu 406. In response to user selection of the first interpretation 522-1 "top Winery by sum of Number of Records," the inferencing module 241 infers and calculates, as shown in FIG. 5G, an aggregation expression 521 "sum of Number of Records", in accordance to the inferencing rule that was discussed with respect to FIG. 5E. The user interface 100 displays an updated data visualization 523 (e.g., a bar chart) that shows the top winery ("Louis Latour") based on an aggregation of the number of records.

Figure 5H:
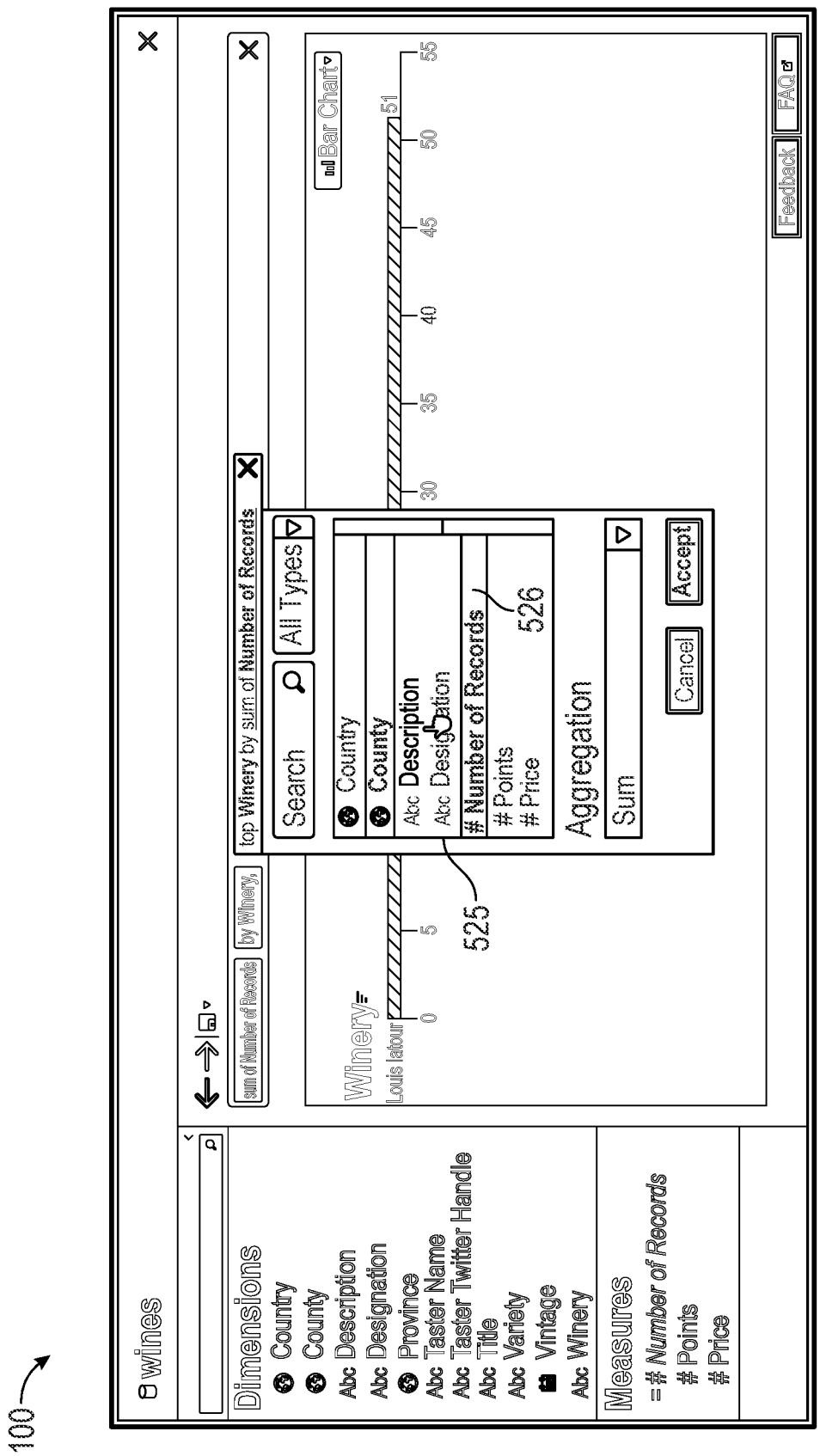
Figure 5I:
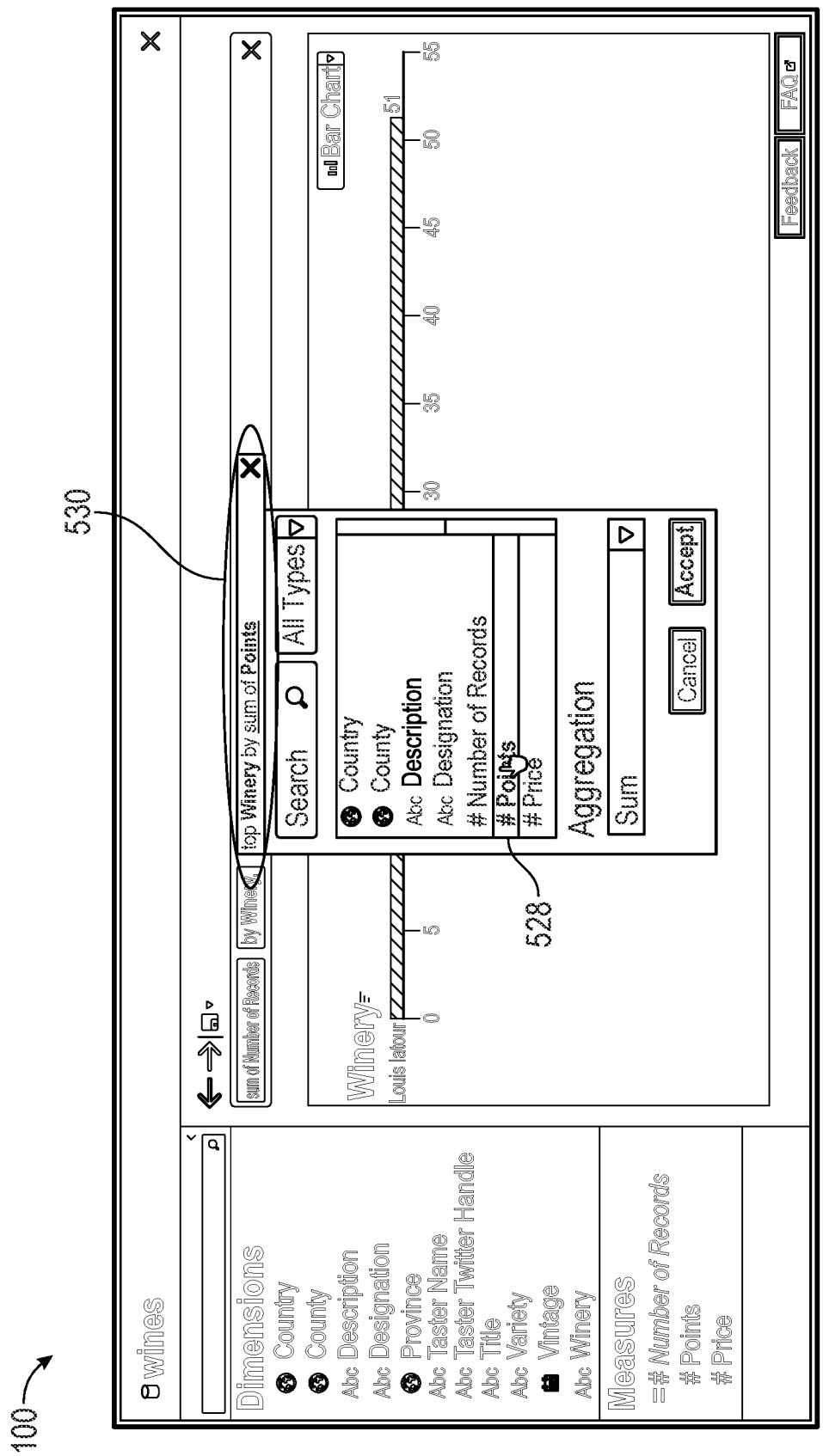
Figure 5J:
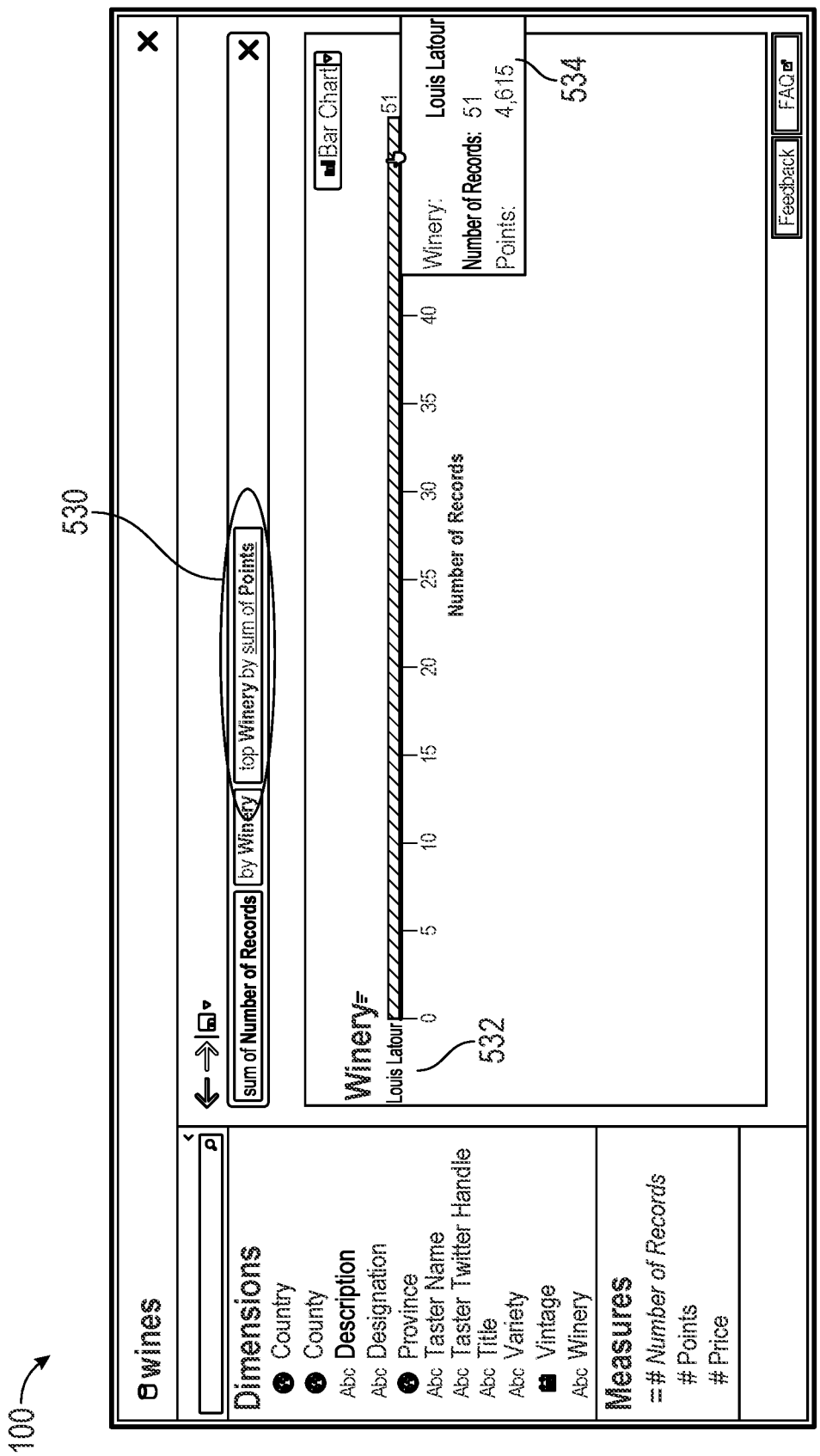

In some implementations, the inferencing choices generated by the inferencing module 241 can be overridden by the user via a repair and refinement operation. FIG. 5G illustrates a user selection 524 (e.g., via a mouse click, hover, or other input) of the expression "Number of Records". In response to the user selection, and as illustrated in FIG. 5H, a widget 525 is generated (e.g., using the widget generation module described in U.S. patent application Ser. No. 16/134, 892, titled "Analyzing Natural Language Expressions in a Data Visualization User Interface," which is incorporated by reference herein in its entirety). The widget 525 prompts the user with user-selectable options to replace the selected term "Number of Records" 526. The user selects the "Points" option 528 from the widget, as illustrated in FIG. 5I. In response to the user's selection, in the expression 524, the term "Number of Records" is replaced with the selected term "Points" to form "top Winer by sum of Points." In response to the updated term, the application 230 generates and displays an updated data visualization 532 (e.g., a horizontal bar chart), as illustrated in FIG. 5J. In some instances, a tooltip 534 provides more details about the data visualization in response to user selection of a data mark.

Inter-Phrasal Inferencing

In some implementations, given a fully specified analytical expression of ArkLang, additional fully specified analytical expression are inferred (e.g., by the inferencing module 241) either because (i) the underlying visualization query language that ArkLang is translated (e.g., compiled) into requires such additional expressions to be co-present for purposes of query specification or (ii) such additional expressions improve the analytical usefulness of the resultant visualization.

With respect to (i), the visual specification for the visualization query language may require measure fields to be aggregated or require dimension fields to group the data into panes to generate a visualization. Therefore, filter and limit expressions require aggregated measures and grouped dimensions in play to select subsets of the data for analysis. A sort expression has a stricter constraint that requires the dimension that is being sorted to also be used to group the data in the visualization.

With respect to (ii), when a user types "temperature throughout July 2018" (illustration not shown), the user likely expects the result to be a time-series visualization of the filter expression, to reveal the temporal aspects of the data. Arklang supports the notion of level of detail in data hierarchies such as location and time. In order to generate a time-series line chart, the inferencing module 241 introspects the current level of detail of a temporal hierarchy in the filter expression, and infers a group expression of the temporal concept to be one level lower than the original temporal concept in the filter expression. An exception is the time unit "second", which is the lowest level of the temporal hierarchy. In this instance, the inferencing module 241 simply infers "second".

FIGS. 6A-6F provide a series of screenshots that illustrate inter-phrasal inferencing based on the data source 310, in accordance with some implementations.

Figure 6A:
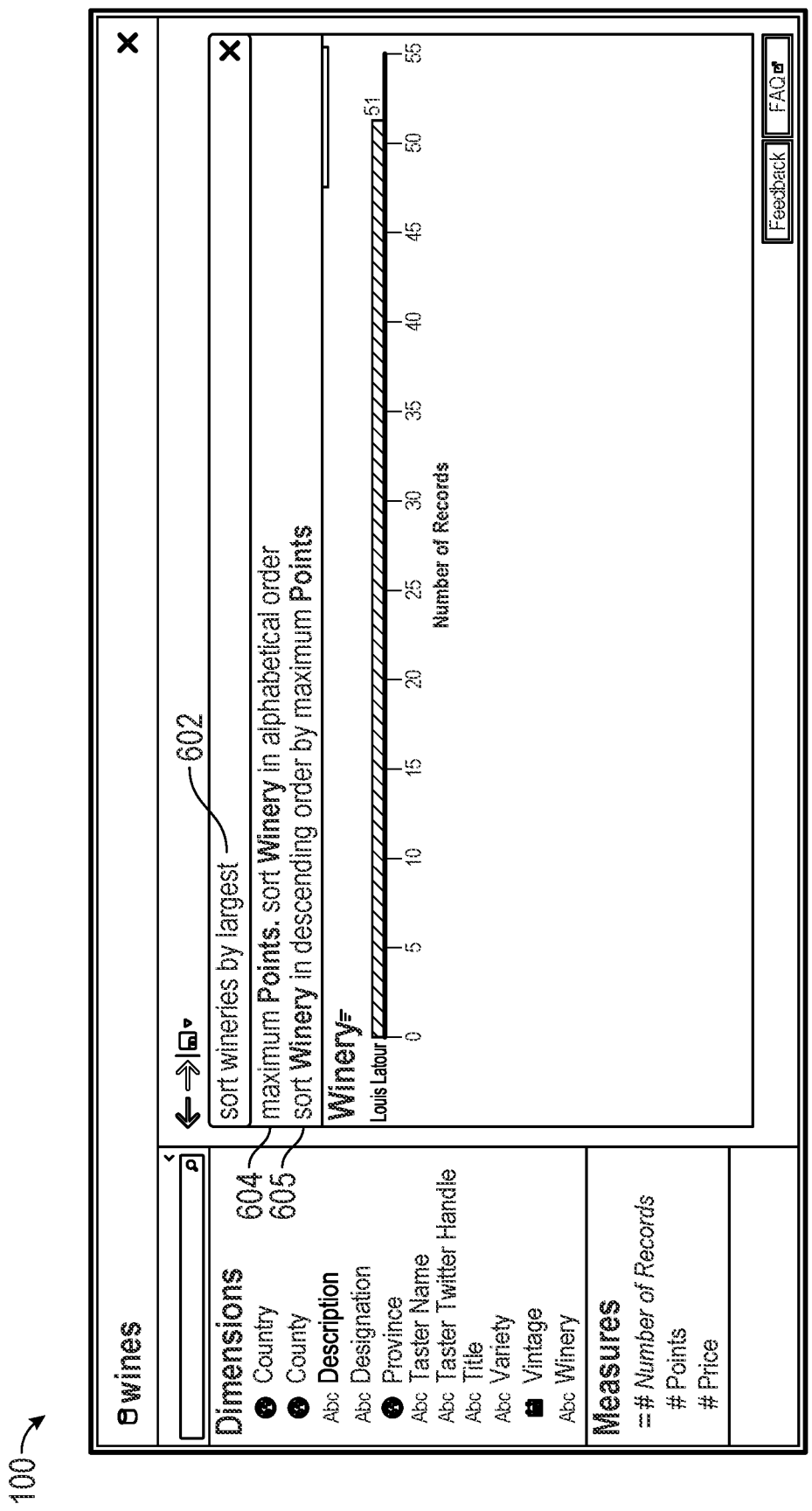
FIGS. 6A-6F provide a series of screenshots that illustrate inter-phrasal inferencing, in accordance with some implementations.

FIG. 6A illustrates a user input of a natural language command 602 "sort wineries by largest." In response to the command, a first option 604 ("maximum points, sort winery in alphabetical order") and a second option 605 ("sort Winery in descending order by maximum points") are displayed. In this example, the term largest" is identified as equivalent (e.g., synonymous) to "maximum" (e.g., by the natural language processing module 238 using the data source lexicon 254) and the phrase "maximum points" is inferred (e.g., by the inferencing module 241). The term "sort" denotes an arrangement of data rows in an order. In this example, the inferencing module 241 infers an "alphabetical order" and a "descending order" as two possible options in which the dimension "winery" can be sorted.

Figure 6B:
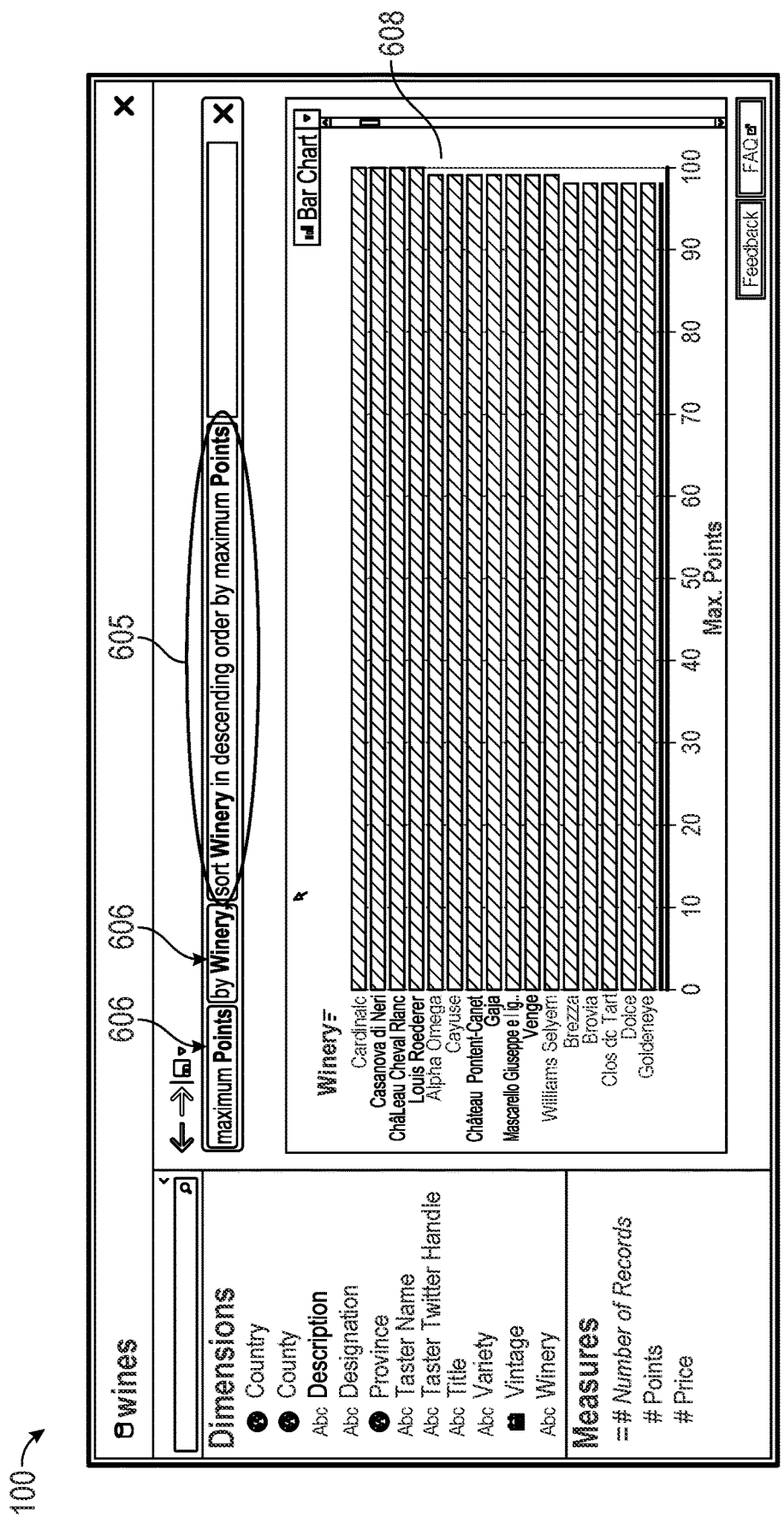

FIG. 6B illustrates the user selection of the second option 605 ("sort Winery in descending order by maximum points"). In order to compile this expression into data visualization query language, the dimension that is being sorted ("wineries") must be used as the group expression ("by Winery") to be compiled in conjunction with the sort expression. In some implementations, in response to a sort expression in which its underlying group expression does not appear conjunctively with the sort expression, the inferencing module 241 introspects the sort expression, retrieves that group expression, and infers the conjunctive expression. In this example, the conjunctive expression is "by Winery, sort Winery in descending order by maximum points," which is the concatenation of the phrase 606 and the second option 605 as depicted in FIG. 6B. In some implementations, even though the visualization query language requires either a group or an aggregation expression to generate a visualization, the inferencing module 241 infers both a group and aggregation expression. As further illustrated in FIG. 6B, shows a group expression 606 ("by Winery") derived from the attribute of the sort expression (e.g., the option 605 "sort Winery in descending order by maximum points) along with an aggregation expression 606 ("maximum Points") generating a data visualization 608 (e.g., a bar chart).

Figure 6C:
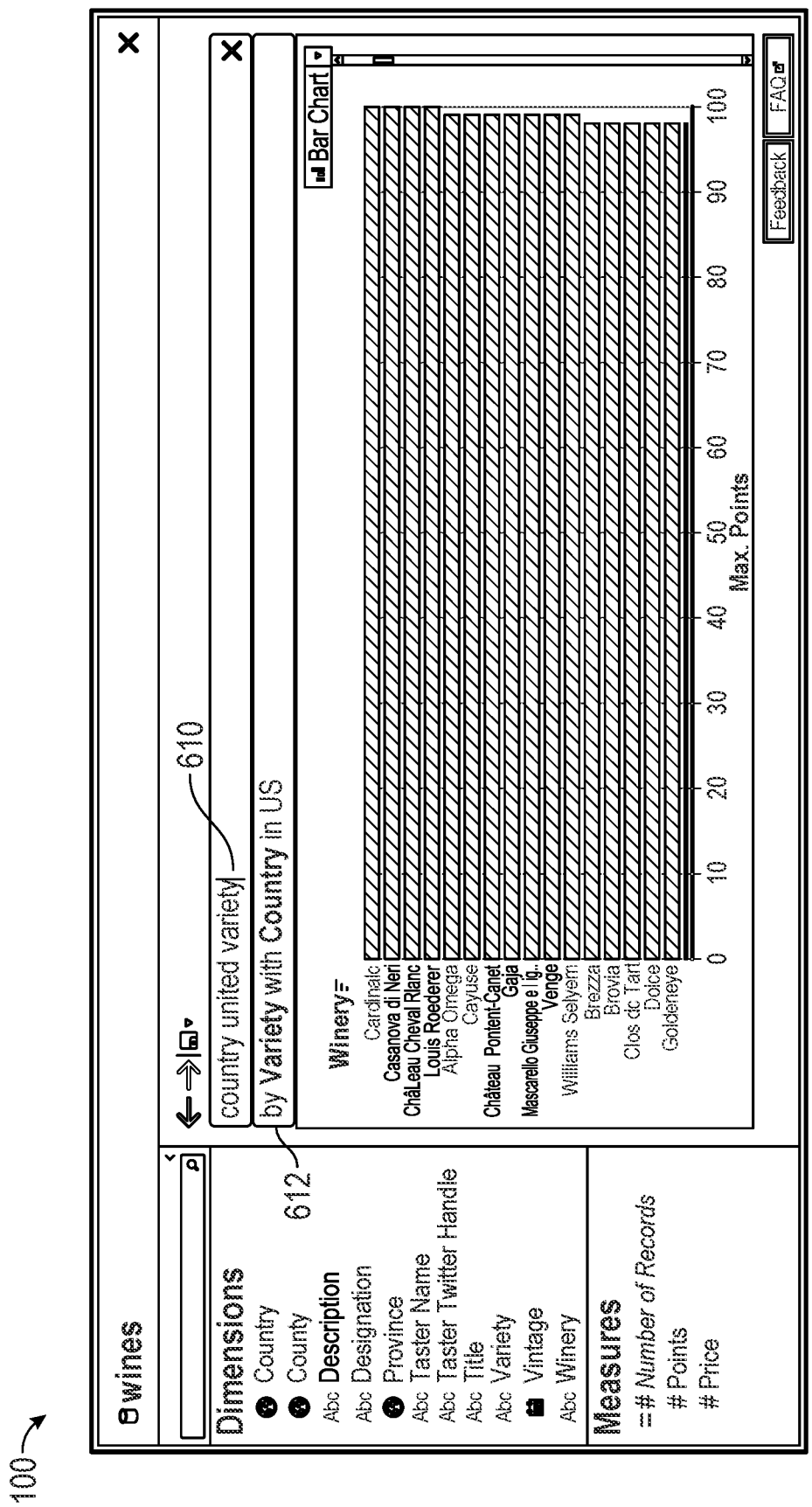

In some implementations, the inferencing module 241 also supports (e.g., interprets) terse expressions. As illustrated in FIG. 6C, a user inputs a natural language command 610 corresponding to an incoherent phrase "country united variety." In some implementations, the command includes two or more words and the inferencing module 241 combines two or more adjacent words to infer a meaning (e.g., a function). In this example, the inferencing module 241 infers the country "US" (or United States) from the phrase "country united." The inferencing module 241 generates an option 612 "by Variety with Country in US" in accordance with the interpretation.

Figure 6D:
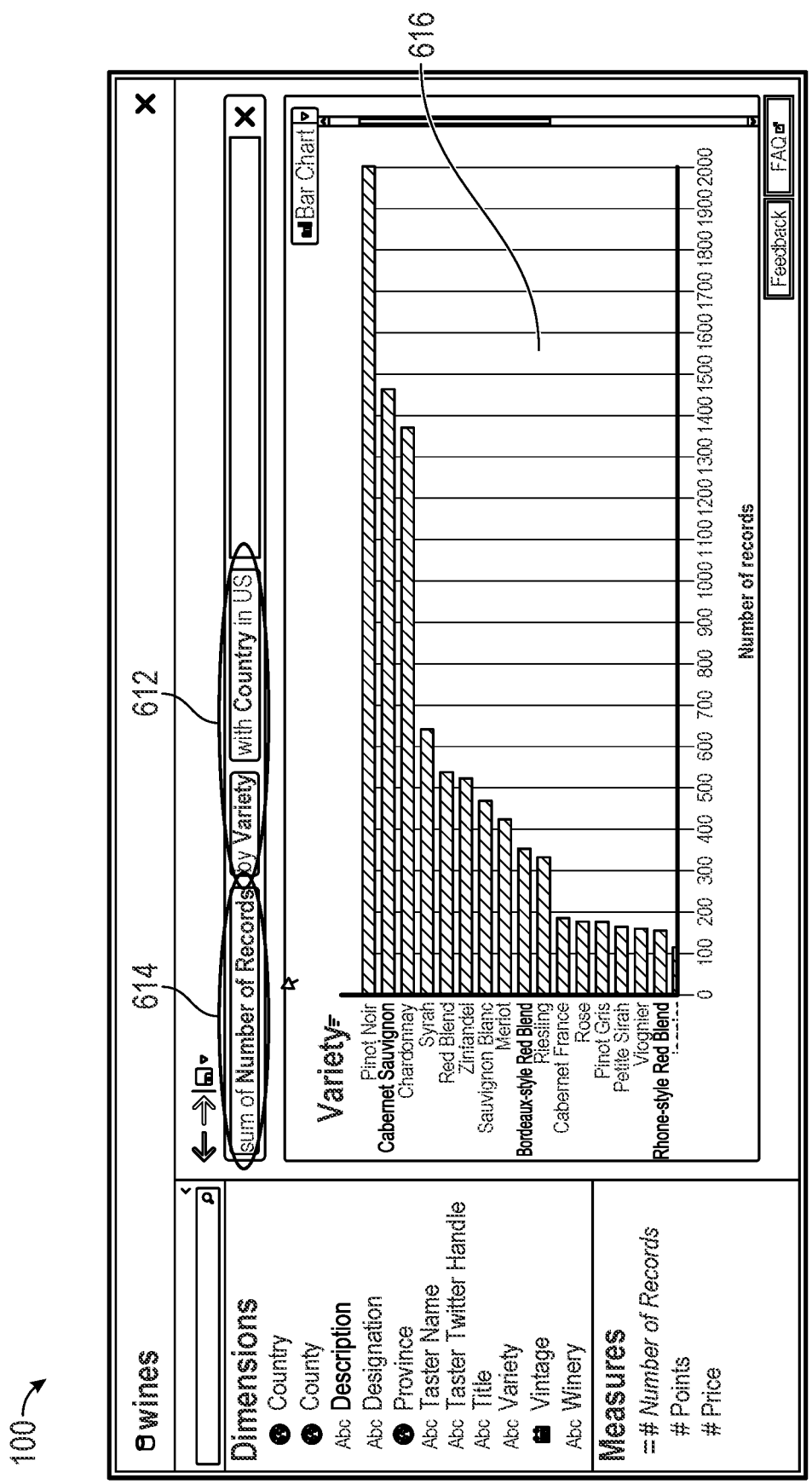

FIG. 6D illustrates the user selection of the option 612. The phrase "by Variety with Country in US," includes a group expression ("by Variety") and a filter expression ("with Country in US"). In some implementations, in response to user selection of a group expression, the inferencing module 241 infers an aggregation expression to improve the analytical usefulness of the resultant visualization. In this example, the inferencing module 241 infers an aggregation 614 ("SUM") of the attribute ("number of records"). FIG. 6D further illustrates a data visualization 616 (e.g., a bar chart) in which the horizontal bars (e.g., y-axis)

represent the attributes that are grouped ("wine varieties") and filtered ("with country in US"). The x-axis ("Number of Records") is the inferred aggregation expression. In some implementations, the horizontal bars in the bar chart are also sorted (e.g., in a descending order) as an implicit inference.

Figure 6E:
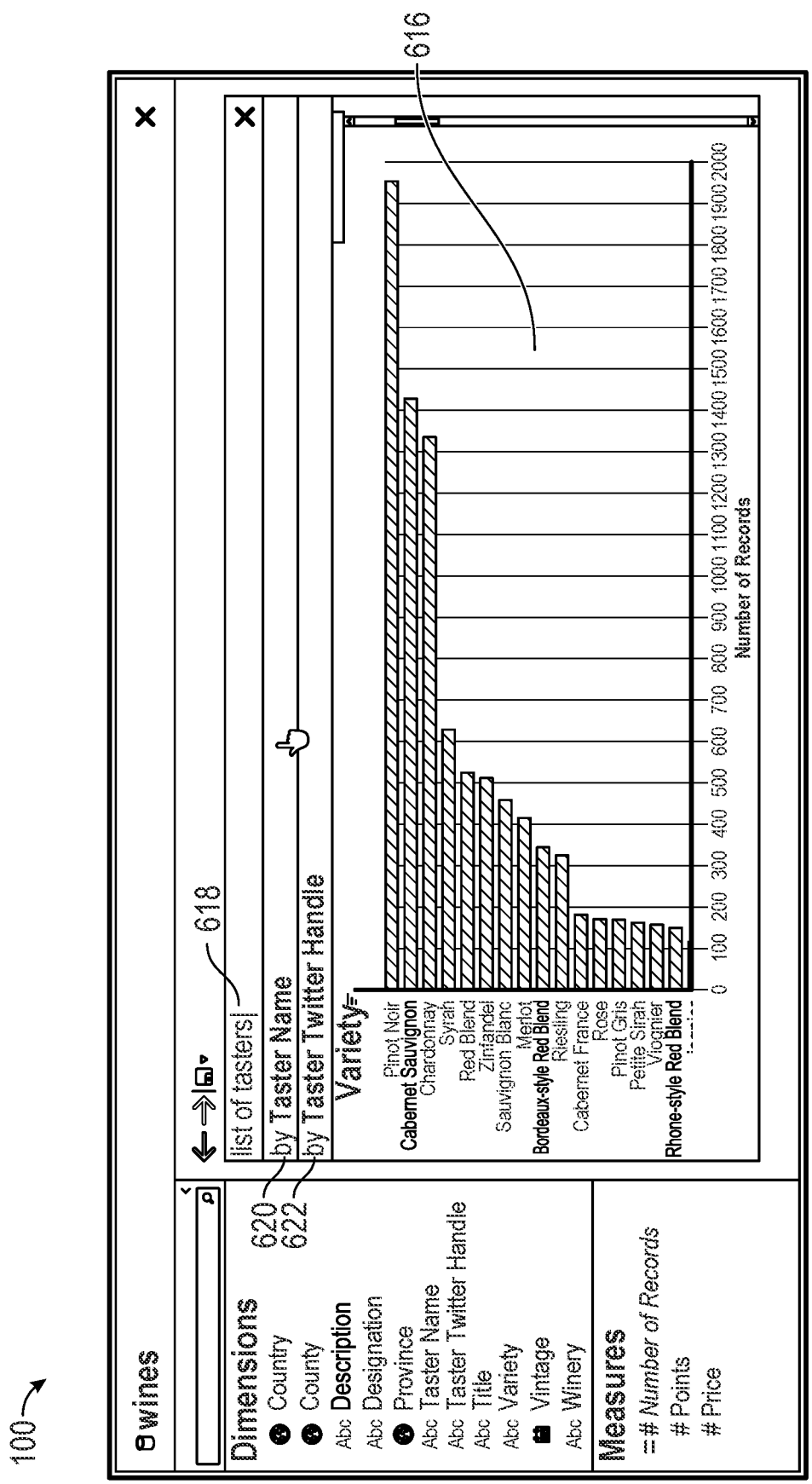

FIG. 6E illustrates user input of a natural language command 618 "list of tasters" in the graphical user interface 100. In some implementations, the natural language processing module 238 identifies the phrase "list of" as having a group concept (e.g., using the grammar lexicon 250). The natural language processing module 238 further identifies the word "tasters" to be related to the attributes (e.g., data fields) "Taster name" and "Taster Twitter Handle" in the data source 310. In accordance with the identified concept and attributes, a first option 620 "by Taster name" and a second option 622 (e.g., group expression) "by Taster Twitter Handle" are generated and displayed in the user interface 100.

Figure 6F:
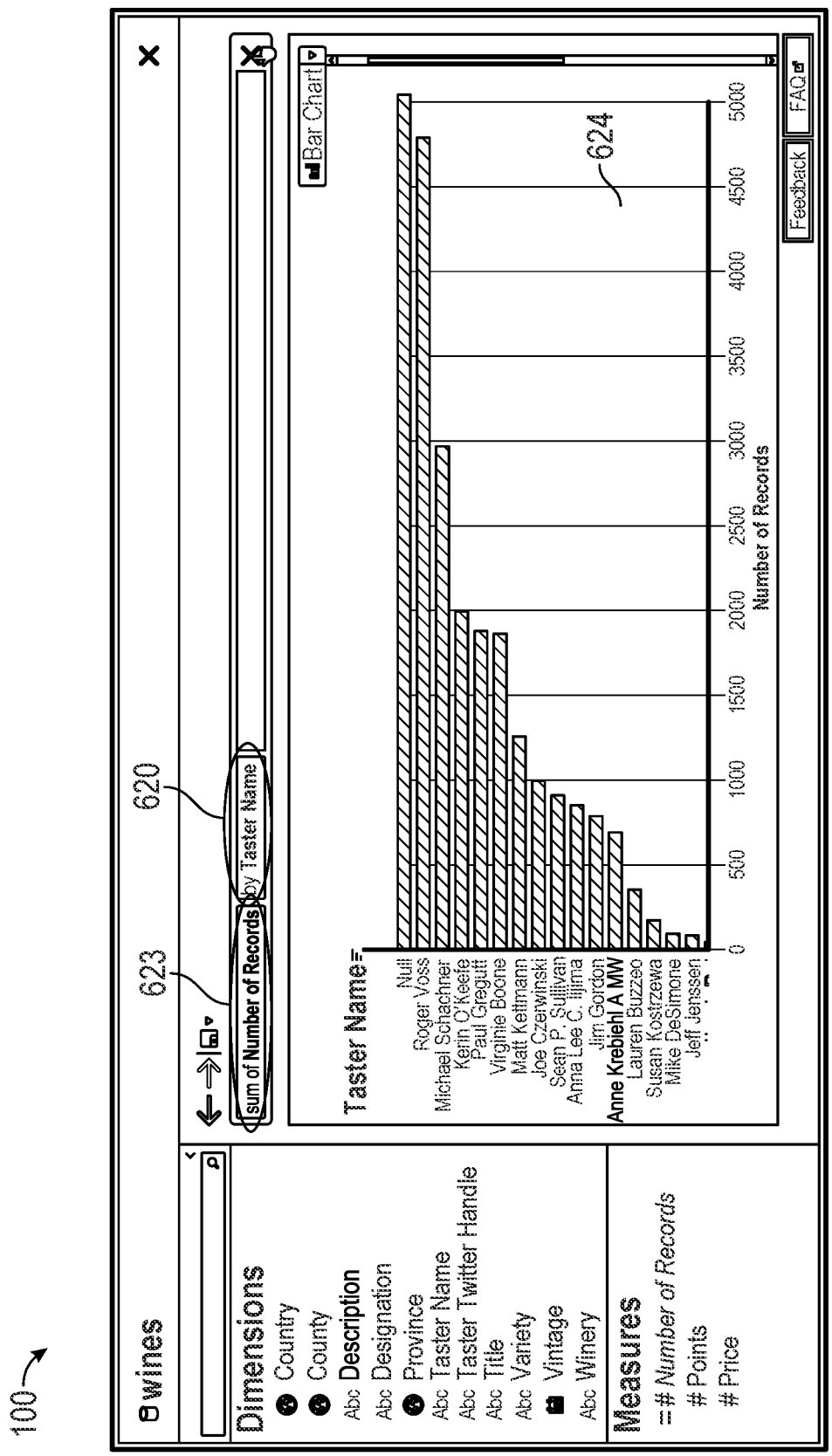

In response to user selection of the first option 620 "by Taster name", and as shown in FIG. 6F, an aggregation expression 623 ("sum of Number of Records") is generated (e.g., inferred by the inferencing module 241). The user interface 100 displays a resultant visualization 624 (e.g., a bar chart) that includes, in the y-axis, the attribute that is grouped ("Taster name") and includes, in the x-axis, the inferred aggregation expression "Number of records").

In some implementations, the inferencing module 241 infers a default aggregation expression "SUM(NumberOfRecords)" when a user does not specify an aggregation expression. In some implementations, "Number of Records" is an automatically generated calculated field in data visualization application 230 that contains value 1, associated with each record in the database (e.g., the data source 310 and the database/data sources 242).

User Specification of a Data Visualization Type

During visual analysis, users may explicitly express their intent for a specific graphical representation. For example, a user may specify a line chart to perform temporal analysis. In some implementations, the inferencing logic for deducing sensible attributes to satisfy valid visualizations relies on an integrated set of rules and defaults (also referred herein as Show Me). Show Me incorporates automatic presentation from the row and column structure of a data visualization query expression. In some implementations, Show Me also adopts best practices from graphics design and information visualization when ranking analytically useful visualizations based on the type of attributes utilized in the analysis workflow. Many features of Show Me are described in U.S. Pat. No. 8,099,674, entitled "Computer Systems and Methods for Automatically Viewing Multidimensional Databases," which is incorporated by reference herein in its entirety.

In some implementations, the data visualization application 230 assigns different ranks to different data visualization types. A higher rank is assigned to a data visualization that presents views that encode data graphically. Text tables are assigned the lowest rank because their primary utility is to look up specific values and they do not encode data graphically. In some implementations, text tables are always available as a default visualization, as no attribute needs to be inferred to display a text table.

In some implementations, the data visualization application supports the following visualizations and enumerates their corresponding inferencing logic when a user explicitly asks for these chart types in their input utterances (e.g., natural language commands):

Bar chart: In some implementations, the natural language command includes a bar chart. In response to the command, a quantitative attribute is inferred (e.g., by the inferencing module 241) as bars are effective for comparing numerical values, particularly when they are aligned. For example, in "start date as a bar chart," the inferencing module 241 infers "sum of Number of Records" to return a result "by Start Date's year and sum of Number of Records as a bar chart."

Gantt chart: Gantt charts are effective for showing duration with respect to a quantitative attribute. In some implementations, the natural language command includes a Gantt chart. In response to the command, a date attribute is inferred (e.g., by the inferencing module 241) when only a dimension is present. A dimension is inferred when only a date attribute is present. Both a dimension and a date time field are inferred if both are not present. For example, in "order date as a gantt," the inferencing module 241 infers "Category" to return "sum of Number of Records by Order Date's year and by Category as a gantt chart."

Line chart: A line chart is effective for showing trends. This command treats the date field discretely. In some implementations, the natural language command includes a line chart. In response to the command, the inferencing module 241 infers a date attribute. For example, in "sum of sales by customer name as a line chart," the inferencing module 241 infers "Order Date" to return a result "sum of Sales by Customer Name by Order Date's year as a line chart."

Map: In some implementations, the natural language command includes a map. In response to the command, the inferencing module 241 infers a geographic attribute to view data by location. For example, in "sum of sales by customer name by location," the inferencing module 241 infers "City" to return a result "sum of Sales by Customer Name by City as a map."

Pie chart: Pie charts are generally used to show percentage or proportional data represented by each category. In some implementations, the natural language command includes a pie chart and has a numerical attribute. In response to the command, the inferencing module 241 infers a categorical attribute. For example, in "sum of sales as a pie chart" the inferencing module 241 infers "Category" to return a result "sum of Sales by Category as a pie chart." Similarly, given a categorical attribute, the inferencing module 241 infers a numerical attribute.

Scatter plot: Scatter plots are effective for comparing two values. In some implementations, the natural language command includes a scatter plot. In response to the command, the inferencing module 241 infers an additional measure. For example, in "correlate sum of sales by customer name," the inferencing module 241 infers "Discount" to return a result "sum of Sales and sum of Discount by Customer Name as a scatterplot."

Treemap: Treemaps are used to display hierarchical data using nested rectangle representation. In some implementations, the natural language command includes a treemap and a numerical attribute. In response to the command, the inferencing module 241 infers a dimension. For example, in "sum of sales as a tree map," the inferencing module 241 infers "Category" to return a result "sum of Sales by Category as a treemap." Similarly, in response to a natural language command that includes a treemap and given a categorical attribute, the inferencing module 241 infers a numerical attribute.

FIGS. 7A-7I provide a series of screenshots that illustrate inferencing for supporting visualization types based on the data source 310, in accordance with some implementations.

Figure 7A:
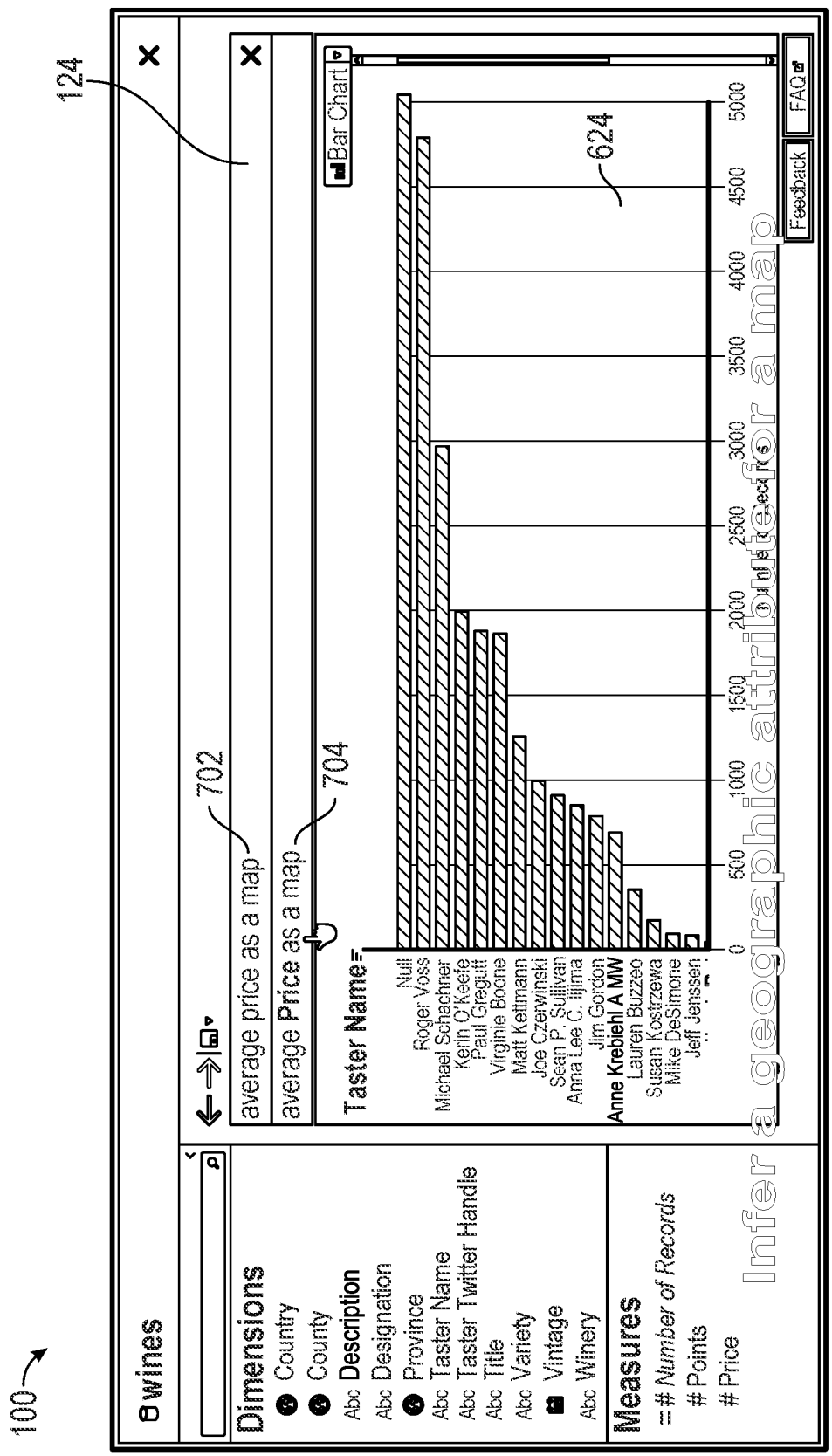
Figure 7B:
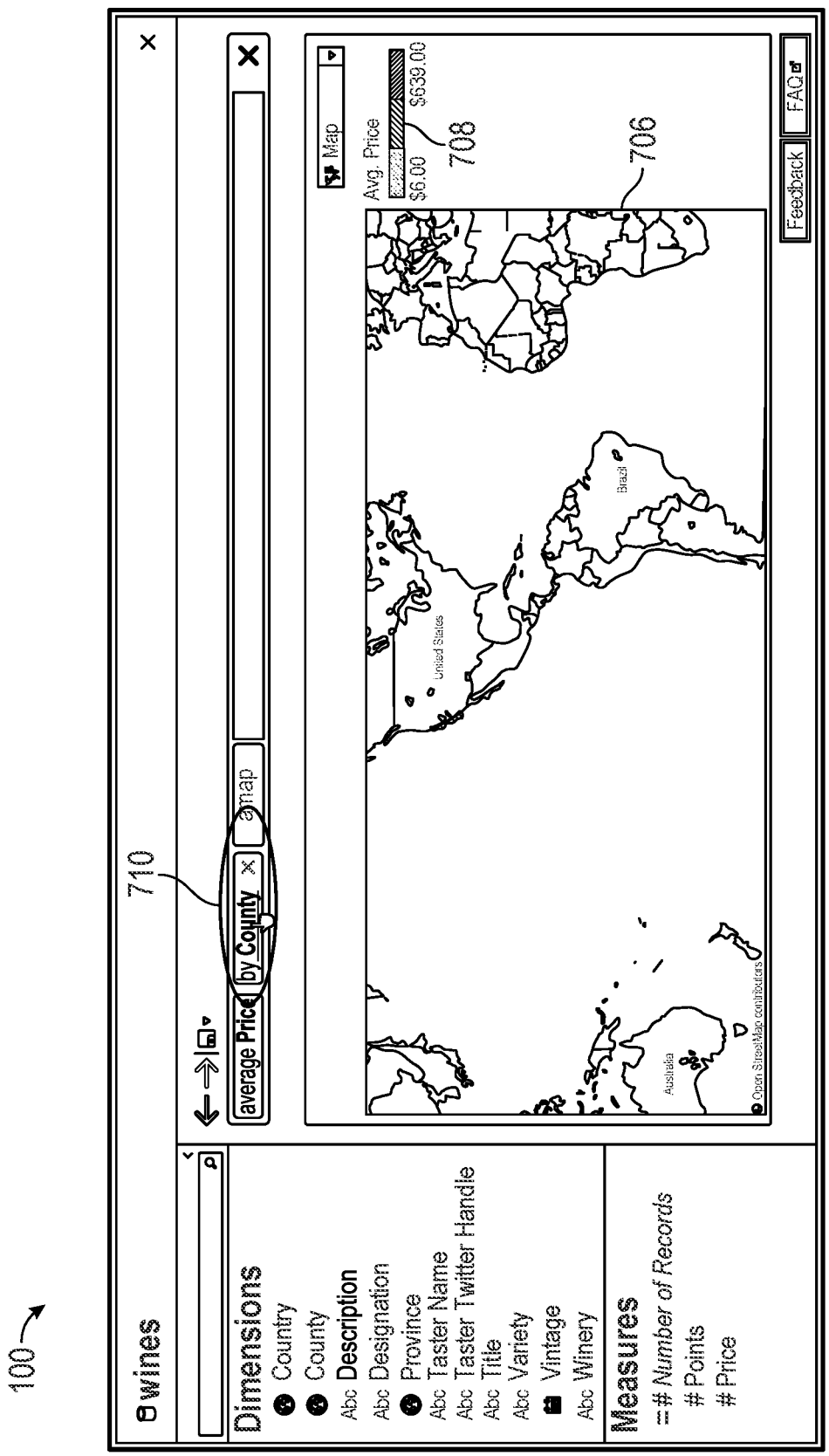

In FIG. 7A, a user inputs (e.g., enters or types) a natural language expression 702 "average price as a map" in the command box 124. In response to user selection of the option 704 "Average Price as a map," the inferencing module 241 infers a geographic attribute 710 "by county" to view the data "average price" by location. FIG. 7B shows a data visualization 706 (e.g., a map) that is displayed in response to the selected option 704 and the inferred geographic attribute "by county." The graphical user interface 100 also displays a legend 708, which indicates the range of average prices that are represented by different shades.

FIG. 7C illustrates a user selection 711 of the dimension "County" in the schema information region 110. In response to the user selection, a tooltip 712 containing information about the most common values of the attribute "County" is displayed.

Figure 7D:
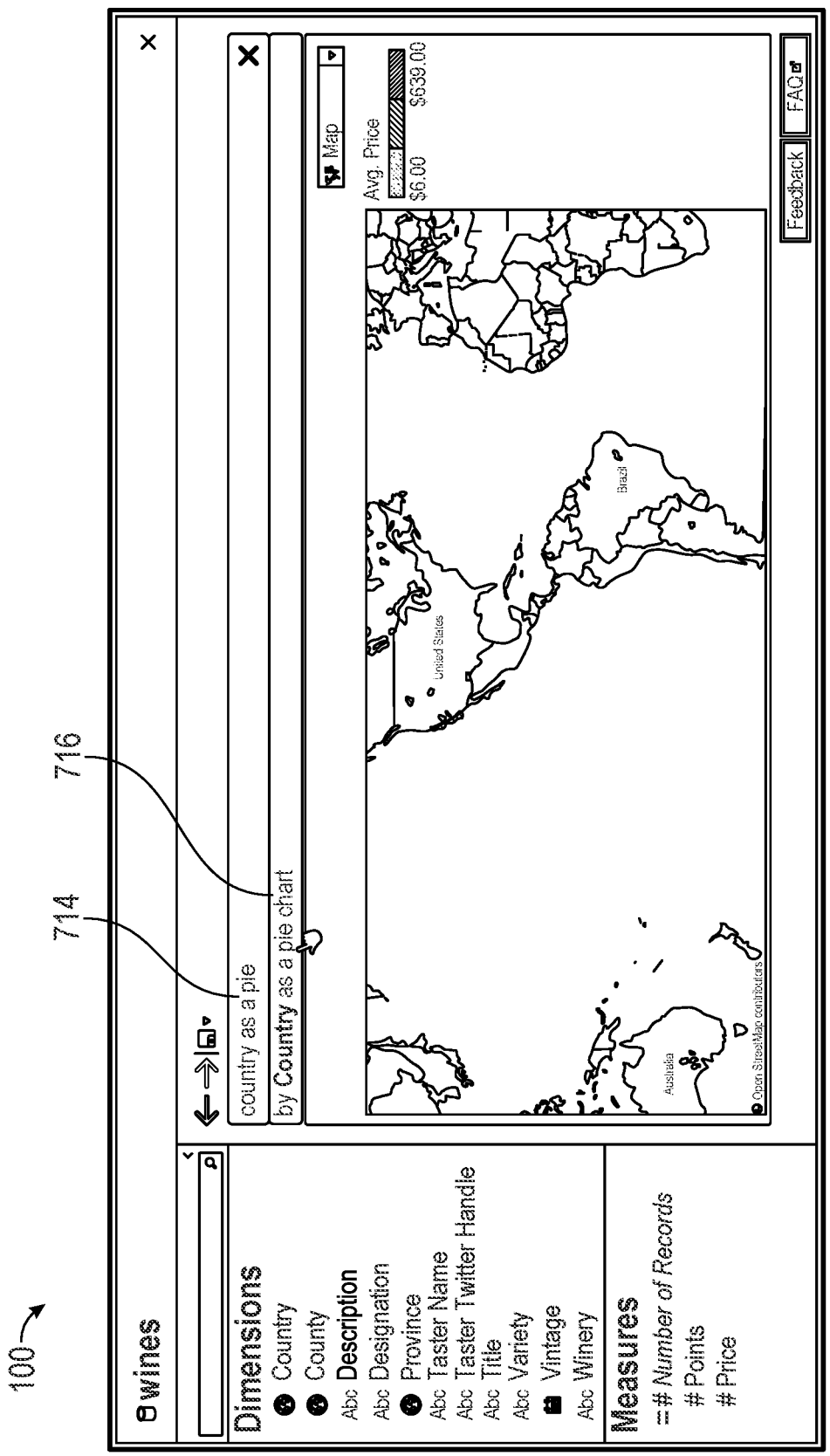
Figure 7E:
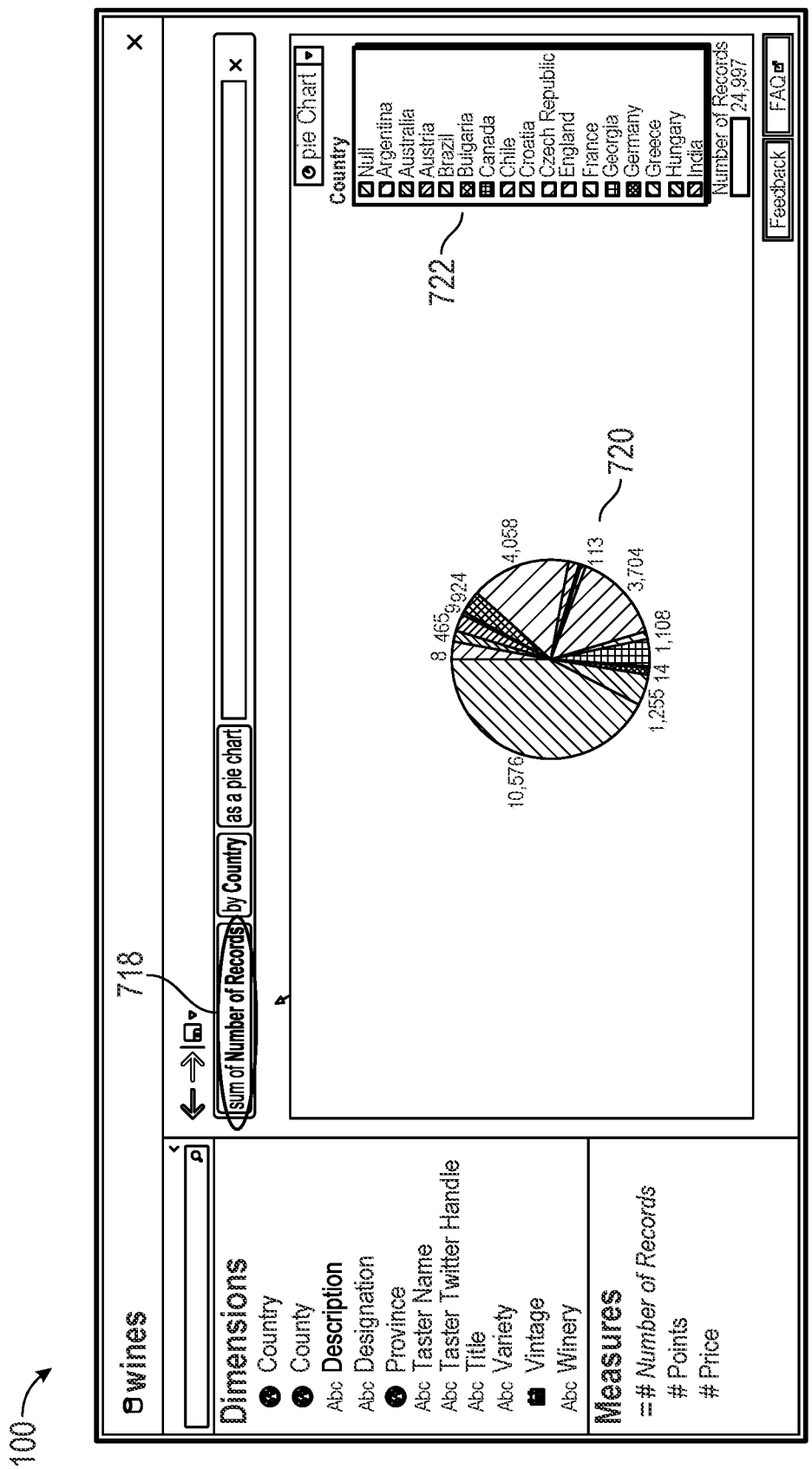

FIG. 7D shows a user input of a natural language command 714 "country as a pie." In response to the command, the user interface 100 displays an interpretation 716 "by Country as a pie chart." The interpretation 716 includes the term "pie chart" and a categorical attribute "by country." In response to user selection of the interpretation 716, the inferencing module 241 infers a numerical attribute 718 "sum of Number of Records," as illustrated in FIG. 7E. The user interface 100 displays a pie chart 720 (e.g., a data visualization) in which countries are represented by segments of the pie chart. The numbers adjacent to each segment on the pie chart 720 represent the number of records for the country, with the size of the segment proportional to the number of records. The user interface 100 also displays a legend 722 identifying the countries in the pie chart.

Figure 7F:
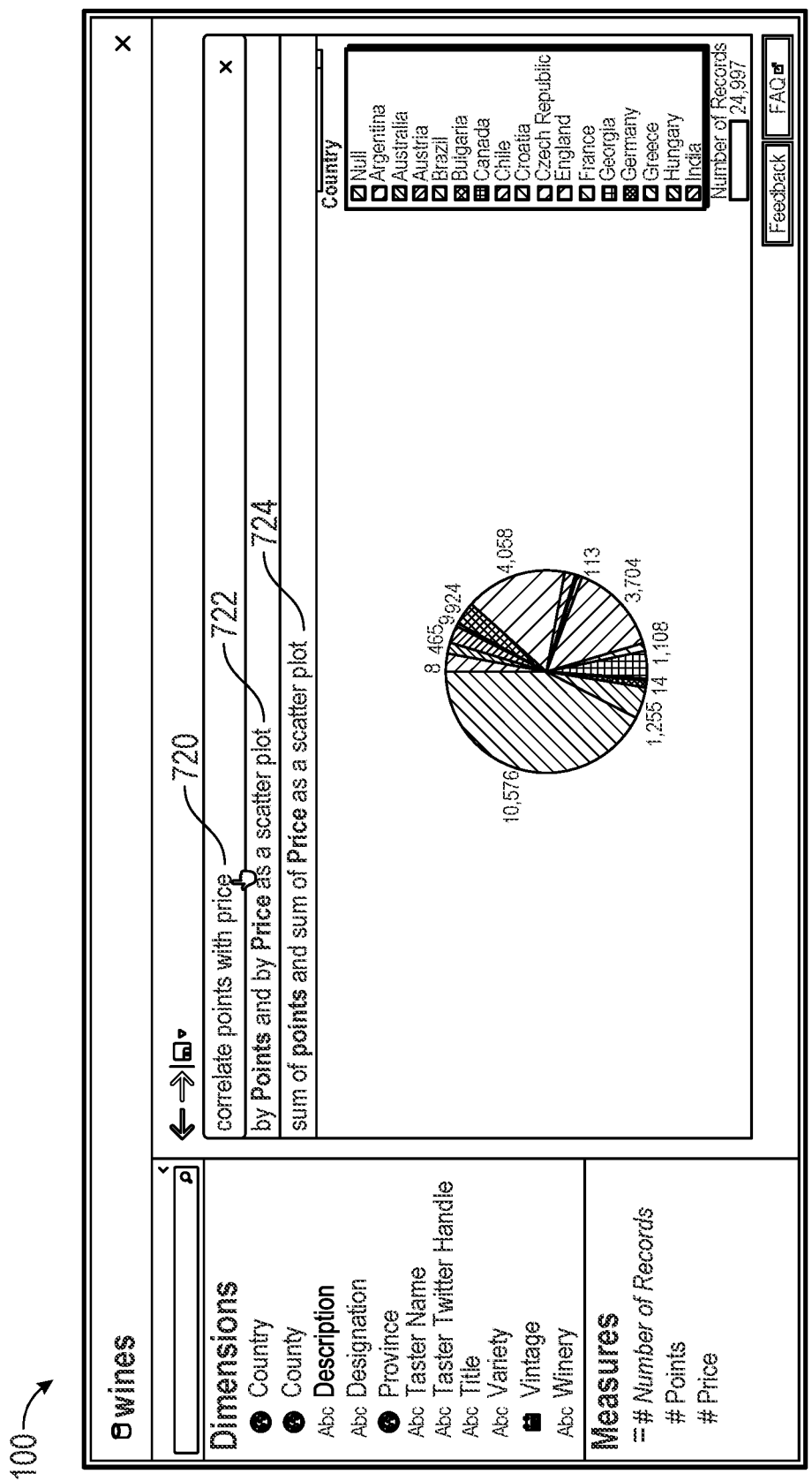
Figure 7G:
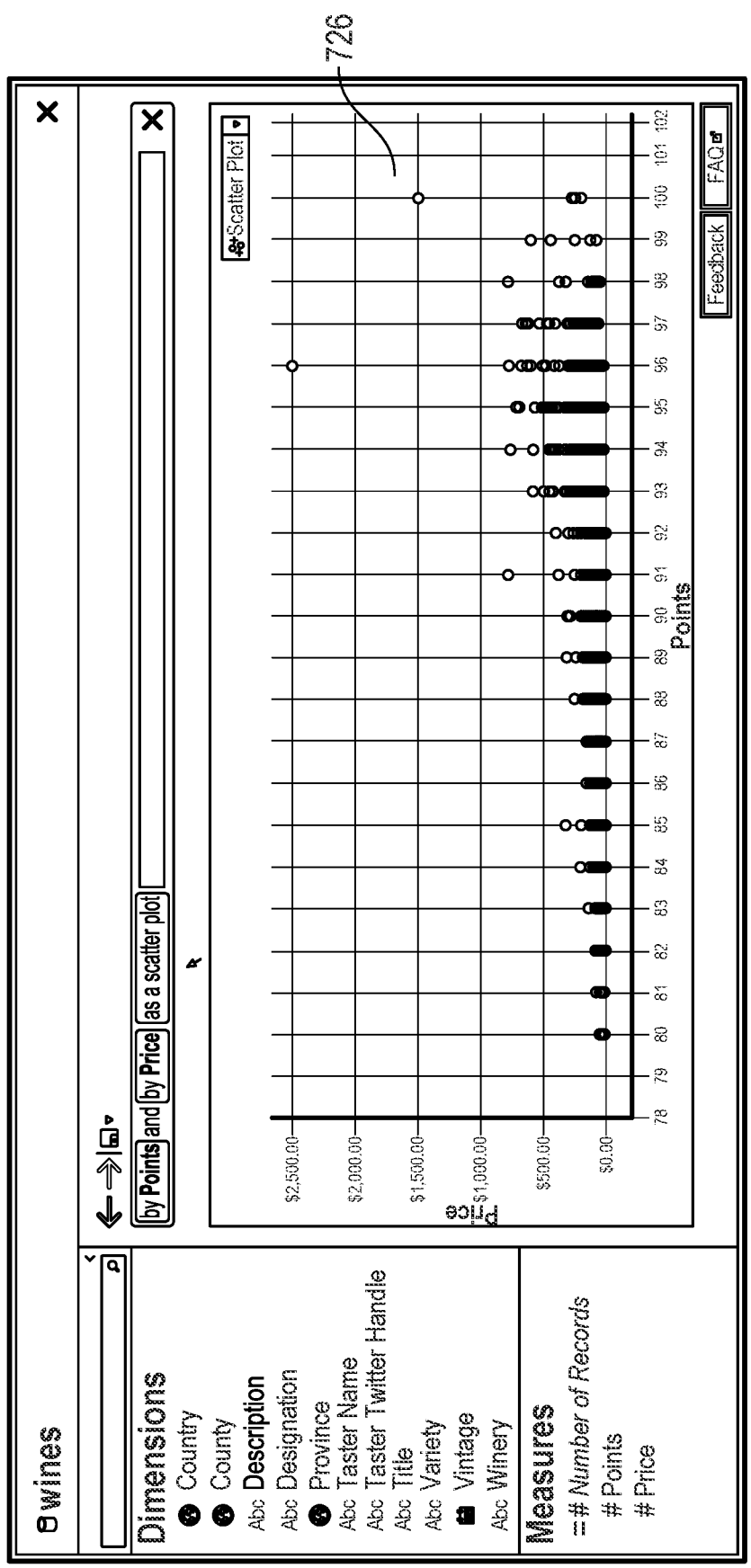

FIG. 7F illustrates user input of a natural language command 720 "correlate points with price." The inferencing module 241 infers a type of data visualization (e.g., scatter plot) in response to the term "correlate" in the natural language command. The user interface 100 displays a first interpretation 722 "by Points and by Price as a scatter plot" and a second interpretation 724 "sum of Points and sum of Price as a scatter plot." FIG. 7G shows a scatter plot 726 that is displayed in response to the user selection of the first interpretation 722 "by Points and by Price as a scatter plot." Each of the data fields in the data columns ("Points" and "Price") corresponds to a data point in the scatter plot having Points as the x-axis and Price as the y-axis. In this instance, the two measures "points" and "price" are already defined by the user and therefore no additional measure needs to be inferred.

Figure 7H:
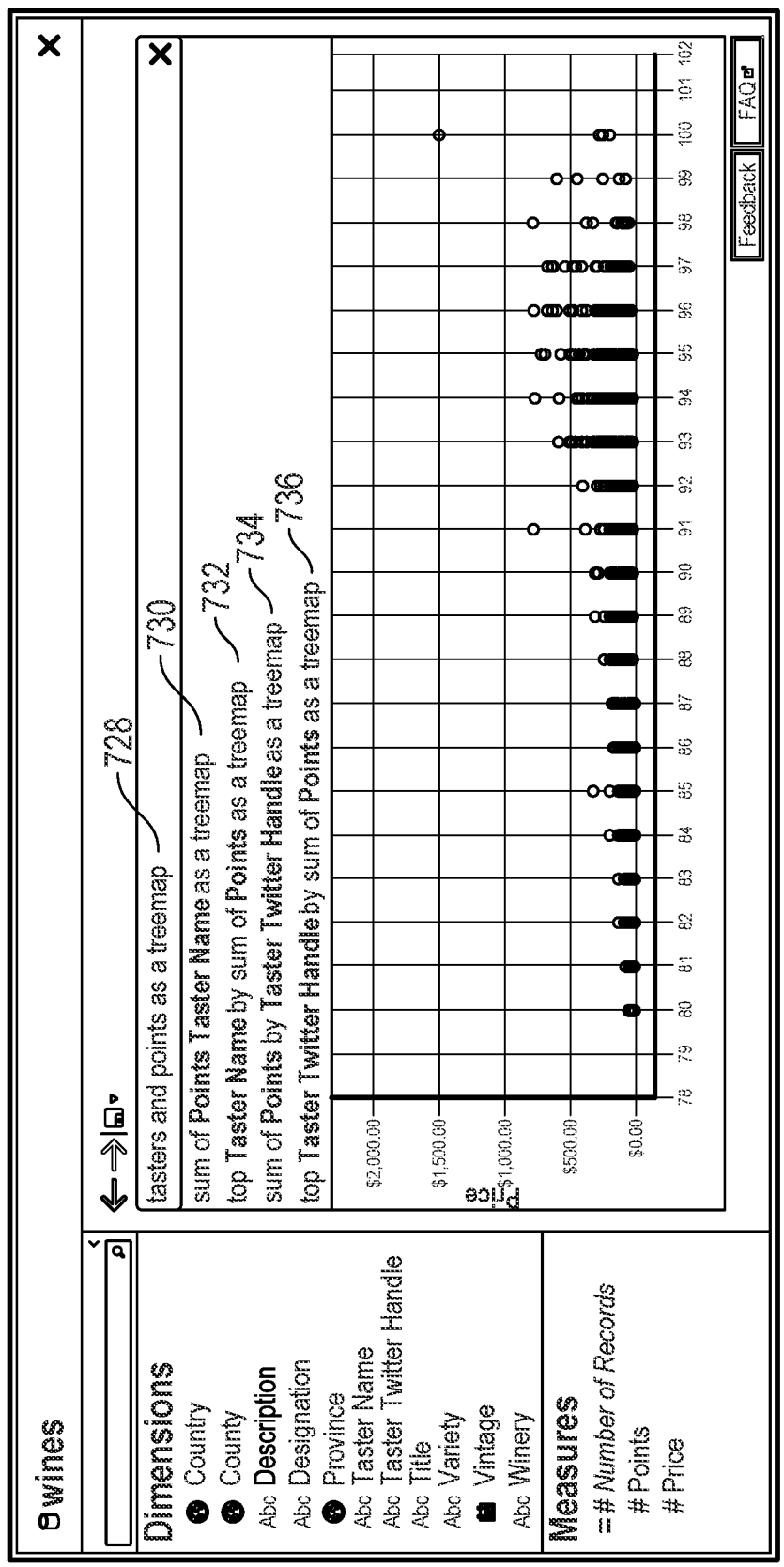

FIG. 7H illustrates user input of a natural language command 728 "tasters and points as a treemap." The command includes the term "treemap" and the attributes "tasters" and "points." In response to the command, the inferencing module 241 infers a categorical attribute and a numerical attribute for the attributes "tasters" and "points." In this example, a first interpretation 730 "sum of Points by Taster Name as a treemap," is generated (e.g., by the inferencing module 241) and displayed. In the first interpretation 730, "points" is the inferred numerical attribute and "Taster Name" is the inferred categorical attribute. The user interface further displays a second interpretation 732 "Top Taster Name by sum of Points as a treemap, in which "Top Taster Name" is the inferred categorical attribute and "sum of Points" is the inferred numerical attribute. The user interface 100 further displays a third interpretation 734 "sum of Points by Taster Twitter Handle as a treemap," in which "sum of Points" is the inferred numerical attribute and "Taster Twitter Handle" is the inferred categorical attribute. The user interface 100 further displays a fourth interpretation 736 "Top Taster Twitter Handle by sum of Points as a treemap," in which "Top Taster Twitter Handle" is the inferred categorical attribute and "sum of Points" is the inferred numerical attribute.

Figure 7I:
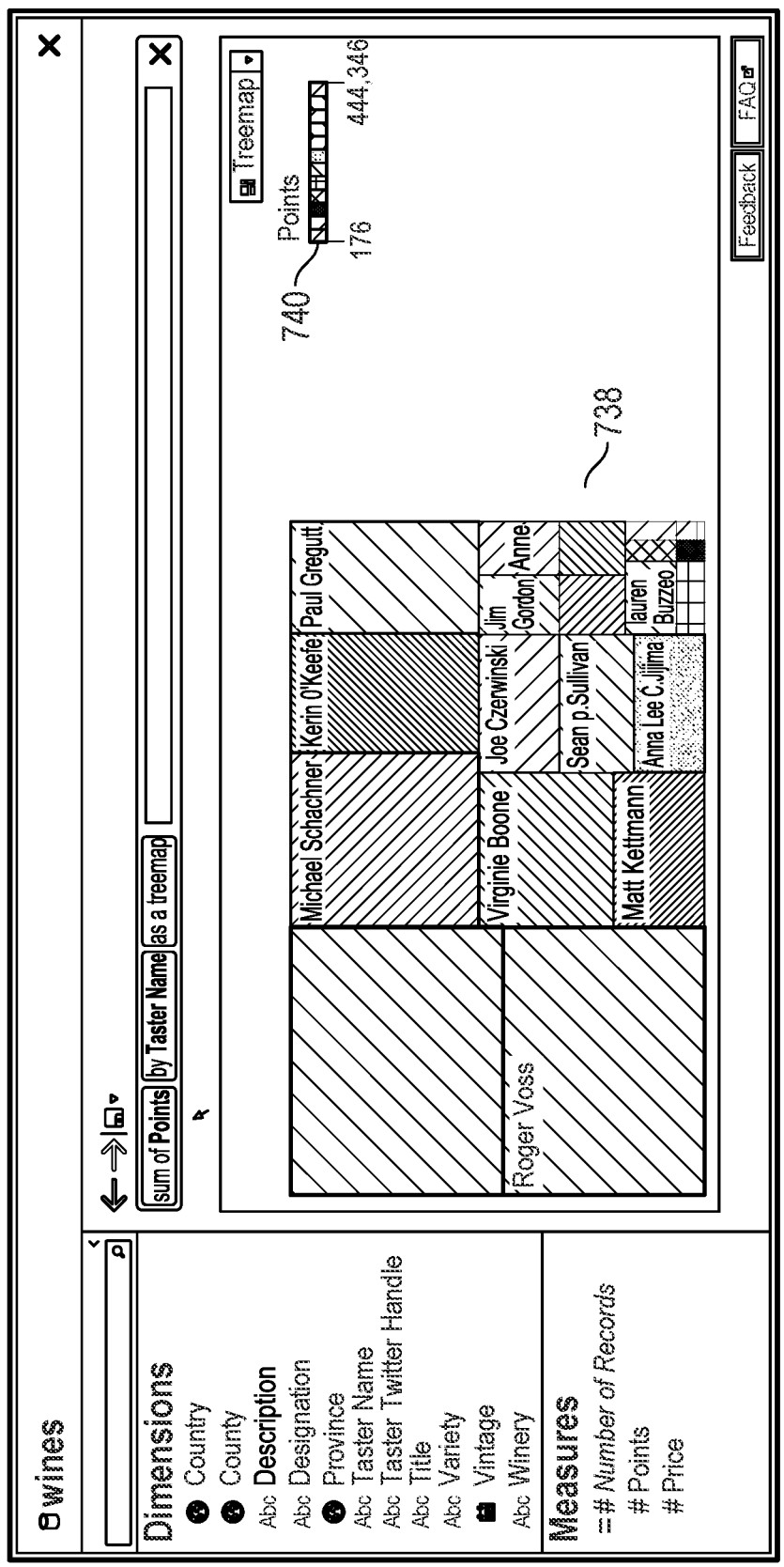

FIG. 7I shows a treemap 738 and a legend 740 that are displayed in response to user selection of the first interpretation 730 "sum of Points by Taster Name as a treemap."

Resolving Vague Predicates

Vagueness is a term used in linguistics manifested by concepts such as "low," "high," "good," and "near." These concepts are termed as "vague" and/or "ambiguous" because of the inability to precisely determine and generalize the extensions of such concepts in certain domains and contexts.

In some implementations, using metadata provided by the Semantic Model, the inferencing logic is extended to make smart defaults for such concepts in ArkLang. For example, for an utterance "where are the expensive wines?", the application infers (e.g., using the inferencing module 241) the vague concept "expensive" to range from [avg+1SD, max], where avg, SD and max are the average, standard deviation and maximum values for the numerical field "Price" that also has metadata indicating that it is a currency attribute. In some implementations, telemetry data about system overrides and interaction data that provides a feedback loop to the system regarding relevancy in the inference logic are also collected to improve the inferencing logic.

FIGS. 8A-8E illustrate inferencing for vague concepts based on the data source 310, according to some implementations.

Figure 8A:
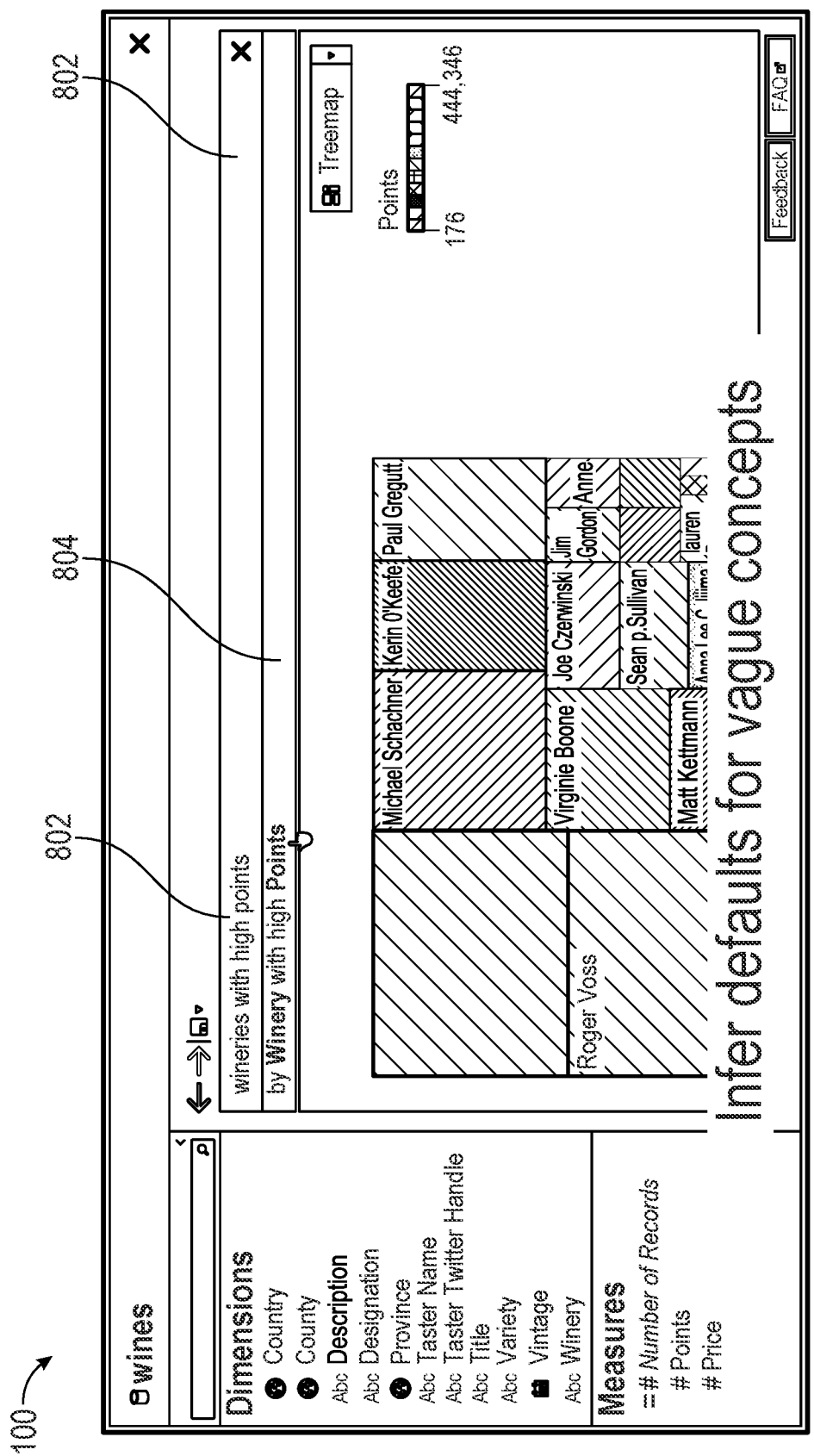
FIGS. 8A-8E illustrate inferencing for vague concepts according to some implementations.
Figure 8B:
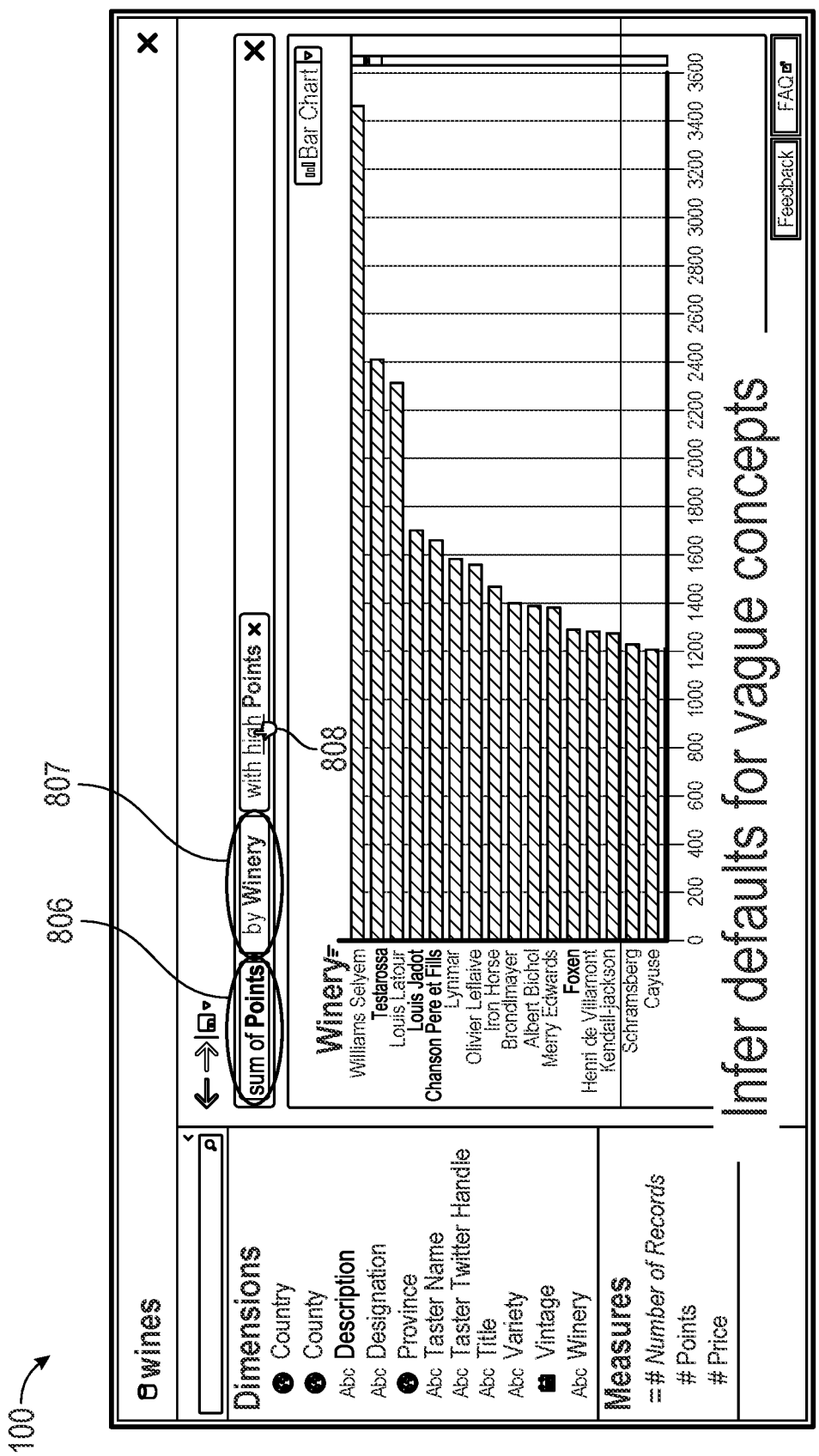
Figure 8C:
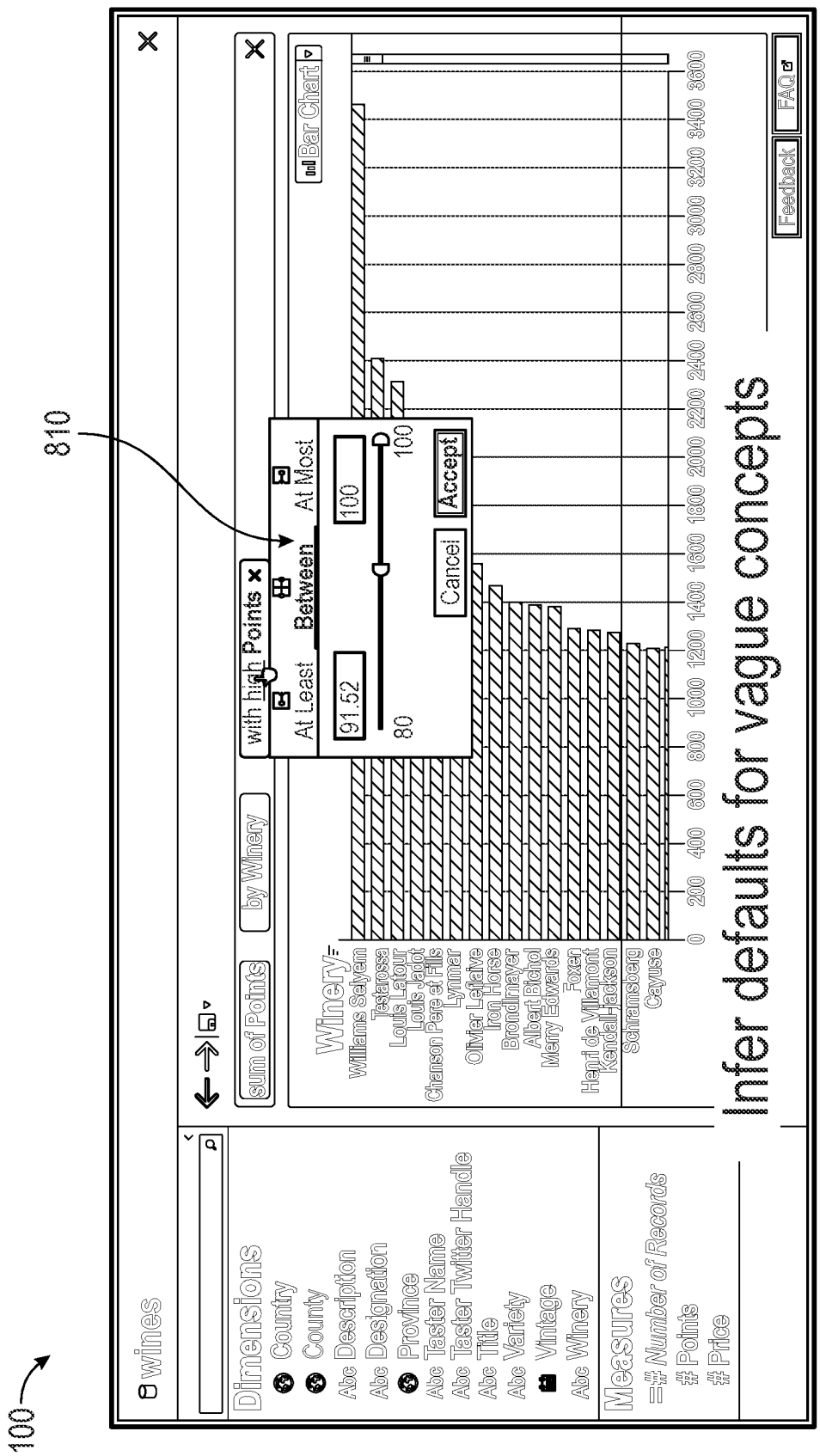
Figure 8D:
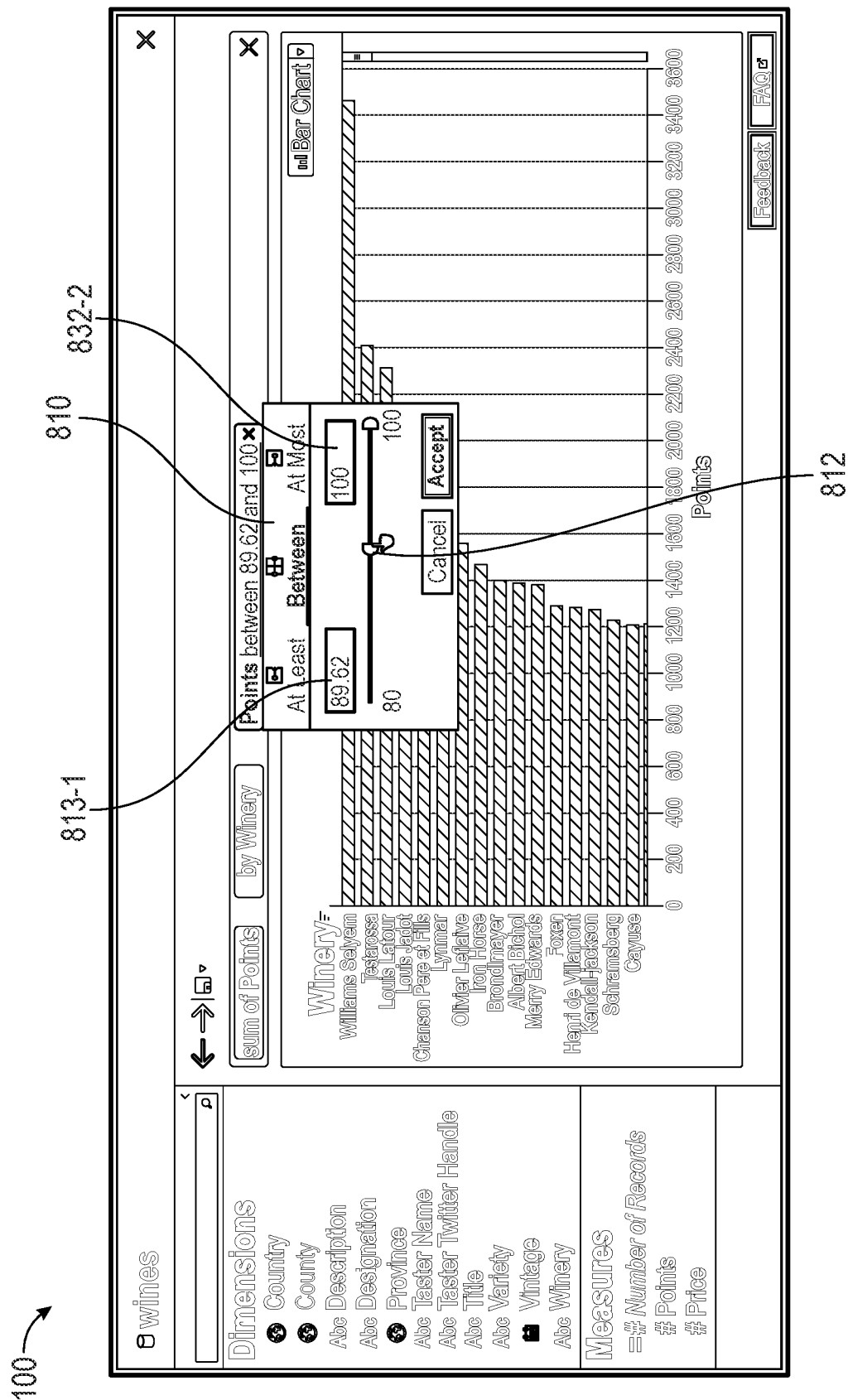

FIG. 8A illustrates user input of a natural language command 802 "wineries with high points." The command 802 includes a vague concept "high points." In response to user selection of the interpretation 804 "by Winery with high Points," and as illustrated in FIG. 8B, the input box 124 displays a first phrase 806 (e.g., an aggregation expression) "Sum of Points", a second phrase 807 (e.g., a group expression) "by Winery", and a third phrase 808 "with high Points." FIG. 8B also illustrates user selection of the word "high" in the third phrase 808. In response to the user selection, and as shown in FIG. 8C, a widget 810 is generated (e.g., using the widget generation module described in U.S. patent application Ser. No. 16/134,892, titled "Analyzing Natural Language Expressions in a Data Visualization User Interface," which is incorporated by reference herein in its entirety). The widget 810 displays a range of values (91.52 to 100) corresponding to default values for "high Points." FIG. 8D shows a user modification 812 of the default range of values, from "91.52 to 100" in FIG. 8C to "89.62 to 100" in FIG. 8D. In this example, the user changes the default values using a slider affordance in the widget 810. Alternatively, the user may modify the range of default values by entering the desired numeral values in the field boxes 813-1 and 813-2.

Figure 8E:
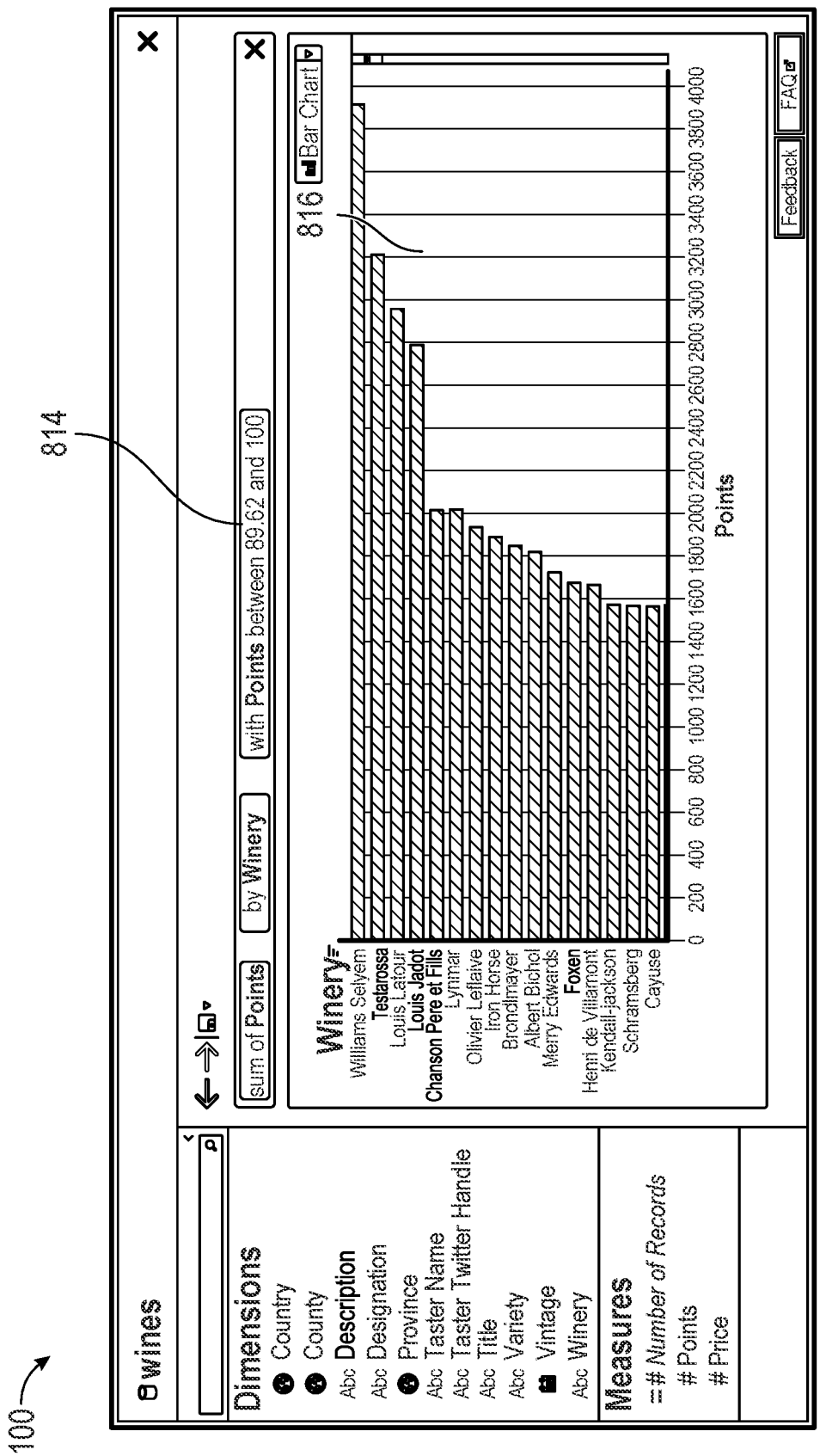
Figure 9A:
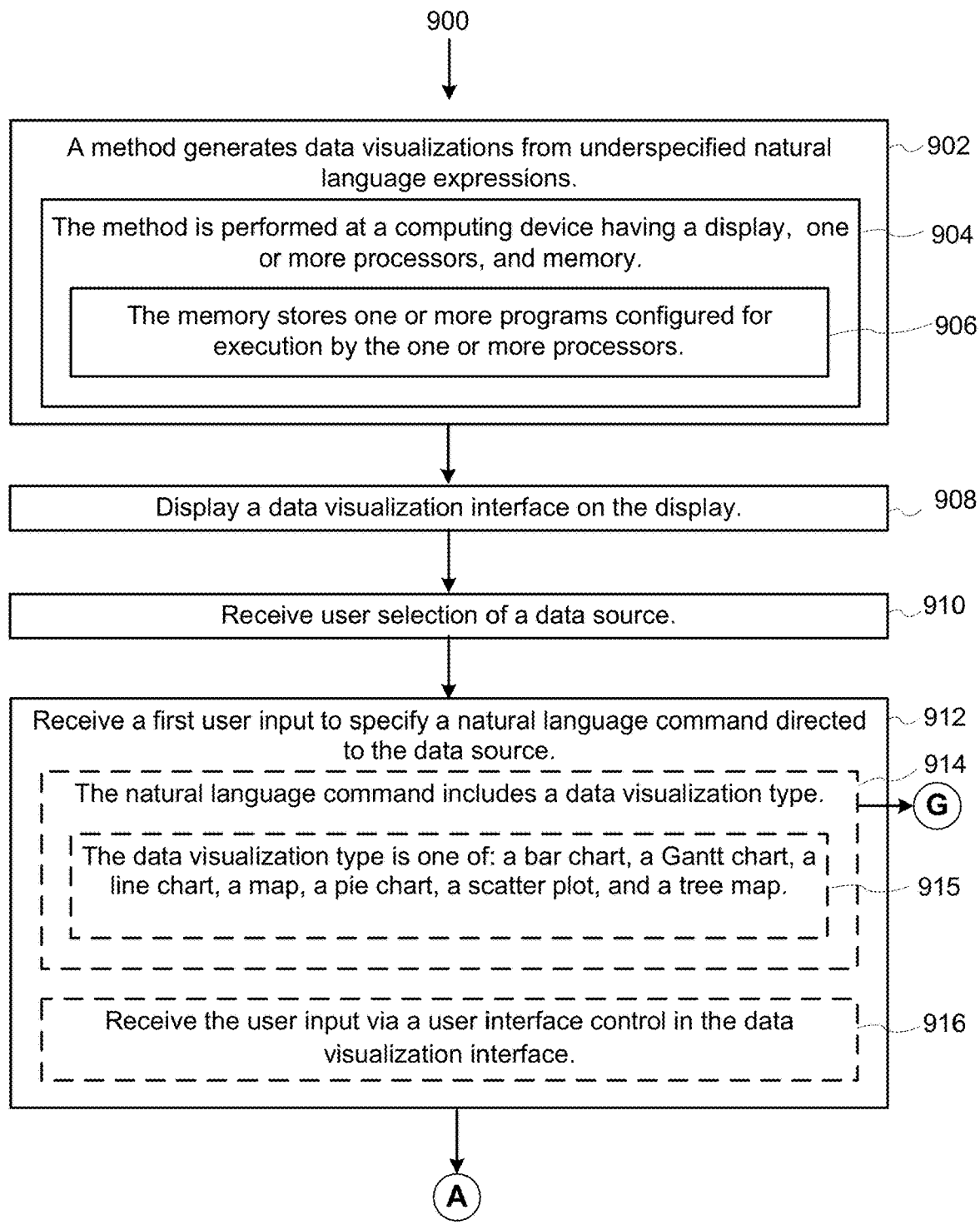
Figure 9B:
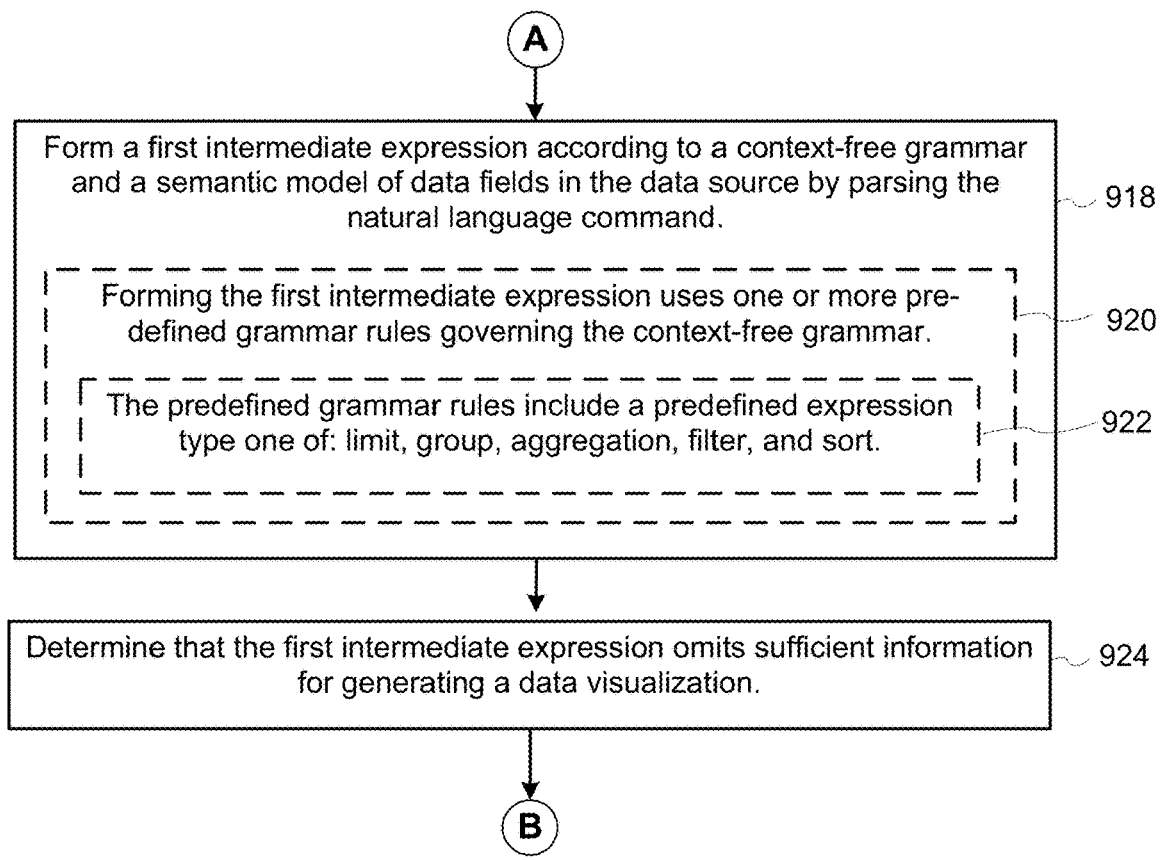
Figure 9C:
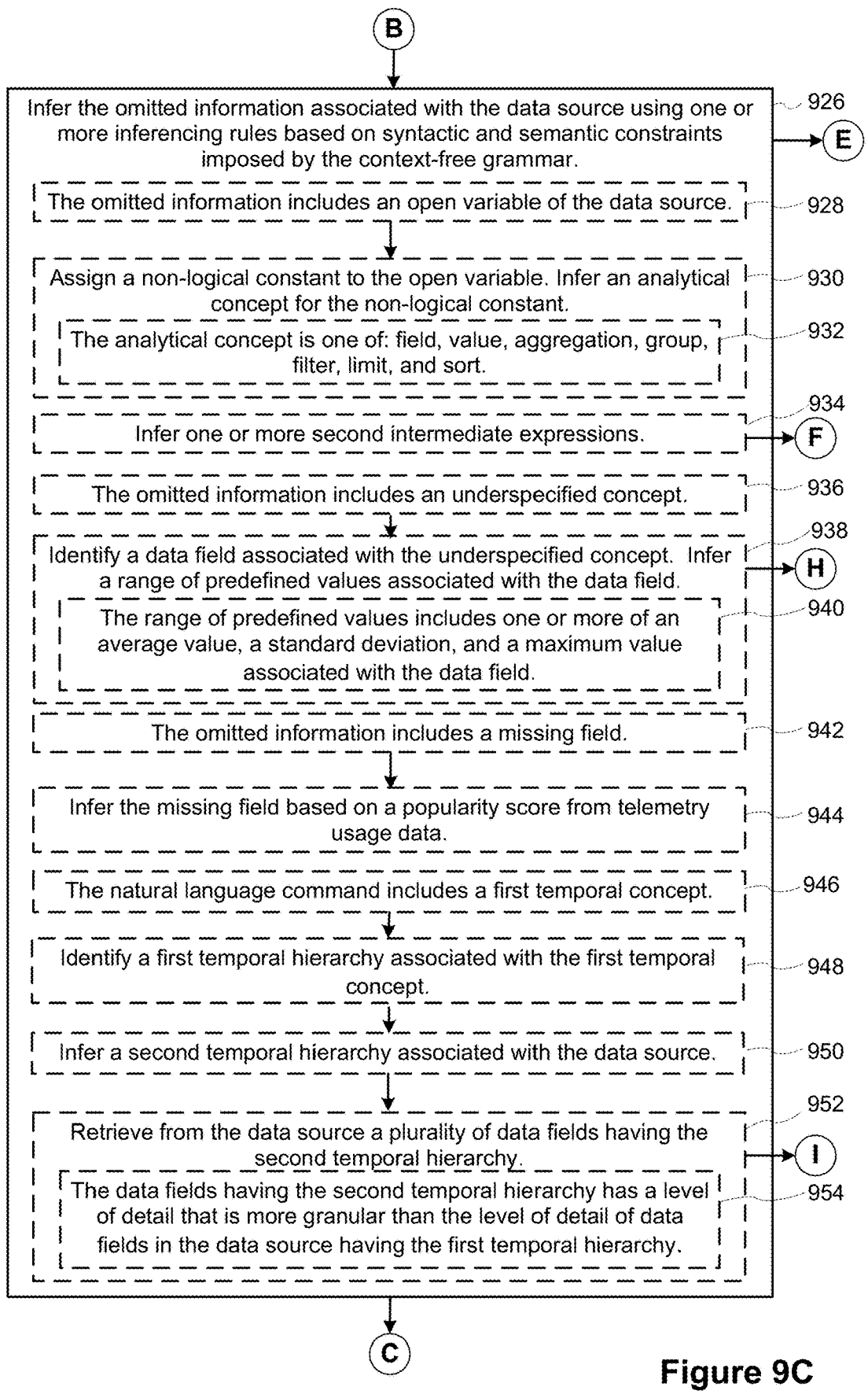
Figure 9D:
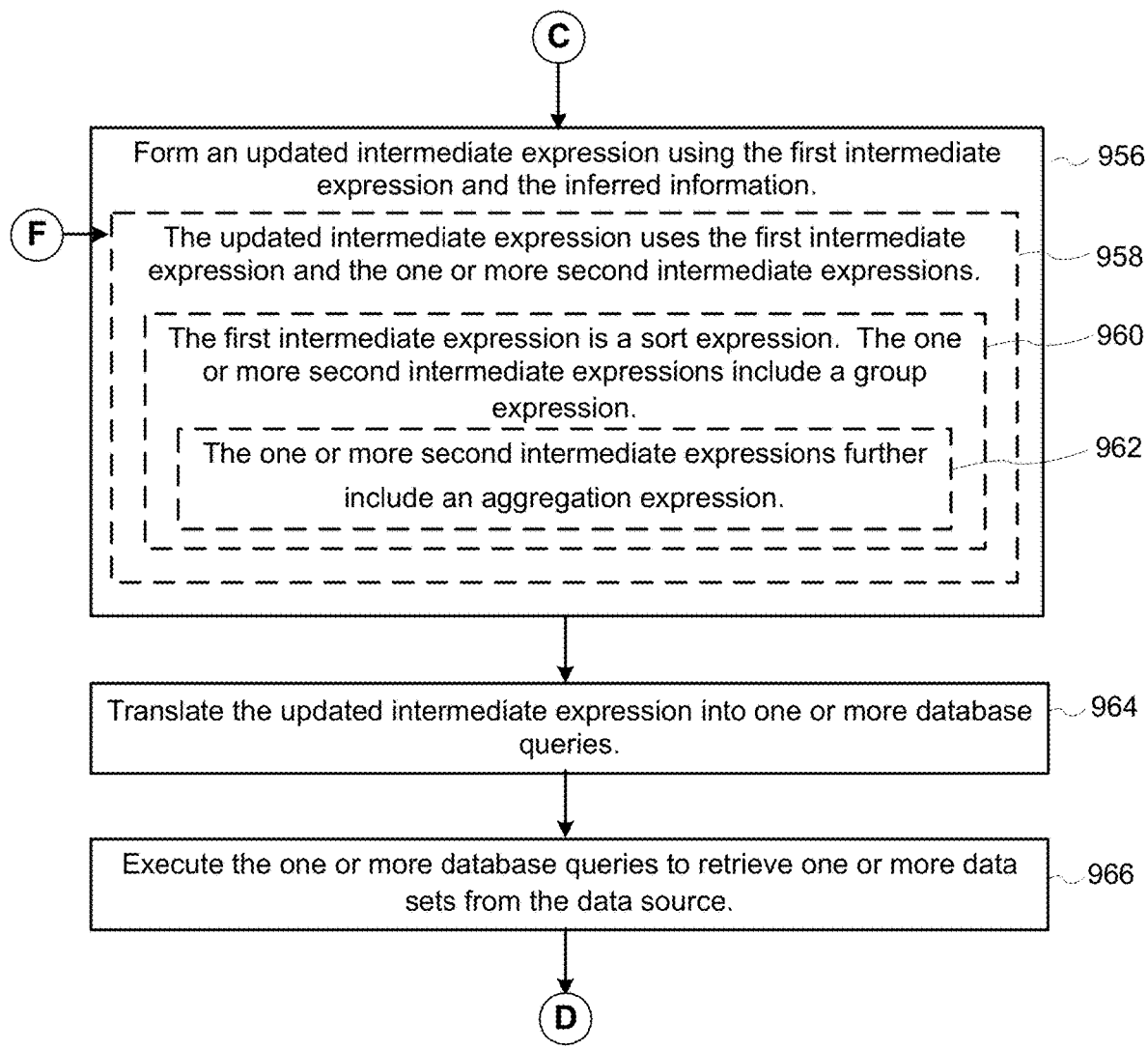

In response to the user modification, and as illustrated in FIG. 8E, the third phrase 808 "with high Points" is replaced with a modified phrase 814 "with Points between 89.62 and 100" to reflect the modified range of values. The user interface 100 also displays an updated visualization 816 in accordance with the modified values.

Flowchart

FIGS. 9A-9E provide a flowchart of a method 900 for generating (902) data visualizations from underspecified natural language expressions in accordance with some implementations. The method 900 is also called a process.

In some implementations, an intermediate language (also referred to as ArkLang) facilitates the process of issuing natural language queries to a generic database. In some implementations, the translation from a natural language input to visualization query language (VizQL) commands for generating a visualization response uses the following algorithm:

Input: a sequence of natural language tokens
Output: VizQL query expression(s)
Let f be a translation function that maps each natural language word into an ArkLang concept (e.g., the concept "average");
Let g be (a top-down recursive) translation function mapping analytical expressions of ArkLang to VizQL;
Then h is defined as the composition of f and g mapping a natural language expression into VizQL;
Perform a lexical translation from natural language into ArkLang. For example, f (mean)=f (avg)="average" and f (wine prices)="Price";
Leverage the context free grammar and a set of grammar rules to parse the resultant translated terms into an ArkLang dialect. For example, "average" ∈Aggregations and wine prices∈Fields, so [average, Price] ∈aggregation expressions; and
Compile the ArkLang sentences into VizQL commands and issue those commands against a database. For example, perform the translation g([average, Price]).

The method 900 is performed (904) at a computing device 200 that has (904) a display 212, one or more processors 202, and memory 206. The memory 206 stores (906) one or more programs configured for execution by the one or more processors 202. In some implementations, the operations shown in FIGS. 4-8 correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 900 may be combined and/or the order of some operations may be changed.

The computing device 200 displays (908) a data visualization interface 100 on the display 212.

The computing device 200 receives (910) user selection of a data source. For example, the computing device receives user selection of the data source 310 as illustrated in FIG. 3.

The computing device 200 receives (912) a first user input to specify a natural language command directed to the data source (e.g., the database or data sources 242 or the data source 310). In some implementations, the user input includes one or more fields associated with the data source. For example, referring to FIG. 4H, the fields "wineries" and "points" in the natural language command 434 "top 10 wineries by sum of points" are associated with the data source 310. In some implementations, the user input comprises a plurality of words and/or numerals.

In some implementations, the computing device 200 receives (916) the user input via a user-interface control in the data visualization interface 100. For example, the computing device receives the user input via the command box 124 of the graphical user interface 100. In some implementations, the user may enter (e.g., type in) the user input. In some implementations, the user input is a voice utterance captured by the audio input device 220.

The computing device 200 forms (918) a first intermediate expression (e.g., using the natural language processing module 238) according to a context-free grammar and a semantic model 248 of data fields in the data source by parsing the natural language command.

In some implementations, a parsing algorithm Cocke-Kasami-Younger (CKY) is used for parsing the natural language command. The CKY algorithm employs bottom-up parsing and dynamic programming on a context-free grammar. The input to the underlying CKY parser is this context-free grammar with production rules augmented with both syntactic and semantic predicates based on analytical expressions that correspond to basic database operations found in the database query's underlying analytical functionality.

In some implementations, the computing device 200 forms (920) the first intermediate expression using one or more pre-defined grammar rules governing the context-free grammar. In some implementations, the predefined grammar rules are specified in Backus-Naur Form.

In some implementations, the predefined grammar rules include (922) a predefined expression type that is one of: limit, group, aggregation, filter, and sort.

In accordance with a determination (924) that the first intermediate expression omits sufficient information for generating a data visualization, the computing device 200 infers (926) the omitted information associated with the data source using one or more inferencing rules based on syntactic and semantic constraints imposed by the context-free grammar. In some implementations, the first intermediate expression is also known as a partial analytical expression or an underspecified expression.

In some implementations, the omitted information includes (928) an open variable of the data source. The computing device 200 assigns (930) a non-logical constant to the open variable, and infers an analytical concept for the non-logical constant. In other words, the non-logical constant only has meaning or semantic content when one is assigned to it by means of an interpretation. As illustrated in FIGS. 5A-5C, the natural language command 502 "average price over time" contains an open (e.g., free) variable "time." In some implementations, the computing device 200 identifies (e.g., computes) the most relevant non-logical constants associated with the open variable, and assigns the most relevant non-logical constant (e.g., "by Vintage's year") to the open variable "time", resulting in a set of fully specified expressions "average price; by Vintage's year."

In some implementations, the analytical concept is (932) one of: field, value, aggregation, group, filter, limit, and sort. For example, in FIGS. 5A-5B, a group concept ("by") is inferred for the non-logical constant "Vintage's year."

The computing device 200 forms (956) an updated intermediate expression using the first intermediate expression and the inferred information. In other words, the updated intermediate expression are the syntactically viable expressions of the context-free grammar. In some implementations, the updated intermediate expression is also known as a fully specified expression.

In some implementations, inferring the omitted information includes (934) inferring one or more second intermediate expressions. The updated intermediate expression uses (958) the first intermediate expression and the one or more second intermediate expressions. For example, in FIGS. 6A-6B, the computing device 200 infers a group expression "by winery" from a sort expression "sort Winery in descending order by maximum points." The group expression includes the dimension "winery" that is being sorted.

In some implementations, the first intermediate expression is (960) a sort expression, and the one or more second intermediate expressions include a group expression.

In some implementations, the one or more second expressions further include (962) an aggregation expression. In some implementations and instances, the computing device 200 infers a default aggregation expression (e.g., "SUM (NumberOfRecords)") when a user does not specify an aggregation expression.

The computing device 200 translates (964) the updated intermediate expression into one or more database queries.

The computing device 200 executes (966) the one or more database queries to retrieve one or more data sets from the data source.

The computing device 200 generates (968) and displays a data visualization of the retrieved data sets.

In some implementations, the natural language command includes (914) a data visualization type, as illustrated in FIGS. 7A, 7D, and 7H. Generating and displaying the data visualization of the retrieved data sets includes displaying (970) the data visualization having the data visualization type.

In some implementations, the data visualization type is (915) one of: a bar chart, a Gantt chart, a line chart, a map, a pie chart, a scatter plot, and a tree map.

In some implementations, the omitted information includes (936) an underspecified concept. For example, the omitted information includes one or more vague or ambiguous concepts (or terms) such as "high," "low," "good," "bad," "near," and "far." Inferring the omitted information includes identifying (938) a data field associated with the underspecified concept, and inferring a range of predefined (e.g., default) values associated with the data field. The generated and displayed data visualization is (972) based on the range of predefined values. This is further illustrated in FIGS. 8A-8C.

In some implementations, the range of predefined values includes (940) one or more of an average value, a standard deviation, and a maximum value associated with the data field.

In some implementations, the method 900 further comprises receiving (974) a second user input modifying the range of predefined values (e.g., using a slider affordance or by entering the desired values, as illustrated in FIG. 8D). Responsive to the second user input, the computing device 200 generates (976) and displays an updated data visualization based on the modified range of predefined values.

In some implementations, after the computing device 200 infers the omitted information, the computing device 200 displays (982) the inferred information as one or more options in the user interface control, each of the one or more options representing an interpretation of the inferred information.

In some implementations, the one or more options are (984) displayed in a dropdown menu (e.g., the dropdown menu 406) of the user interface.

In some implementations, the omitted information includes (942) a missing field, and inferring the omitted information includes inferring (944) the missing field based on a popularity score from telemetry usage data. For example, a field that is referenced more often will be assigned a higher popularity score. In some implementations, the popularity score is based on a set of heuristics governing principles of information visualization. For example, geo fields such as "Postal Code" have a lower popularity score because they tend to be less salient than other geographic counterparts such as "City" or "State." When inferring a time concept in an utterance such as "show me orders 2015," relative time concepts (e.g. "last 2015 years") tend to be less salient than absolute time concepts (e.g. "in the year 2015").

In some implementations, the natural language command includes (946) a first temporal concept. Inferring the omitted information includes identifying (948) a first temporal hierarchy associated with the first temporal concept. Inferring the omitted information also includes (950) inferring a second temporal hierarchy associated with the data source. The computing device 200 retrieves (952) from the data source a plurality of data fields having the second temporal hierarchy. The computing device 200 generates (978) and displays the data visualization using the plurality of data fields having the second temporal hierarchy. For example, in response to the command "Show me sum of sales in July 2018," the computing device infers the first temporal hierarchy "month" and infers the second temporal hierarchy "week." The computing device 200 generates and displays a data visualization using sales data by week.

In some implementations, the plurality of data fields having the second temporal hierarchy has (954) a level of detail that is more granular than the level of detail of data fields in the data source having the first temporal hierarchy.

In some implementations, generating and displaying a data visualization further comprises generating (980) and displaying a data visualization having a particular data visualization type based on the inferred information. For example, in response to the natural language command that includes the term "correlate," the computing device 200 infers a scatter plot, as illustrated in FIGS. 7F-7G, Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method for generating data visualizations from underspecified natural language expressions, comprising:
at a computing device having a display, one or more processors, and memory storing one or more programs configured for execution by the one or more processors:
displaying a data visualization interface on the display;
receiving user selection of a data source;
identifying a semantic model that is (i) derived from the data source and (ii) includes attributes of data fields and/or data values in the data source;
receiving a first user input to specify a natural language command directed to the data source;
in response to receiving the first user input, parsing the natural language command according to a context-free grammar and the semantic model to form a first intermediate expression of the natural language command;
in accordance with a determination that the first intermediate expression omits sufficient information for generating a data visualization:
inferring the omitted information associated with the data source using one or more inferencing rules based on syntactic constraints imposed by the context-free grammar and semantic constraints imposed by the attributes of data fields and/or data values in the data source;
forming an updated intermediate expression using the first intermediate expression and the inferred information;
translating the updated intermediate expression into one or more database queries;
executing the one or more database queries to retrieve one or more data sets from the data source; and
generating and displaying a data visualization of the retrieved data sets.

2. The method of claim 1, wherein forming the first intermediate expression includes using one or more predefined grammar rules governing the context-free grammar.

3. The method of claim 2, wherein the predefined grammar rules include a predefined expression type selected from the group consisting of: limit, group, aggregation, filter, and sort.

4. The method of claim 1, wherein:
the omitted information includes an open variable of the data source; and
inferring the omitted information includes:
assigning a non-logical constant to the open variable; and
inferring an analytical concept for the non-logical constant.

5. The method of claim 4, wherein the analytical concept is selected from the group consisting of: field, value, aggregation, group, filter, limit, and sort.

6. The method of claim 1, wherein:
inferring the omitted information associated with the data source includes inferring one or more second intermediate expressions; and
the updated intermediate expression uses the first intermediate expression and the one or more second intermediate expressions.

7. The method of claim 6, wherein the first intermediate expression is a sort expression, and the one or more second intermediate expressions include a group expression.

8. The method of claim 7, wherein the one or more second intermediate expressions further include an aggregation expression.

9. The method of claim 1, wherein the natural language command includes a data visualization type; and
generating and displaying the data visualization of the retrieved data sets includes displaying the data visualization having the data visualization type.

10. The method of claim 9, wherein the data visualization type is selected from the group consisting of: a bar chart, a Gantt chart, a line chart, a map, a pie chart, a scatter plot, and a tree map.

11. The method of claim 1, wherein:
the omitted information includes an underspecified concept;
inferring the omitted information includes:
identifying a data field associated with the underspecified concept; and
inferring a range of predefined values associated with the data field; and
generating and displaying the data visualization includes generating and displaying the data visualization based on the range of predefined values.

12. The method of claim 11, wherein the range of predefined values includes one or more of an average value, a standard deviation, and a maximum value associated with the data field.

13. The method of claim 11, further comprising receiving a second user input modifying the range of predefined values; and
responsive to the second user input, generating and displaying an updated data visualization based on the modified range of predefined values.

14. The method of claim 1, wherein receiving the first user input to specify the natural language command further comprises receiving the first user input via a user interface control in the data visualization interface.

15. The method of claim 14, further comprising:
after inferring the omitted information, displaying the inferred information as one or more options in the user interface control, each of the one or more options representing an interpretation of the inferred information.

16. The method of claim 15, wherein displaying the inferred information as one or more options in the user interface control includes displaying the one or more options in a dropdown menu of the user interface.

17. The method of claim 1, wherein:
the natural language command directed to the data source includes a first temporal concept;
inferring the omitted information includes:
identifying a first temporal hierarchy associated with the first temporal concept;
inferring a second temporal hierarchy associated with the data source; and
retrieving from the data source a plurality of data fields having the second temporal hierarchy; and
generating and displaying the data visualization using the plurality of data fields having the second temporal hierarchy.

18. The method of claim 17, wherein the plurality of data fields having the second temporal hierarchy has a level of detail that is more granular than the level of detail of data fields in the data source having the first temporal hierarchy.

19. A computing device comprising:
one or more processors;
memory coupled to the one or more processors;
a display; and
one or more programs stored in the memory and configured for execution by the one or more processors, the one or more programs comprising instructions for:
displaying a data visualization interface on the display;
receiving user selection of a data source;
identifying a semantic model that is (i) derived from the data source and (ii) includes attributes of data fields and/or data values in the data source;
receiving a first user input to specify a natural language command directed to the data source;
in response to receiving the first user input, parsing the natural language command according to a context-free grammar and the semantic model to form a first intermediate expression of the natural language command;
in accordance with a determination that the first intermediate expression omits sufficient information for generating a data visualization:
inferring the omitted information associated with the data source using one or more inferencing rules based on syntactic constraints imposed by the context-free grammar and semantic constraints imposed by the attributes of data fields and/or data values in the data source;
forming an updated intermediate expression using the first intermediate expression and the inferred information;
translating the updated intermediate expression into one or more database queries;
executing the one or more database queries to retrieve one or more data sets from the data source; and
generating and displaying a data visualization of the retrieved data sets.

20. A non-transitory computer readable storage medium storing one or more programs, the one or more programs comprising instructions, which when executed by a computing device that includes a display, cause the device to perform the method of:
displaying a data visualization interface on the display;
receiving user selection of a data source;
identifying a semantic model that is (i) derived from the data source and (ii) includes attributes of data fields and/or data values in the data source;
receiving a first user input to specify a natural language command directed to the data source;
in response to receiving the first user input, parsing the natural language command according to a context-free grammar and the semantic model to form a first intermediate expression of the natural language command;
in accordance with a determination that the first intermediate expression omits sufficient information for generating a data visualization:
inferring the omitted information associated with the data source using one or more inferencing rules based on syntactic constraints imposed by the context-free grammar and semantic constraints imposed by the attributes of data fields and/or data values in the data source;
forming an updated intermediate expression using the first intermediate expression and the inferred information;
translating the updated intermediate expression into one or more database queries;
executing the one or more database queries to retrieve one or more data sets from the data source; and
generating and displaying a data visualization of the retrieved data sets.

* * * * *